(12) United States Patent
Heishi et al.

(10) Patent No.: US 10,608,451 B2
(45) Date of Patent: Mar. 31, 2020

(54) ELECTRICITY STORAGE SYSTEM AND CARTRIDGE

(71) Applicant: SEKISUI CHEMICAL CO., LTD., Osaka (JP)

(72) Inventors: Masaru Heishi, Tsukuba (JP); Masashi Kanoh, Tsukuba (JP); Mitsuhide Nogami, Tsukuba (JP); Akio Shokaku, Tsukuba (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 176 days.

(21) Appl. No.: 15/978,966

(22) Filed: May 14, 2018

(65) Prior Publication Data

US 2018/0262032 A1 Sep. 13, 2018

Related U.S. Application Data

(62) Division of application No. 14/384,040, filed as application No. PCT/JP2013/054512 on Feb. 22, 2013, now Pat. No. 10,075,002.

(30) Foreign Application Priority Data

Apr. 26, 2012 (JP) ................ 2012-101691
May 30, 2012 (JP) ................ 2012-123325
Dec. 21, 2012 (JP) ................ 2012-279947

(51) Int. Cl.
*H02J 7/00* (2006.01)
*H02J 50/40* (2016.01)
*H02J 50/30* (2016.01)
*H02J 3/32* (2006.01)
(Continued)

(52) U.S. Cl.
CPC ............ *H02J 7/0045* (2013.01); *B60L 53/80* (2019.02); *B60L 58/12* (2019.02); *H02J 3/32* (2013.01);
(Continued)

(58) Field of Classification Search
CPC ...... H02J 7/0045; H02J 7/0014; H02J 7/0022; H02J 7/0027; H02J 7/34; H02J 3/32; B60L 58/12; B60L 53/80
(Continued)

(56) References Cited

U.S. PATENT DOCUMENTS 6,306,534 B1 10/2001 Faris et al.
2003/0091882 A1 5/2003 Schmidt et al.
(Continued)

FOREIGN PATENT DOCUMENTS

CN 1280713 A 1/2001
CN 102122826 A 7/2011
(Continued)

OTHER PUBLICATIONS

International Search Report for PCT/JP2013/054512, dated Apr. 23, 2013, along with an English language translation.
(Continued)

*Primary Examiner* — Nathaniel R Pelton
(74) *Attorney, Agent, or Firm* — Greenblum & Bernstein, P.L.C.

(57) ABSTRACT

An electricity storage system is provided that includes a plurality of cartridges connected together in parallel, each cartridge comprising a plurality of cells connected together, where each of the plurality of cartridges independently maintains a voltage convertible to a commercial voltage. The electricity storage system is configured to, upon receipt of a cartridge withdrawal signal input by a user and indicating a user's intention to withdraw any cartridge of the plurality of cartridges regardless of the operational state of a selected cartridge, including whether the selected cartridge is charging or discharging, disallow conductions with
(Continued)

respect to the cartridge to be withdrawn and output a signal indicating that the selected cartridge is ready to be withdrawn.

32 Claims, 30 Drawing Sheets

(51) Int. Cl.
  *H02J 7/34* (2006.01)
  *B60L 53/80* (2019.01)
  *B60L 58/12* (2019.01)
(52) U.S. Cl.
  CPC .......... *H02J 7/0014* (2013.01); *H02J 7/0022* (2013.01); *H02J 7/0027* (2013.01); *H02J 7/34* (2013.01); *H02J 50/30* (2016.02); *H02J 50/40* (2016.02); *Y02T 10/7055* (2013.01); *Y10T 307/336* (2015.04)
(58) Field of Classification Search
  USPC ............................................. 320/101
  See application file for complete search history.

(56) References Cited

U.S. PATENT DOCUMENTS

| | | | | |
|---|---|---|---|---|
| 2004/0217737 | A1* | 11/2004 | Popescu | H01M 10/4257 320/128 |
| 2007/0188130 | A1* | 8/2007 | Scheucher | B60L 53/305 320/110 |
| 2010/0121511 | A1 | 5/2010 | Onnerud et al. | |
| 2011/0133558 | A1 | 6/2011 | Park | |
| 2012/0100400 | A1* | 4/2012 | Kang | H01M 2/1077 429/7 |
| 2012/0116699 | A1 | 5/2012 | Haag et al. | |
| 2012/0293108 | A1 | 11/2012 | Goto et al. | |

FOREIGN PATENT DOCUMENTS

| | | |
|---|---|---|
| CN | 102355040 A | 2/2012 |
| CN | 102361328 A | 2/2012 |
| EP | 2418754 | 2/2012 |
| EP | 2 445 047 A2 | 4/2012 |
| JP | 9-312938 | 12/1997 |
| JP | 2001-016706 | 1/2001 |
| JP | 2003-32912 | 1/2003 |
| JP | 2004-120855 | 4/2004 |
| JP | 2010-148242 | 7/2010 |
| TW | 345774 | 11/1998 |
| WO | 99/18628 | 4/1999 |
| WO | 2010/147384 | 12/2010 |
| WO | 2011/105555 | 9/2011 |

OTHER PUBLICATIONS

Search Report issued by European Patent Office in E.P.O. Patent Application No. 13781518.9, dated Dec. 7, 2015.
Office Action, including Search Report and English language translation, from the Taiwan Intellectual Property Office (TIPO), dated May 18, 2016, in related Taiwanese Application No. 102106347.
USPTO Office Action, dated May 4, 2017, in U.S. Appl. No. 14/384,040.
USPTO Office Action, dated Dec. 15, 2017, in U.S. Appl. No. 14/384,040.
Office Action issued by European Patent Office in E.P.O. Patent Application No. 13781518.9, dated Mar. 23, 2016.
Search Report issued by Chinese Patent Office in Chinese Patent Application No. 201380021292.0, together with partial English translation, dated Jan. 28, 2016.
USPTO Notice of Allowance, dated Jun. 21, 2018, in U.S. Appl. No. 14/384,040.

* cited by examiner

FIG. 3

|  | CELL | CARTRIDGE (17 CELLS) |
|---|---|---|
| WIDTH | 160 mm | 200 mm |
| DEPTH | 80 mm | 120 mm |
| HEIGHT | 3 mm | 50 mm |
| WEIGHT | 100 g | 2,500 g |
| ENERGY | 11.1 Wh | 0.19 kWh |
| RATED CAPACITY | 3 Ah | 3 Ah |
| VOLTAGE | RATED:3.7 V (MAX:4.2 V) | RATED:62.9V (MAX:71.4V) |
| CIRCUIT CONNECTION | — | 17 IN SERIES |

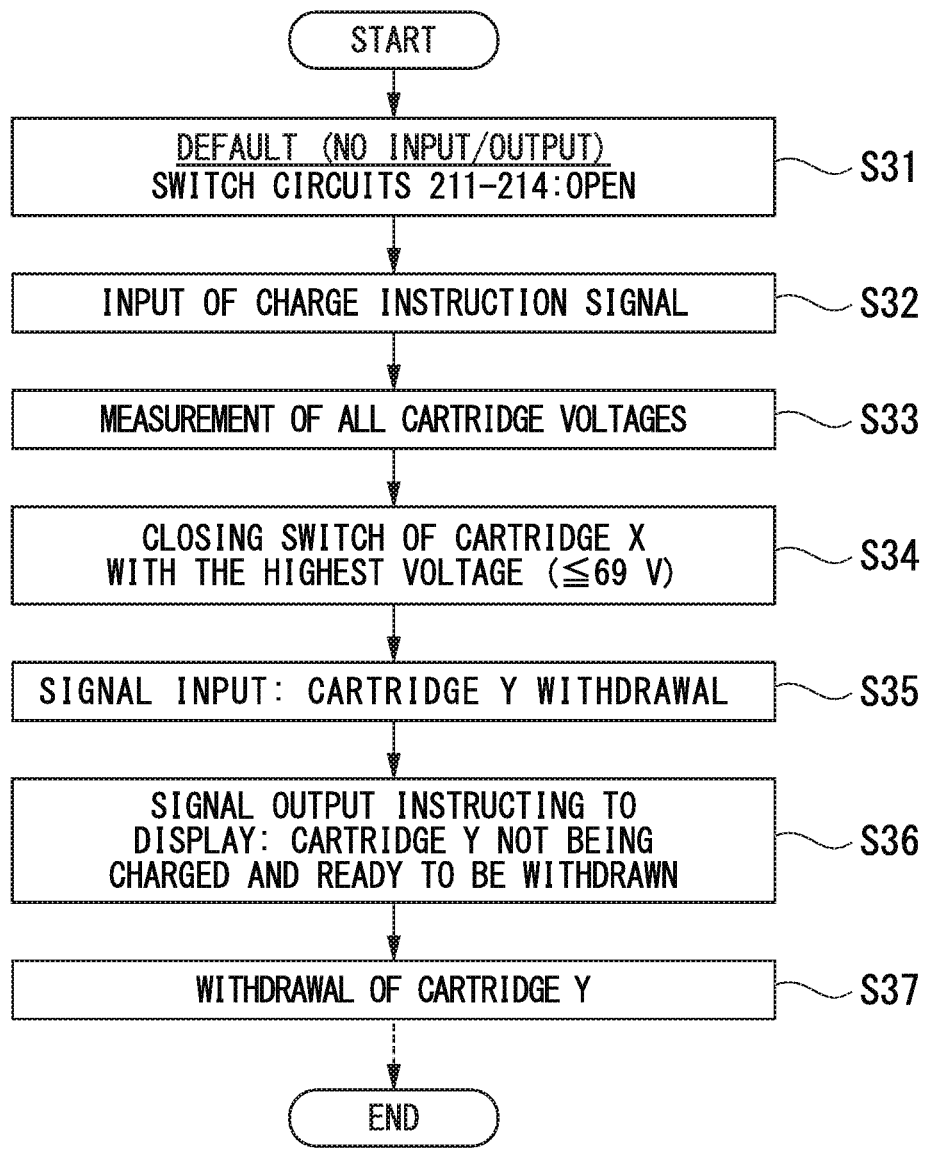

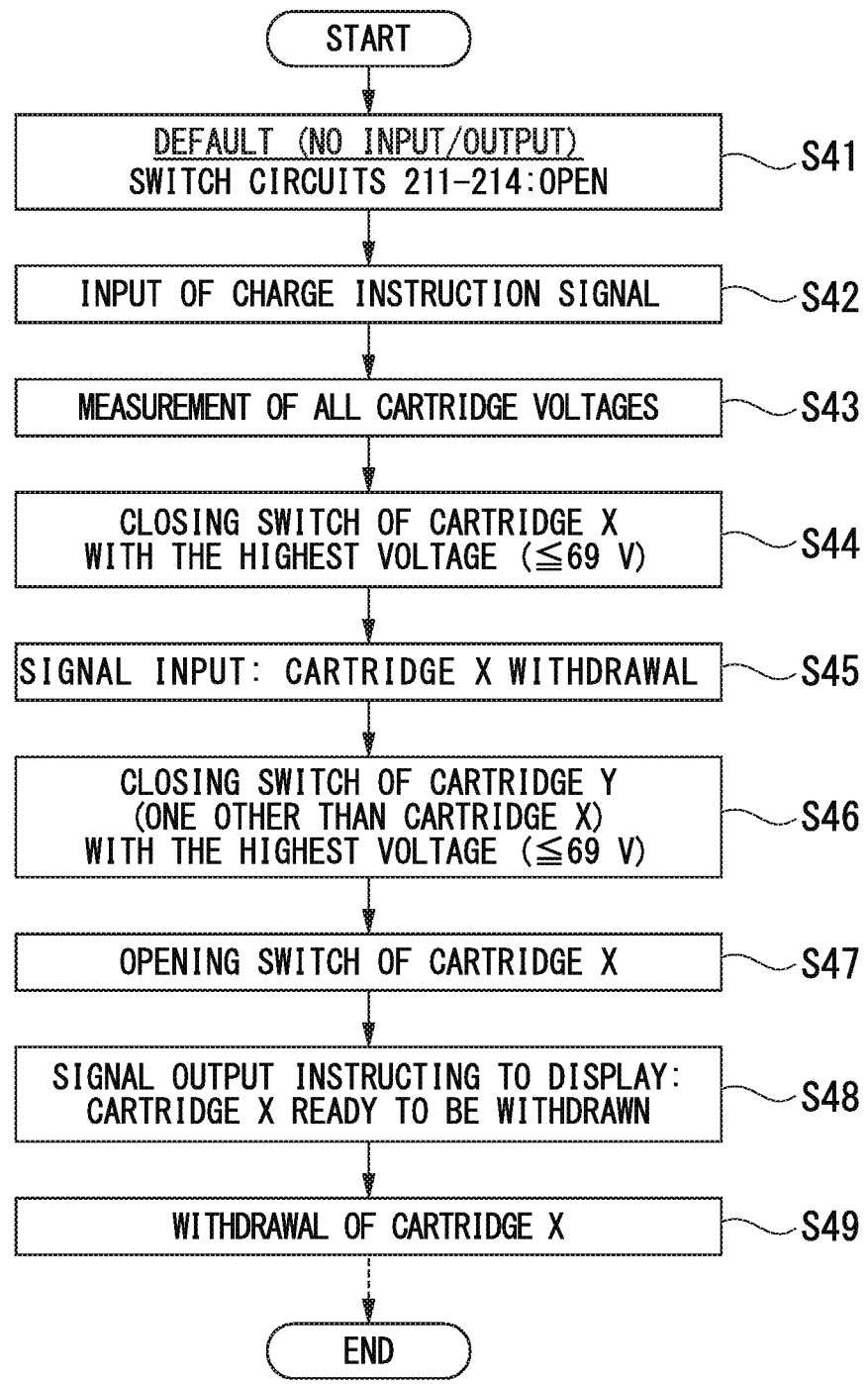

FIG. 22B

|   | DISCHARGE CAPACITY | THEORETICAL CAPACITY |
|---|---|---|
| A | 8260 | 8700 |
| C | 8355 | 8700 |
| E ×2 | 5580 | 5800 |
| E ×1 | 2804 | 2900 |
| G | 8324 | 8700 |
| I ×2 | 5564 | 5800 |
| I ×1 | 2813 | 2900 |

FIG. 22C

|   | DISCHARGE CAPACITY | THEORETICAL CAPACITY |
|---|---|---|
| B | 8357 | 8700 |
| D | 8222 | 8700 |
| F | 8383 | 8700 |
| H | 8335 | 8700 |
| J | 8375 | 8700 |

FIG. 23A

| | DISCHARGE | CHARGE |
|---|---|---|
| 1 | A 2.2A(1/4C)<br>C 2.2A(1/4C)<br>E x2: 2.2A(1/3C), x1:2.9A(1.2C) ←WITHDRAWN AND USED AT 1C<br>G 2.2A(1/4C)<br>I x2: 2.2A(1/3C), x1:2.9A(1.2C) ←WITHDRAWN AND USED AT 1C | B 1.1A(1/8C)<br>D 1.1A(1/8C)<br>F 1.1A(1/8C)<br>H 1.1A(1/8C)<br>J 1.1A(1/8C) |

|     | DISCHARGE CAPACITY | THEORETICAL CAPACITY |
|-----|--------------------|----------------------|
| A   | 7858               | 8200                 |
| C   | 7931               | 8200                 |
| E ×2 | 5320              | 5800                 |
| E ×1 | 2304              | 2400                 |
| G   | 7959               | 8200                 |
| I ×2 | 5375              | 5800                 |
| I ×1 | 2321              | 2400                 |

FIG. 23C

|   | DISCHARGE CAPACITY | THEORETICAL CAPACITY |
|---|--------------------|----------------------|
| B | 7867               | 8200                 |
| D | 7951               | 8200                 |
| F | 7963               | 8200                 |
| H | 7947               | 8200                 |
| J | 7972               | 8200                 |

ELECTRICITY STORAGE SYSTEM AND CARTRIDGE

CROSS-REFERENCE TO RELATED APPLICATIONS

This application is a divisional of pending U.S. patent application Ser. No. 14/384,040 filed on Sep. 9, 2014, which is a National Stage Application of PCT/JP2013/054512 filed on Feb. 22, 2013, which claims the benefit of Japanese Patent Application Nos. 2012-101691 filed on Apr. 26, 2012, 2012-123325 filed on May 30, 2012 and 2012-279947 filed on Dec. 21, 2012. The disclosures of each of the above-identified applications, including the specification, drawings, and claims, are incorporated herein by reference in their entireties.

TECHNICAL FIELD

The present invention relates to an electricity storage system and a cartridge.

BACKGROUND ART

In recent years, a growth in demand for storage batteries is expected especially in the field of electric cars. Further, storage batteries are also attracting attention in relation to the use thereof as stationary batteries. Particularly, attention is focused on the use of storage batteries for the purpose of emergency power supply, leveling of charge demanded as a result of introduction of renewable energy, and energy conservation devices which promote efficient use of energy. The use of storage batteries widely varies from V2H (vehicle to home) to the recycling of the storage batteries, and it is considered that the storage battery-related business will attract further attention in the future.

The stationary storage batteries known today are used in a manner such that a whole battery pack is fixed on a system via welding etc. On the other hand, as a means for effectively utilizing a large secondary battery, the battery may be provided as a battery cartridge system. The cartridge system means a system where a battery is replaceable or is a part which can be easily replaced, and the battery is portable. For example, when a storage battery for home use is provided in the form of a battery cartridge system, it may be used as an extender for electric cars where the maximum driving distances largely vary depending on the driving conditions. Or when such a battery cartridge system is used for a bicycle, the time for charging the battery can be omitted thereby improving the convenience of the use of the bicycle (see, for example, Prior art document 1).

A battery cartridge system is also advantageous in that, when it is intended to change the amount of domestic power use, the power supply can be increased easily and that with a high economy because the introduction of a new system is not necessary. Furthermore, a large storage battery such as used at community level or plants can also be provided in the form of a cartridge system, whereby only deteriorated battery packs can be replaced so that the maintenance and renewal of the entire system become easy, thus providing a high economic benefit.

DOCUMENTS OF RELATED ART

Patent Documents

Patent Document 1: Japanese Unexamined Patent Application, First Publication No. 2001-016706

SUMMARY OF THE INVENTION

Problems to be Solved by the Invention

However, the aforementioned technology encounters problems associated with an electronic circuit and a battery management system. Conventionally, in the case of a storage battery for home use, battery packs are fixed by welding; however, for providing such a storage battery in the form of a cartridge system, it is a prerequisite that the battery packs are removable. In other words, for providing a practical battery in the form of a cartridge system, it is important that a storage system and cartridges are securely and safely connected. Further, as an electricity storage system, a battery cartridge system must be dischargeable or chargeable even when one of the cartridges of the system is not connected to the system.

Furthermore, even when batteries having different residual capacities are introduced into the electricity storage system, the entire system must be properly managed to be operable. In the case where conventional battery packs (cartridges) are connected in series, when the capacity of a cartridge with a larger residual capacity is assumed to be 100 and the capacity of a cartridge with a less residual capacity is assumed to be 90, the total dischargeable capacity of the cartridges results in 90×2=180, not 100+90=190. That is, the voltage of the entire system is lowered in accordance with the lowest voltage of the cartridges, resulting in a lower amount of energy output. Further, in the case where conventional batteries are connected in parallel, an inrush current (or a cross current) in accordance with a potential difference may occur where the current flows from a cartridge with a higher voltage to a cartridge with a lower voltage.

In order to solve this problem, it is conceivable to carry out an equalization (leveling) of capacities of the cartridges. However, such an equalization poses another problem in that transactions in the electricity storage system become complicated.

It is an object of the present invention to provide an electricity storage system in which battery packs are provided as cartridges so that electricity can be efficiently utilized. It is another object of the present invention to provide an electricity storage system which is capable of outputting sufficient amount of energy through each cartridge without a need for leveling to balance energies between the cartridges.

Means to Solve the Problems

The electricity storage system according to one embodiment of the present invention comprises a plurality of cartridges connected together in parallel, each cartridge comprising a plurality of cells connected together, and a circuit for preventing cross current, which restricts the current in each cartridge so as to cause the current to flow in one direction selected from a discharge direction and a charge direction, wherein the cartridges connected together in parallel are simultaneously charged with a direct voltage converted from a commercial voltage, or the cartridges connected together in parallel are caused to discharge simultaneously so that the electricity storage system outputs a commercial voltage.

This construction enables simultaneous discharge or charge with respect to a plurality of cartridges to thereby improving efficiency in discharging or charging, and also enables the prevention of cross current even when simultaneous discharge or charge is carried out with respect to a plurality of cartridges.

The above-mentioned electricity storage system may further comprises: a power conditioner provided in association with the cartridges connected together in parallel, which converts a commercial voltage into a direct voltage to charge the cartridges simultaneously or causes the cartridges to discharge simultaneously so that the electricity storage system outputs a commercial voltage; a cross current prevention circuit comprising a diode and a switch circuit which restricts the current in each cartridge so as to cause the current to flow in one direction selected from a discharge direction and a charge direction; and a control circuit for controlling the switch circuit of the cross current prevention circuit to allow or disallow the flow of current.

This construction enables simultaneous discharge or charge with respect to a plurality of cartridges to thereby improve efficiency in discharging or charging, and also enables the prevention of cross current even when simultaneous discharge or charge is carried out with respect to a plurality of cartridges.

In the above-mentioned electricity storage system, the cross current prevention circuit may comprises: sets of a first diode and a first switch circuit which are connected in series and form a current path only in a discharge direction with respect to each of the cartridges, and sets of a second diode and a second switch circuit which are connected in series and form a current path only in a charge direction with respect to each of the cartridges.

This construction enables the prevention of cross current between the cartridges by restricting the flow of current only in either discharge or charge direction with respect to each of the cartridges.

The above-mentioned electricity storage system may have a construction wherein, upon receipt of an input of discharge instruction signal from the electricity storage system, the control circuit simultaneously allows conductions through the first switch circuits each of which forms a current path only in a discharge direction with respect to each of the cartridges connected in parallel, so that the electricity storage system outputs a commercial voltage until a sustaining voltage in each of the cartridges reaches a first voltage.

This construction enables the prevention of cross current from occurring due to the difference in terminal voltages of the cartridges when simultaneous discharge is carried out from the cartridges.

The above-mentioned electricity storage system may have a construction wherein, upon receipt of an input of charge instruction signal from said electricity storage system, the control circuit simultaneously allows conductions through the second switch circuits each of which forms a current path only in a charge direction with respect to each of the cartridges connected in parallel, so that the electricity storage system is charged until a sustaining voltage in each of the cartridges reaches a second voltage.

This construction enables the prevention of cross current from occurring due to the difference in terminal voltages of the cartridges when simultaneous charge is carried out with respect to the cartridges.

The above-mentioned electricity storage system may have a construction wherein, upon receipt of an input of cartridge withdrawal signal in addition to the discharge instruction signal, the cartridge withdrawal signal indicating a user's intention to withdraw any of the cartridges connected in parallel, the control circuit, when the cartridges are discharging, disallows conductions through the first switch circuits each of which forms a current path only in a discharge direction with respect to each of the cartridges, and outputs a signal indicating that the cartridge is ready to be withdrawn.

This construction enables the safe withdrawal of a cartridge intended by a user to be removed during discharging from the cartridges of the electricity storage system.

The above-mentioned electricity storage system may have a construction wherein, upon receipt of an input of cartridge withdrawal signal in addition to the charge instruction signal, the cartridge withdrawal signal indicating a user's intention to withdraw any of the cartridges connected in parallel, the control circuit, when the cartridges are being charged, disallows conductions through the second switch circuits each of which forms a current path only in a charge direction with respect to each of the cartridges, and outputs a signal indicating that the cartridge is ready to be withdrawn.

This construction enables the safe withdrawal of a cartridge intended by a user to be removed during charging of the cartridges of the electricity storage system.

The above-mentioned electricity storage system may be provided with covers on the sides of the electricity storage system and the cartridges at connections therebetween so that, when the cartridges are inserted to the electricity storage system, connection portions are exposed to establish electrical connections.

This construction enables the secure and safe connection between the electricity storage system and the cartridges.

The above-mentioned electricity storage system may be provided with wireless power transmission devices on the sides of the electricity storage system and the cartridges at connections therebetween so as to establish transmission and reception of electricity between the electricity storage system and the cartridges without physical contact.

The above-mentioned electricity storage system may be used for general residential houses, shops, buildings, plants, power backup, mega solar power storage, wind power storage, geothermal energy storage, electric vehicles, plug-in hybrid vehicles or hybrid vehicles.

This not only enables the cartridges to be used for stationary purpose but also enables the cartridges to be shared between other devices, so that the electricity charged in the electricity storage system can be supplied to other systems, whereby the electricity charged in the cartridges from natural energy can be effectively utilized.

The above-mentioned electricity storage system may have a construction wherein the system is connected to a local area network to receive weather forecast information, based on which the amount of electricity to be generated by a solar battery in the future is calculated, wherein:

the electricity storage system predicts the amount of output from the solar battery based on the weather forecast information when the result of calculation shows that the term during which the amount of electricity to be generated by the solar battery equals or exceeds half of a rated output is less than the predetermined period of time, and a charging from the grid may not be carried out when the result of calculation shows that the term during which the amount of electricity to be generated by the solar battery equals or exceeds half of a rated output is equal to or more than the predetermined period of time.

This construction enables the establishment of an energy total management system taking a life pattern into consideration, where the electricity storage system is connected to a local area network to receive weather forecast information in order to facilitate efficient use of electricity derived from a solar battery or the grid.

The cartridge according to one embodiment of the present invention is independently capable of outputting a direct current voltage or an alternating current voltage in a state of being removed from the above-mentioned electricity storage system.

The electricity storage system according to another embodiment of the present invention comprises a plurality of cartridges connected together in parallel, each cartridge comprising a plurality of cells connected together, wherein each of the cartridges independently maintains a voltage convertible to a commercial voltage.

By this construction, each of the cartridges independently maintains a voltage convertible to a commercial voltage, thereby eliminating the need for leveling to balance energies between the cartridges. Further, this construction enables utmost output from the electricity charged in each cartridge without being influenced by the charged electricity in other cartridges so that the energy charged in each cartridge can be efficiently used.

The above-mentioned electricity storage system may further comprises: a DC-DC converter provided in association with the cartridges connected together in parallel; a DC-AC inverter provided between the DC-DC converter and a node outputting the commercial voltage; a plurality of switch circuits which are respectively provided between the cartridges connected together in parallel and the DC-DC converter; and a control circuit for controlling the switch circuits to allow or disallow the flow of current.

By this construction, the control circuit controls conduction and non-conduction of the switch circuits respectively provided between the cartridges connected together in parallel and the DC-DC converter, thereby eliminating the need for leveling to balance energies between the cartridges.

The above-mentioned electricity storage system may have a construction wherein, upon receipt of an input of discharge instruction signal from the electricity storage system, the control circuit selects, in accordance with a predetermined order, a cartridge with a sustaining voltage equal to or higher than a predetermined first voltage from among the cartridges connected in parallel, and allows conduction through the switch circuit for the selected cartridge, so that the commercial voltage is output until a sustaining voltage in the cartridge is lowered to a second voltage which is lower than the first voltage.

This construction enables utmost output from the electricity charged in each cartridge without being influenced by the charged electricity in other cartridges so that the energy charged in each cartridge can be efficiently used.

The above-mentioned electricity storage system may have a construction wherein, upon receipt of an input of charge instruction signal from said electricity storage system, the control circuit selects, in accordance with a predetermined order, a cartridge with a sustaining voltage equal to or lower than a predetermined third voltage from among the cartridges connected in parallel, and allows conduction through the switch circuit for the selected cartridge, so that the electricity storage system is charged with a commercial voltage until a sustaining voltage in the cartridge is increased to a fourth voltage which is higher than the third voltage.

This construction enables utmost output from the electricity charged in each cartridge without being influenced by the charged electricity in other cartridges so that the energy charged in each cartridge can be efficiently used.

The above-mentioned electricity storage system may have a construction wherein, upon receipt of an input of cartridge withdrawal signal in addition to the discharge instruction signal, the cartridge withdrawal signal indicating a user's intention to withdraw any of said cartridges connected in parallel, the control circuit, when the signaled cartridge is discharging, allows conduction through the switch circuit for other cartridge with a sustaining voltage which is next lowest to the signaled cartridge and is equal to or higher than said first voltage, while disallowing conduction through the switch circuit for the signaled cartridge, and outputs a signal indicating that the signaled cartridge is ready to be withdrawn, or the control circuit, when the signaled cartridge is not discharging, outputs a signal indicating that the signaled cartridge is ready to be withdrawn.

This construction enables the safe withdrawal of a cartridge intended by a user to be removed during discharging from the cartridges of the electricity storage system.

The above-mentioned electricity storage system may have a construction wherein, upon receipt of an input of cartridge withdrawal signal in addition to the charge instruction signal, the cartridge withdrawal signal indicating a user's intention to withdraw any of the cartridges connected in parallel, the control circuit, when the signaled cartridge is being charged, allows conduction through the switch circuit for other cartridge with a sustaining voltage which is next highest to the signaled cartridge and is equal to or lower than the third voltage, while disallowing conduction through the switch circuit for the signaled cartridge, and outputs a signal indicating that the signaled cartridge is ready to be withdrawn, or the control circuit, when the signaled cartridge is not being charged, outputs a signal indicating that the signaled cartridge is ready to be withdrawn.

This construction enables the safe withdrawal of a cartridge intended by a user to be removed during charging of the cartridges of the electricity storage system.

The above-mentioned electricity storage system may have a construction such that the system is operable even when the number of cartridges mounted in the system is (a) which is a positive number obtained by the following formula: (n)−1, wherein (n) is a positive number representing a maximum number of mountable cartridges.

This construction enables the electricity storage system to discharge or be charged even when one of the cartridges of the system is not connected to the system.

The above-mentioned electricity storage system may be provided with covers on the sides of the electricity storage system and the cartridges at connections therebetween so that, when the cartridges are inserted to the electricity storage system, connection portions are exposed to establish electrical connections.

This construction enables the secure and safe connection between the electricity storage system and the cartridges.

The above-mentioned electricity storage system may be provided with wireless power transmission devices on the sides of the electricity storage system and the cartridges at connections therebetween so as to establish transmission and reception of electricity between the electricity storage system and the cartridges without physical contact.

The above-mentioned electricity storage system may be used for general residential houses, shops, buildings, plants, power backup, mega solar power storage, wind power storage, geothermal energy storage, electric vehicles, plug-in hybrid vehicles or hybrid vehicles.

This not only enables the cartridges to be used for stationary purpose but also enables the cartridges to be shared between other devices, so that the electricity charged in the electricity storage system can be supplied to other systems, whereby the electricity charged in the cartridges from natural energy can be effectively utilized.

The above-mentioned electricity storage system may have a construction wherein the system is connected to a local area network to receive weather forecast information, based on which the amount of electricity to be generated by a solar battery in the future is calculated, wherein:

the electricity storage system predicts the amount of output from the solar battery based on the weather forecast information when the result of calculation shows that the term during which the amount of electricity to be generated by the solar battery equals or exceeds half of a rated output is less than the predetermined period of time, and a charging from the grid may not be carried out when the result of calculation shows that the term during which the amount of electricity to be generated by the solar battery equals or exceeds half of a rated output is equal to or more than the predetermined period of time.

This construction enables the establishment of an energy total management system taking a life pattern into consideration, where the electricity storage system is connected to a local area network to receive weather forecast information in order to facilitate efficient use of electricity derived from a solar battery or the grid.

The electricity storage system according to still another embodiment of the present invention comprises a single cartridge or a plurality of cartridges connected together in parallel, each cartridge comprising a plurality of cells connected together, wherein the single cartridge or each of the cartridges independently maintains a voltage convertible to a commercial voltage, and wherein any of the single cartridge or the cartridges which satisfy a predetermined voltage condition are charged with a direct voltage converted from a commercial voltage, or are caused to discharge so that the electricity storage system outputs a commercial voltage.

By this construction, each of the cartridges independently maintains a voltage convertible to a commercial voltage, thereby eliminating the need for equalization to balance energies between the cartridges. Further, this construction enables utmost output from the electricity charged in each cartridge without being influenced by the charged electricity in other cartridges so that the energy charged in each cartridge can be efficiently used. Furthermore, when a plurality of cartridges are used which tends to be selected in many cases over the use of a single cartridge, it becomes possible to lessen the load imposed on each cartridge.

The above-mentioned electricity storage system is provided with one or more sets of:

a switch circuit, a DC-AC inverter with its input node connected with the switch circuit, and a DC-DC converter with its input node connected with an output node of the DC-AC inverter and with its output node connected with the cartridge, each set being provided between a node discharging the commercial voltage and each of the cartridges, wherein the electricity storage system may further comprises a control circuit for controlling each switch circuit to allow or disallow the flow of current.

By this construction, the control circuit controls conduction and non-conduction of the switch circuits respectively provided between the cartridges connected together in parallel and the DC-DC converter, thereby eliminating the need for leveling to balance energies between the cartridges. Further, the cartridge can independently be utilized as an alternate current power supply.

The above-mentioned electricity storage system may have a construction wherein, upon receipt of an input of discharge instruction signal from said electricity storage system, the control circuit selects a cartridge with a sustaining voltage equal to or higher than a predetermined first voltage from among the cartridges connected in parallel, and allows conduction through the switch circuit for the selected cartridge, so that the commercial voltage is output until a sustaining voltage in the cartridge is lowered to a second voltage which is lower than the first voltage.

This construction enables utmost output from the electricity charged in each cartridge without being influenced by the charged electricity in other cartridges so that the energy charged in each cartridge can be efficiently used.

The above-mentioned electricity storage system may have a construction wherein, upon receipt of an input of charge instruction signal from the electricity storage system, the control circuit selects a cartridge with a sustaining voltage equal to or lower than a predetermined third voltage from among the cartridges connected in parallel, and allows conduction through the switch circuit for the selected cartridge, so that the electricity storage system is charged with a commercial voltage until a sustaining voltage in the cartridge is increased to a fourth voltage which is higher than the third voltage.

This construction enables utmost output from the electricity charged in each cartridge without being influenced by the charged electricity in other cartridges so that the energy charged in each cartridge can be efficiently used.

The above-mentioned electricity storage system may have a construction wherein, upon receipt of an input of cartridge withdrawal signal in addition to the discharge instruction signal, the cartridge withdrawal signal indicating a user's intention to withdraw any of the cartridges connected in parallel, the control circuit, when the signaled cartridge is discharging, disallows conduction through the switch circuit for the signaled cartridge, and outputs a signal indicating that the signaled cartridge is ready to be withdrawn, or the control circuit, when the signaled cartridge is not discharging, outputs a signal indicating that the signaled cartridge is ready to be withdrawn.

This construction enables the safe withdrawal of a cartridge intended by a user to be removed during discharging from the cartridges of the electricity storage system.

The above-mentioned electricity storage system may have a construction wherein, upon receipt of an input of cartridge withdrawal signal in addition to the charge instruction signal, the cartridge withdrawal signal indicating a user's intention to withdraw any of the cartridges connected in parallel, the control circuit, when the signaled cartridge is being charged, disallows conduction through the switch circuit for the signaled cartridge, and outputs a signal indicating that the signaled cartridge is ready to be withdrawn, or the control circuit, when the signaled cartridge is not being charged, outputs a signal indicating that the signaled cartridge is ready to be withdrawn.

This construction enables the safe withdrawal of a cartridge intended by a user to be removed during charging of the cartridges of the electricity storage system.

The above-mentioned electricity storage system may have a construction such that the system is operable even when the number of cartridges mounted in the system is (a) which is a positive number obtained by the following formula: (n)–1, wherein (n) is a positive number representing a maximum number of mountable cartridges.

This construction enables the electricity storage system to discharge or be charged even when one of the cartridges of the system is not connected to the system.

The above-mentioned electricity storage system may be provided with covers on the sides of the electricity storage system and the cartridges at connections therebetween so that, when the cartridges are inserted to the electricity storage system, connection portions are exposed to establish electrical connections.

This construction enables the secure and safe connection between the electricity storage system and the cartridges.

The above-mentioned electricity storage system may be provided with wireless power transmission devices on the sides of the electricity storage system and the cartridges at connections therebetween so as to establish transmission and reception of electricity between the electricity storage system and the cartridges without physical contact.

The above-mentioned electricity storage system may be used for general residential houses, shops, buildings, plants, power backup, mega solar power storage, wind power storage, geothermal energy storage, electric vehicles, plug-in hybrid vehicles or hybrid vehicles.

This not only enables the cartridges to be used for stationary purpose but also enables the cartridges to be shared between other devices, so that the electricity charged in the electricity storage system can be supplied to other systems, whereby the electricity charged in the cartridges from natural energy can be effectively utilized.

The above-mentioned electricity storage system may have a construction wherein the system is connected to a local area network to receive weather forecast information, based on which the amount of electricity to be generated by a solar battery in the future is calculated, wherein:

the electricity storage system predicts the amount of output from the solar battery based on the weather forecast information when the result of calculation shows that the term during which the amount of electricity to be generated by the solar battery equals or exceeds half of a rated output is less than the predetermined period of time, and a charging from the grid may not be carried out when the result of calculation shows that the term during which the amount of electricity to be generated by the solar battery equals or exceeds half of a rated output is equal to or more than the predetermined period of time.

This construction enables the establishment of an energy total management system taking a life pattern into consideration, where the electricity storage system is connected to a local area network to receive weather forecast information in order to facilitate efficient use of electricity derived from a solar battery or a solar battery system.

The electricity storage system according to still another embodiment of the present invention comprises a plurality of cartridges connected together in parallel, each cartridge comprising a plurality of cells connected together, wherein each of the cartridges maintains a voltage convertible to a commercial voltage.

This construction enables the electricity storage system to operate even when the number of cartridges mounted in the system is (a) which is a positive number obtained by the following formula: (n)–1, wherein (n) is a positive number representing a maximum number of mountable cartridges (for example, (n)<30). Further, since a plurality of cells are connected together and accommodated in each of the cartridges, the voltage in each of the cartridges can be increased so that the cartridges can maintain a voltage convertible to a commercial voltage. Therefore, even when some of the cartridges are not connected to the system, the electricity stored in the cells can be utilized so that the freedom in utilization of the cartridges is increased and the electricity charged in the cells can be effectively utilized.

The above-mentioned electricity storage system may have a construction such that the system is operable even when the number of cartridges mounted in the system is (a) which is a positive number obtained by the following formula: (n)–1, wherein (n) is a positive number representing a maximum number of mountable cartridges (for example, (n)<30), wherein the mounted cartridges are connected in parallel.

This construction enables the electricity storage system to discharge or be charged even when one of the cartridges of the system is not connected to the system.

In the above-mentioned electricity storage system, the cartridges may have approximately the same shape.

This not only enables the cartridges to be used for stationary purpose but also enables the cartridges to be shared between other devices, so that the electricity charged in the electricity storage system can be supplied to other systems, whereby the electricity charged in the cartridges from natural energy or grid connected power can be effectively utilized.

The above-mentioned electricity storage system may have a construction wherein, when cartridges with different residual capacities are mounted to the system, the cartridges except for one with a less residual capacity output electricity until voltages of all of the cartridges become equal, whereafter all of the cartridges output electricity.

This construction enables the leveling of capacities of the cartridges within the entire system even when cartridges with different residual capacities are mounted to the system.

The above-mentioned electricity storage system may further comprise electricity transfer circuits provided between each pair of cartridges, the electricity transfer circuits enabling transfer of electricity from a cartridge with a more residual capacity to a cartridge with a less residual capacity.

This construction enables the leveling of capacities of the cartridges within the entire system even when cartridges with different residual capacities are mounted to the system.

The above-mentioned electricity storage system may be provided with covers on the sides of the electricity storage system and the cartridges at connections therebetween so that, when the cartridges are inserted to the electricity storage system, connection portions are exposed to establish electrical connections.

This construction enables the secure and safe connection between the electricity storage system and the cartridges.

The above-mentioned electricity storage system may be provided with wireless power transmission devices on the sides of the electricity storage system and the cartridges at connections therebetween so as to establish transmission and reception of electricity between the electricity storage system and the cartridges without physical contact.

The above-mentioned electricity storage system may be used for general residential houses, shops, buildings, plants, power backup, mega solar power storage, wind power storage, geothermal energy storage, electric vehicles, plug-in hybrid vehicles or hybrid vehicles.

This not only enables the cartridges to be used for stationary purpose but also enables the cartridges to be shared between other devices, so that the electricity charged in the electricity storage system can be supplied to other systems, whereby the electricity charged in the cartridges from natural energy can be effectively utilized.

The above-mentioned electricity storage system may have a construction wherein the system is connected to a local area network to receive weather forecast information, based on which the amount of electricity to be generated by a solar battery in the future is calculated, wherein:

the electricity storage system predicts the amount of output from the solar battery based on the weather forecast information when the result of calculation shows that the term during which the amount of electricity to be generated by the solar battery equals or exceeds half of a rated output is less than the predetermined period of time, and a charging from the grid may not be carried out when the result of calculation shows that the term during which the amount of electricity to be generated by the solar battery equals or exceeds half of a rated output is equal to or more than the predetermined period of time.

This construction enables the establishment of an energy total management system taking a life pattern into consideration, where the electricity storage system is connected to a local area network to receive weather forecast information in order to facilitate efficient use of electricity derived from a solar battery or the grid.

In the above-mentioned storage system, the cells connected in the cartridge may exhibit a capacity maintenance ratio of 90% or more at the 100th cycle in a cycle test where the charge and discharge are carried out at 5 C.

In the above-mentioned electricity storage system, the cartridges may have approximately the same shape.

The cells connected in the cartridge used in the above-mentioned storage system may exhibit a capacity maintenance ratio of 90% or more at the 100th cycle in a cycle test where the charge and discharge are carried out at 5 C.

Effects of the Invention

According to one embodiment of the present invention, the battery packs are provided as cartridges so that the cartridges can be used as a power supply for not only stationary purpose but also replacement in other facilities or apparatuses. Thus, electricity can be efficiently utilized.

Particularly, it becomes possible to provide an electricity storage system which is capable of outputting sufficient amount of energy through each cartridge without a need for leveling to balance energies between the cartridges.

In another embodiment of the present invention, a plurality of cartridges can simultaneously and efficiently discharge or be charged. In still another embodiment of the present invention, a circuit for preventing cross current is provided, which restricts the current in each cartridge so as to cause the current to flow in one direction selected from a discharge direction and a charge direction, thereby enabling the prevention of cross current from occurring due to the difference in terminal voltages of the cartridges when simultaneous discharge or charge is carried out with respect to the cartridges.

BRIEF DESCRIPTION OF THE DRAWINGS

FIG. 3 is a table showing specifications of a cell 101 and a cartridge 100.

FIG. 8A is a flowchart explaining the withdrawal of a cartridge from the storage system 6a according to the first embodiment of the present invention during the charge thereof.

FIG. 8B is a flowchart explaining the withdrawal of a cartridge from the storage system 6a according to the first embodiment of the present invention during the charge thereof.

FIG. 22B is a diagram showing the results of the first cycle test of the storage system 6c according to the third embodiment of the present invention.

FIG. 22C is a diagram showing the results of the first cycle test of the storage system 6c according to the third embodiment of the present invention.

FIG. 23A is a diagram showing the results of the second cycle test of the storage system 6c according to the third embodiment of the present invention.

FIG. 23B is a diagram showing the results of the second cycle test of the storage system 6c according to the third embodiment of the present invention.

FIG. 23C is a diagram showing the results of the second cycle test of the storage system 6c according to the third embodiment of the present invention.

EMBODIMENTS FOR CARRYING OUT THE INVENTION

Hereinbelow, the preferred embodiments of the present invention are explained with reference to the drawings annexed hereto.

Figure 1:
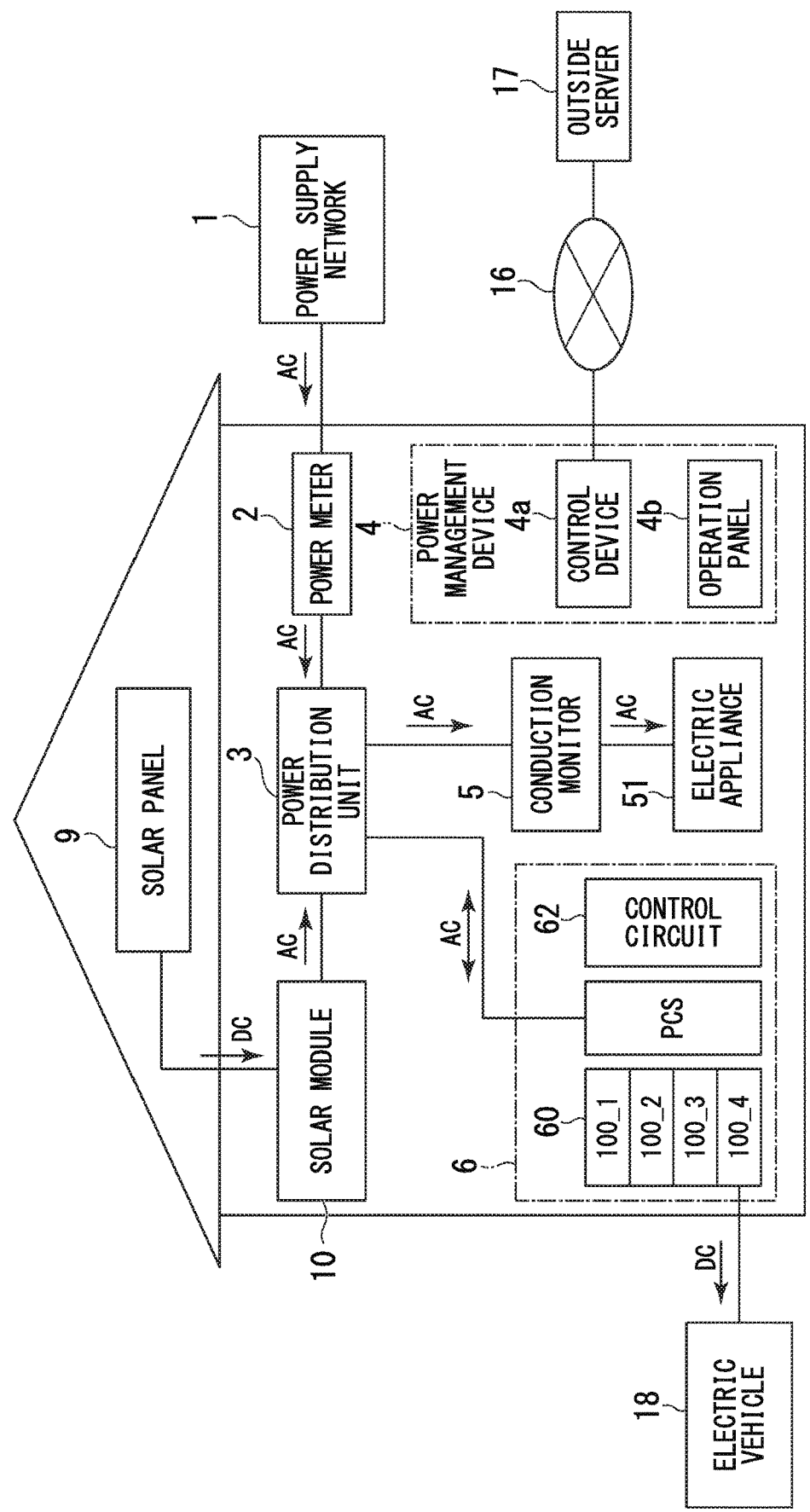
FIG. 1 is a block diagram showing a power system of an electricity control system provided with a storage system 6 according to one embodiment of the present invention.

FIG. 1 is a block diagram showing a power system of a power control system provided with a storage system 6 according to one embodiment of the present invention. With reference to FIG. 1, explanations are made below on one example of a power control system in sectioned areas, e.g., in a residence. FIG. 1 shows a power supply system in a residence, where a direct current (DC) and an alternating current (AC) are shown as types of power. For example, an alternating current of 220 V (60 Hz) flows in a domestic power network. The present invention is not limited to this example and can also be applied to the use in automobiles, etc.

Electricity generated in a power plant is brought through a power supply network 1 to a residence via a power meter 2. Examples of power plants include a thermal power plant, a nuclear power plant, and power plants utilizing natural energies such as sunlight and wind.

The power meter 2 is connected to the system via a power management device 4 (which also serves as a gateway of a domestic power network) and, for example, a wireless LAN (local area network). The power meter 2 performs an accurate measurement of electricity supplied to a residence through the power supply network 1 at a predetermined cycle, and transmits the results by its communication part to the power management device 4 through the wireless LAN. In this instance, the measurement results are transmitted with the information of the times of the measurements. The times of the measurements are based on a common time source for the power network. For example, a reference time generator is provided at somewhere in a power network, e.g., within the power management device 4.

A power distribution unit 3 (plug strip) is supplied with a commercial power brought into a residence through the power meter 2. The power distribution unit 3 is a device having a plurality of power plugs for supplying an alternating current power. The alternating current power is supplied through the power distribution unit 3 to the power management device 4, a conduction monitor 5 and the electricity storage system 6 of the present invention. The power distribution unit 3 supplies an alternating current power through the conduction monitor 5 to electrical appliances 51 such as a television device or lighting. These electric appliances are mentioned for the purpose of example only and, and many more electric appliances are actually used in a house.

The conduction monitor 5 measures the amounts of power consumption at the electric appliances 51 connected thereto at a predetermined cycle, e.g., at every 1 second. The conduction monitor 5 transmits information on the measured amounts of power consumption at the electric appliances and the times of the measurements to the power management device 4 via wireless communication.

The solar panel 9 is composed of solar cells. The solar panel 9 generates a direct current power and supplies the generated power to the solar module 10. The solar module 10 is composed of, for example, a DC-AC inverter. The solar module 10 generates an alternating current power synchronized with a domestic alternating current power and supplies the generated power to the power distribution unit 3. At the distribution unit 3, an alternating current power from the power meter 2, an alternating current power from the solar module 10 and an alternating current power from the storage system 6 are combined together and used as electricity for domestic consumption. Usable power generators are not limited to the solar panel 9, and a wind power generator and the like which utilize a renewable energy for power generation can be also used.

The solar module 10 is connected to the power management device 4 via a wireless LAN. The solar module 10 measures the amounts of a direct current power generated by the solar panel 9 and an alternating current power converted from the direct current power and supplied to the power network. The solar module 10 transmits information on the measured amount of the alternating current power and the times of the measurements to the power management device 4 via wireless communication.

The storage system 6 serves as a domestic electricity storage device, and is provided with, for example, a storage apparatus 60 containing four cartridges 100_1 to 100_4, a PCS (power conditioning system), and a control circuit 62. The control circuit 62, depending on an instruction signal transmitted from the power management device 4 (described below in more detail), controls actions such as charge and discharge of the cartridges 100_1 to 100_4 which are carried out via the PCS. The PCS converts the direct current power stored in the storage system 6 to an alternating current power and outputs the converted alternating current power to the power distribution unit 3. Further, the PCS converts the alternating current power from the power distribution unit 3 to a direct current power and charges the cartridges 100_1 to 100_4. The cartridges 100_1 to 100_4 and the PCS are connected, for example, through a wired interface such as an SPI (serial peripheral Interface).

The storage apparatus 60 has a plurality of electrical connections serving as respective connections where the cartridges 100_1 to 100_4 are inserted or removed. This feature is described later.

The control circuit 62 controls the conditions of the cartridges 100_1 to 100_4 and monitors the safety and reliability of the cartridges. The control circuit 62 is connected to the power management device 4 via a wireless LAN. The power management system 4 always receives information (regarding the amount of stored electricity) on the cartridges 100_1 to 100_4 from the control circuit 62, and transmits a control signal regarding the cartridges 100_1 to 100_4 to the control circuit 62. With respect to each of the cartridges, as described below in detail, the cartridge is constructed such that the cartridge is dismountable from the storage system 6 and the dismounted cartridge can be used for other purpose. That is, the cartridge can be used as a power source for electrical devices such as an electric vehicle 18.

The power management device 4 is constructed to have at least a control device 4a and an operation panel 4b.

Further, the power management device 4 is connected via ADSL (asymmetric digital subscriber line), etc., to an outside server 17 provided on the internet 16.

The control device 4a has various switches on the operation panel 4b which is a user (resident)-settable operation control part, an outside server 17 provided on the internet 16, and an input circuit (not shown in FIG. 1) to which various transmission signals are input from storage systems, etc. Further, the control device 4a is provided with a microcomputer which performs various calculations using signals from the input circuit, and an output circuit which outputs signals for controlling the power meter 2 and the storage system 6 via wireless transmission, based on the calculations performed by the microcomputer. The microcomputer contains a RAM which stores the results of the calculations, and a ROM which stores a pre-set control program or an updatable control program. This microcomputer controls the operation of the below-described storage system 6 etc.

For example, the control device 4a calculates the amount of alternating current power which the solar module 10 can supply, based on a wireless signal from the solar module 10 indicating the direct current power input from the solar panel 9 to the solar module 10. The control device 4a also calculates the amount of alternating current power which the storage system 6 can supply, based on a wireless signal input from the storage system 6 indicating the amount of electricity charged in each cartridge. Further, the control device 4a receives a wireless signal from the conduction monitor 5 indicating the amount of alternating current power required by the electric appliance 51. The control device 4a controls the power meter 2, based on the wireless signals from the devices indicating the respective alternating current powers, to thereby control (e.g., limit) the input of alternating current power from the power supply network 1 to the power distribution unit 3. Alternatively, the control device 4a controls the power distribution unit 3 so as to cause alternating current powers to be supplied from the solar module 10 to the storage system 6, from the power meter 2 to the storage system 6, and from the storage system 6 or the solar module 10 to the electric appliance 51. Further, based on an output signal from the control device 4a, the operation status of the storage system 6 and the capacity of each cartridge are displayed on a display screen provided on the operation panel 4b.

The control device 4a also has a means for predicting the amount of electricity to be generated by the solar panel 9, based on the weather forecast results held at the outside server 17 on the internet 16 and the past record of the domestic electricity generation. The control device 4a also functions as a calculation means for determining the amount of electricity to be stored in the storage system based on the estimated amount of electricity to be generated.

For example, when a user inputs an instruction for bringing the storage system to an operating state through a switch on the operation panel 4b, the control device 4a determines the amount of electricity to be stored during the time when the late night charge is applied, where the determination is made based on factors including the weather forecast results and the amount of electricity stored in the storage system 6. The amount of electricity to be stored can be calculated, for example, by subtracting the residual capacity of the storage system 6 and the amount of electricity to be generated on the next day (estimated amount of electricity to be generated) from the learned value based on the past record of the user's electricity consumption. Then, the amount of electricity to be stored which is calculated by the control device 4a as a calculating means is transmitted wireless to the power meter 2 such that an alternating current power is received from the power supply network 1 during the time when a less expensive late-night charge is applied. The power meter 2 supplies an alternating current power through the power distribution unit 3 to the storage device 6. The control device 4a transmits a wireless communication signal (charge instruction signal) instructing the control circuit 62 of the storage system 6 to convert the current. The storage system 6 converts the alternating current power from the power distribution unit 3 to a direct current power and charges the cartridges 100_1 to 100_4 of the storage system 6.

In the presence of a user's input of an instruction for bringing the storage system to an operating state through a switch on the operation panel 4b, when the solar panel 9 is in a chargeable state during daytime, the control device 4a transmits a wireless communication signal instructing the solar module 10 to convert the current. The control device 4a also transmits a wireless communication signal (charge instruction signal) instructing the control circuit 62 of the storage system 6 to convert the current. The solar module 10 receives a direct current power from the solar panel 9 and converts the direct current power to an alternating current power which is, then, supplied through the power distribution unit 3 to the storage device 6. The PCS of the storage system 6 converts the alternating current power from the power distribution unit 3 to a direct current power and charges the cartridges 100_1 to 100_4.

Further, when a user inputs an instruction for bringing the storage system to an operating state through a switch on the operation panel 4b, the control device 4a for example performs a management such that the alternating current power from the storage system 6 is utilized without exceeding the contract demand (amount of electricity supplied through the power supply network 1). Specifically, the control device 4a outputs a wireless communication signal (discharge instruction signal) instructing the control circuit 62 of the storage system 6 to discharge from the cartridges 100_1 to 100_4. The PCS of the storage system 6 converts the direct current power maintained in the cartridges to an alternating current power and outputs the converted alternating current power to the power distribution unit 3. The power distribution unit 3 supplies an alternating current power through the conduction monitor 5 to electrical appliances 51. For example, when the alternating current power from the solar module 10 and the alternating current from the storage device 6 are more than the electricity consumed by a user for the electric appliances 51, it becomes unnecessary to use the alternating current power supplied from the power supply network 1. Therefore, the power management device 4 can reduce the payment of the electricity fee by controlling the power meter 2 so as not to receive an alternating current power from the power supply network 1. Though not shown in FIG. 1, it is of course possible to employ a construction where the alternating current power from the solar module 10 or the alternating current powers from the solar module 10 as well as the storage system 6 are sold to a power company etc. when, for example, the electric appliances 51 are not in use.

Further, when a user inputs a signal indicating a user's intention to withdraw any of the cartridges of the storage system 6 through a switch on the operation panel 4b, the control device 4a performs the following control. That is, whether the storage system is in a charged stage or in a discharging state, the control device 4a transmits wireless signals to the control circuit 62 of the storage system 6, the signals including a signal instructing the withdrawal of the cartridge and a signal indicating the identification number of the cartridge. The control circuit 62 of the storage system 6 controls the switch circuit (described below) to allow or disallow the flow of current, depending on whether the storage system 6 is discharging or being charged, or on the status of each cartridge (i.e., whether the cartridge is discharging or being charged).

Hereinbelow, the construction of the storage system 6 as characterizing feature of the present invention is described in detail, while explanations will be made later with respect to the details of the controls of the storage system (such as charge, discharge and withdrawal of a cartridge) via the instruction signals from the power management device 4.

Figure 2A:
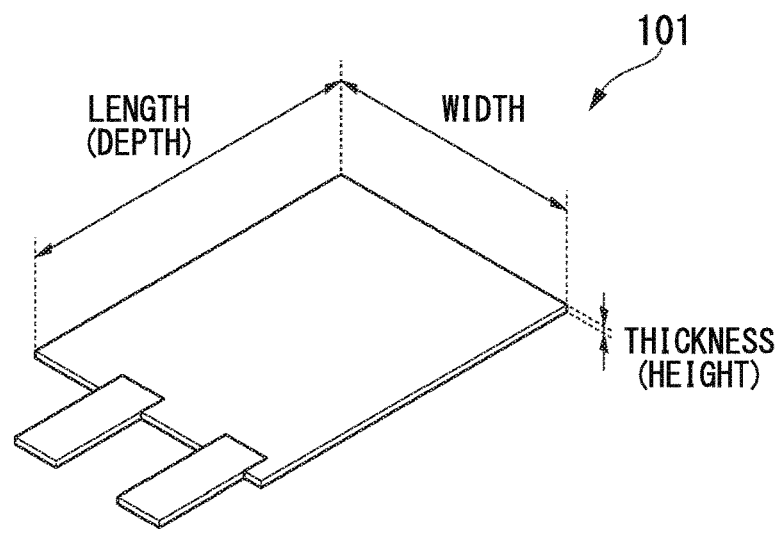
FIG. 2A is a diagram showing an appearance of one example of a cell 101.
Figure 2B:
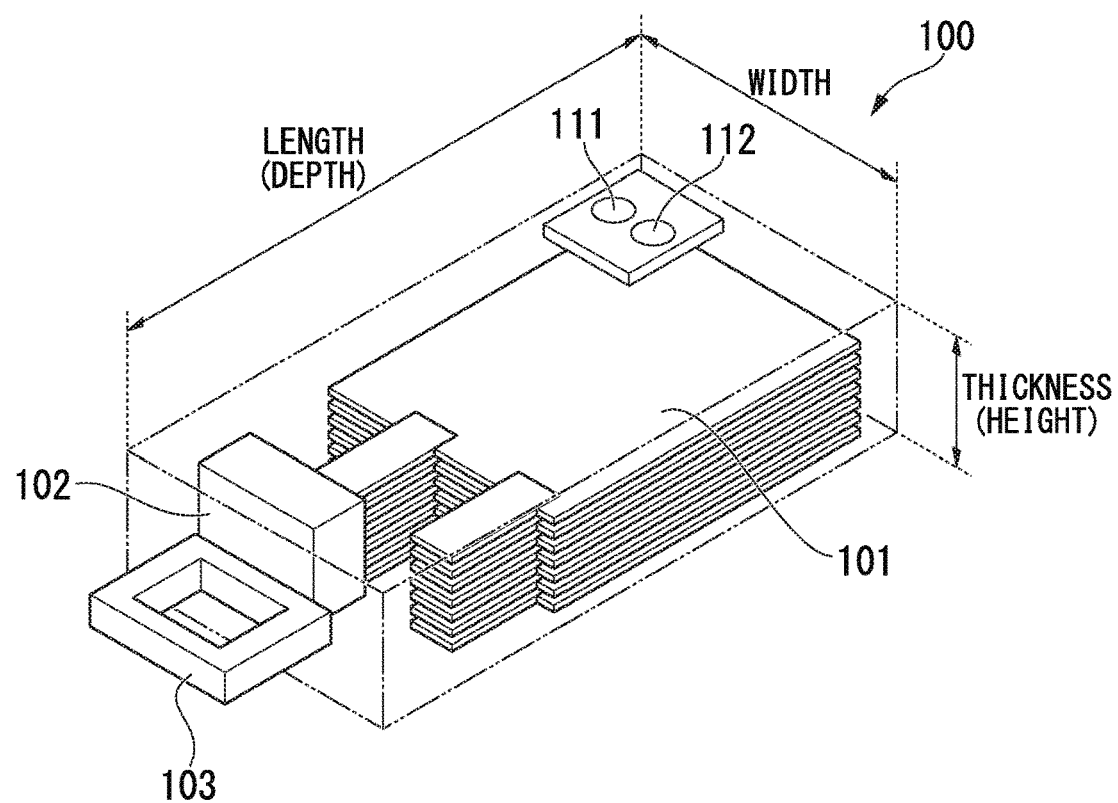
FIG. 2B is a diagram showing an appearance of one example of a cartridge 100.

FIGS. 2A and 2B are diagrams respectively showing an appearance of one example of a cell 101 and an appearance of one example of a cartridge 100. FIG. 3 is a table showing specifications of a cell 101 and a cartridge 100.

The cell 101 has an approximate rectangular parallelepiped shape as shown in FIG. 2A and has, on one side thereof, tabs (a positive electrode terminal and a negative electrode terminal). With respect to the size of the cell 101, as exemplarily shown in FIG. 3, the cell 101 may have a width of about 160 mm, a height (thickness) of about 3 mm, and a length (depth) of about 80 mm. The size of the cell is not limited to this example and may be appropriately determined in accordance of the actual use. For example, for residential and stationary applications, from the viewpoint of the replacement or independent use of a cartridge, it is preferred that the cell has a width around the range of 100 to 300 mm, a height (thickness) around the range of 1 to 10 mm and a length (depth) around the range of 50 to 200 mm, and it is more preferred that the cell has a width around the range of 130 to 180 mm, a height (thickness) around the range of 2 to 5 mm, and a length (depth) around the range of 60 to 100 mm. Alternatively, for use in a large scale system, from the viewpoint of the cell replacement, it is preferred that the cell has a width around the range of 200 to 1,000 mm, a height (thickness) around the range of 5 to 20 mm and a length (depth) around the range of 200 to 1,000 mm, and it is more preferred that the cell has a width around the range of 300 to 700 mm, a height (thickness) around the range of 8 to 15 mm, and a length (depth) around the range of 300 to 700 mm. The shape of the cell is also not limited to that exemplarily shown in FIG. 2A, and the cell may be in the shape of an ellipsoid, a cylinder, a rectangular parallelepiped, a cube, a rhombohedron or a combination of any of these shapes which may be the same or different. From the viewpoint of productivity, it is preferred that the shape of the cell is any of a rectangular parallelepiped, a cube, an ellipsoid, a cylinder or a combination thereof.

The cell 101 as an electricity storage device is composed of any of a lithium ion secondary battery (hereinafter, also referred to as "LiB"), a nickel metal hydride secondary battery, a lead-acid battery, a nickel-cadmium battery, a redox flow battery, a zinc chloride battery, a zinc-bromine battery, a lithium-air battery, an aluminum-air battery, a zinc-air battery, a sodium-sulfur battery, a lithium iron sulfide battery, an air magnesium battery.

The cartridge 100 is composed of a plurality of cells 101. FIG. 2B exemplarily shows a cartridge 100 composed of seventeen (17) cells. In this example, seventeen (17) cells are arranged in parallel and accommodated in the cartridge 100. The tabs of the cells are electrically connected via welding and the whole of the cells including the tabs are accommodated in the casing of the cartridge.

With respect to the size of the cartridge, as exemplarily shown in FIG. 3, the cartridge may have a width of about 200 mm, a height (thickness) of about 50 mm, and a length (depth) of about 120 mm. The size of the cartridge is not limited to this example and may be appropriately determined in accordance of the actual use. For example, for residential and stationary applications, from the viewpoint of the replacement or independent use of a cartridge, it is preferred that the cartridge has a width around the range of 150 to 700 mm, a height (thickness) around the range of 10 to 150 mm and a length (depth) around the range of 75 to 500 mm, and it is more preferred that the cartridge has a width around the range of 200 to 500 mm, a height (thickness) around the range of 30 to 120 mm, and a length (depth) around the range of 100 to 300 mm.

Alternatively, for use in a large scale system, from the viewpoint of installment and maintenance, it is preferred that the cartridge has a width around the range of 300 to 2,000 mm, a height (thickness) around the range of 40 to 300 mm and a length (depth) around the range of 300 to 2,000 mm, and it is more preferred that the cartridge has a width around the range of 300 to 1,500 mm, a height (thickness) around the range of 50 to 150 mm, and a length (depth) around the range of 300 to 1,500 mm.

When the cells are mounted in the cartridge 100, the cells are connected in series in the cartridge 100. Though explanations are made above referring to the example shown in FIG. 2B and FIG. 3 where the cartridge has seventeen (17) cells, the number of cells is not limited to this example, and may be appropriately determined in accordance with the actual use, the required voltage, the amount of power, etc. For example, for residential and stationary applications, from the viewpoint of the grid connection or the independent use of a cartridge, the number of cells is preferably around the range of 10 to 150, more preferably around the range of 15 to 120. For use in a large-scale system, from the viewpoint of the grid connection, the number of cells is preferably around the range of 80 to 300, more preferably around the range of 100 to 250.

In the cartridge 100, a safety circuit 102 is provided. The safety circuit 102 controls the charge-discharge of each cell so as to prevent overcharge or overdischarge. Further, for controlling the charge of cells 101 to be uniform, the cartridge may have provided therein a BMS (battery management system) which is of an active cell balance type or a passive cell balance type. The BMS and the safety circuit are controlled by the control circuit 62 described below; however, further explanation on this point is omitted as not constituting the essential part of the present invention. On the other hand, the BMS may be provided on the side of the storage system, not in the cartridge. In such an instance, a circuit must be incorporated such that the BMS provided on the side of the storage system can detect the voltage of each cell provided inside the cartridge.

The handle 103 is provided on the outside of the cartridge and utilized for mounting or dismounting the cartridge 100 to or from the storage apparatus 60, and for carrying the cartridge. Further, the cartridge 100 is provided with a + (plus) terminal 111 as a positive electrode terminal and a − (minus) terminal 112 as a negative electrode terminal. Through the + terminal 111 and the − terminal 112 of the cartridge 100, a direct current power generated by the cells 101 connected in series can be taken out from the cartridge. Further, the cells connected in series can be charged by applying a direct current voltage between the terminals.

Figure 5:
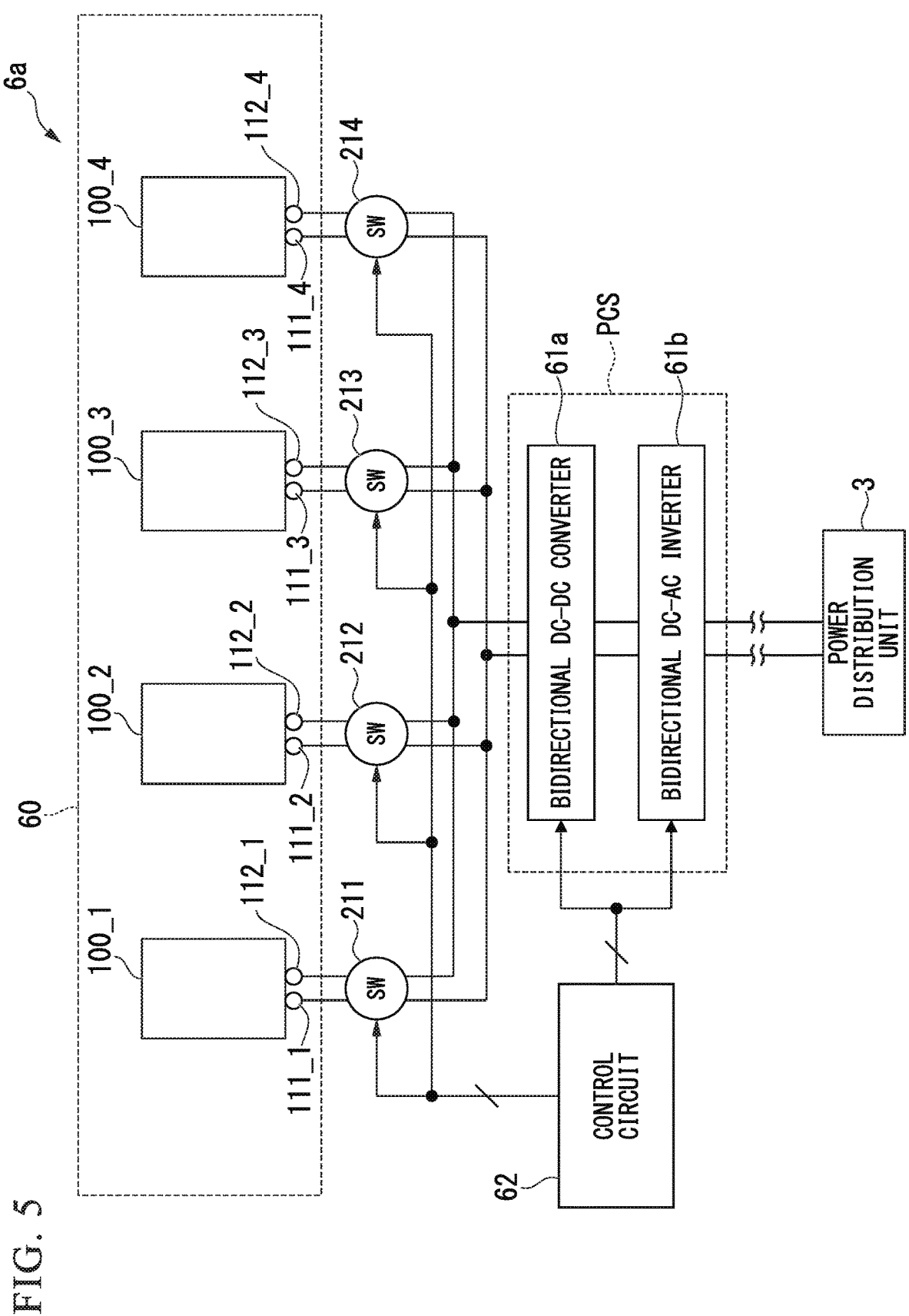
FIG. 5 is a diagram explaining the connections of cartridges 100_1 to 100_4 in a storage system 6a according to the first embodiment of the present invention.

With respect to the aforementioned cartridge 100, cells 101, safety circuit 102, handle 103, + (plus) terminal 111 as a positive electrode terminal and − (minus) terminal 112 as a negative electrode terminal, these are not limited to those shown in FIGS. 2A, 2B and 5, and may be appropriately designed in accordance with the intended use as long as the respective functions as explained above can be performed.

The cartridge 100 is a cartridge-type package containing a plurality of cells 101 connected together. As explained below, the cartridge 100 is a part dismountable from the storage apparatus 60. The weights and rated capacities of the cells 101 and the cartridge 100 are as shown in FIG. 3. In this instance, the capacity of the cell 101 is 11.1 Wh; however, the capacity in the present invention is not limited to this example and may be appropriately determined in accordance with the intended use. For example, for residential and stationary applications, from the viewpoint of the independent use of a cartridge, the capacity of the cell is preferably around the range of 5 to 500 Wh, more preferably around the range of 10 to 300 Wh. For use in a large-scale system, from the viewpoint of the maintenance, the capacity of the cell is preferably around the range of 100 to 5,000 Wh, more preferably around the range of 500 to 3,000 Wh.

Figure 4:
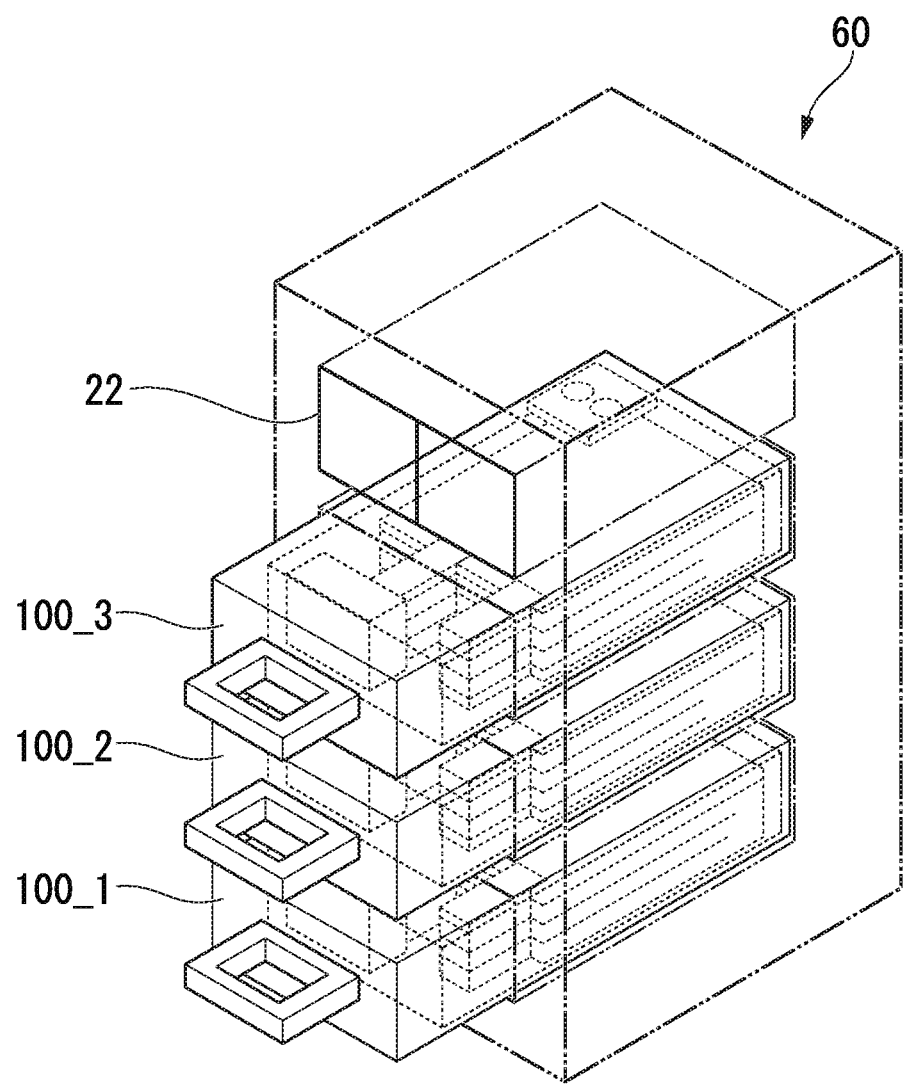
FIG. 4 is a diagram showing an appearance of one example of a storage apparatus 60.

FIG. 4 is a diagram showing an appearance of one example of a storage apparatus 60. In this drawing, a cover 22 which is openable and closable is provided on one side of the storage apparatus 60. This cover 22 opens laterally. Within the cover 22 are provided two terminals as electrical connections (not shown in FIG. 4) through which the input and output of voltage are performed. When the cartridge 100 is inserted to the storage apparatus 60, the cover 22 opens to expose the connection portions on the side of the storage apparatus 60 which are to be connected with the + terminal 111 and the − terminal 112 of the cartridge 100. When the insertion of the cartridge 100 to the storage apparatus 60 is completed, electrical connections are established between the storage apparatus 60 and the cartridge 100 at the connection portions of the storage apparatus 60. In FIG. 4, three (3) cartridges (100_1, 100_2, 100_3) are mounted to the storage apparatus 60.

In this embodiment, maximum four (4) cartridges of approximately the same shape can be connected to the storage apparatus 60. Further, the shape and the capacity may differ between the cartridges as long as the storage apparatus has openings of shapes which allow the reception of such cartridges. The size of the storage apparatus 60 may be appropriately designed to suit the application conditions of the electricity storage system 6, and the storage apparatus 60 may have a size such that more than four (4) cartridges can be connected thereto.

Each of the cartridges is readily mountable and dismountable with respect to the storage apparatus 60 (namely, insertion and withdrawal are easy). In the storage apparatus 60, the cartridges are connected in parallel to the switch circuits described below through a PCS (not shown in FIG. 4). In the present invention, not only is the electricity storage system usable for residential houses, buildings, plants, etc., but the cartridge with the PCS or the cartridge alone can be diverted to use in, for example, an electric vehicle 18 (see FIG. 1). Further, as explained below, the system can be easily maintained by control via the control circuit 62.

The First Embodiment

FIG. 5 is a diagram explaining the connections of cartridges 100_1 to 100_4 in a storage system 6a according to the first embodiment of the present invention.

The storage system 6a according to the first embodiment of the present invention has a storage apparatus 60. SWs (switch circuits 211 to 214) corresponding to the cartridges 100_1 to 100_4 in the storage apparatus 60, a PCS (power conditioning system), and a control circuit 62.

The PCS is comprised of a DC-DC converter 61a and a DC-AC inverter 61b.

The + terminal 111_1 and the − terminal 112_1 of the cartridge 100_1 are connected via the switch circuit 211 to input/output terminals of the DC-DC converter 61a on the side of the storage apparatus 60. The + terminal 111_2 and the − terminal 112_2 of the cartridge 100_2 are connected via the switch circuit 212 to input/output terminals of the DC-DC converter 61a on the side of the storage apparatus 60. The + terminal 111_3 and the − terminal 112_3 of the cartridge 100_3 are connected via the switch circuit 213 to input/output terminals of the DC-DC converter 61a on the side of the storage apparatus 60. The + terminal 111_4 and the − terminal 112_4 of the cartridge 100_4 are connected via the switch circuit 214 to input/output terminals of the DC-DC converter 61a on the side of the storage apparatus 60.

Thus, the cartridges constituting the storage apparatus 60 are connected via the switch circuits provided in correspondence with the respective cartridges to the input/output terminals of the DC-DC converter 61a on the side of the storage apparatus 60.

The control circuit 62 performs the open-close control (on-off control) of the switch circuits 211 to 214 in accordance with the control signals transmitted from the power management device 4, wherein the signals includes a signal instructing discharge, a signal instructing charge, a signal instructing the withdrawal of the cartridge and a signal indicating the identification number of the cartridge.

With respect to the DC-DC converter 61a constituting the PCS, the input/output terminals thereof on the side of the storage apparatus 60 are, as mentioned above, connected via the switch circuits to the cartridges provided in correspondence with the respective switch circuits. Further, with respect to the DC-DC converter 61a, the input/output terminals thereof on a side opposite to the storage apparatus 60 (i.e., terminals on the side of the power distribution unit 3) are connected to the input/output terminals of the DC-AC inverter 61b on the side of the storage apparatus 60.

With respect to the DC-AC inverter 61*b* constituting the PCS, the input/output terminals thereof on the side of the storage apparatus 60 are connected to the input/output terminals of the DC-DC converter 61*a* on the side of the power distribution unit 3, while the input/output terminals (nodes outputting the commercial voltage) of DC-AC inverter 61*b* are connected to the power distribution unit 3.

The control circuit 62 allows the DC-DC converter 61*a* to increase or decrease voltage and allows the DC-AC inverter 61*b* to perform a power conversion operation in accordance with the control signals (a signal instructing discharge and a signal instructing charge) transmitted from the power management device 4.

Specifically, with an input of a signal instructing discharge, the control circuit 62 controls the DC-DC converter 61*a* to increase the direct current voltage input to the input/output terminals thereof (i.e., sustaining voltage of the cartridge) on the side of the storage apparatus 60, and to output the increased direct current voltage (e.g., a direct current voltage of 300 V) to the input/output terminals on the side of the power distribution unit 3. The control circuit 62 also controls the DC-AC inverter 61*b* to convert the direct current voltage input to the input/output terminals thereof on the side of the storage apparatus 60 to an alternating current voltage (e.g., an alternating current voltage of 100 V or 200 V), and to output the alternating current voltage to the input/output terminals on the side of the power distribution unit 3. The alternating current voltage is input to the power distribution unit 3 which, in turn, supplies an operating voltage through, for example, the conduction monitor 5 to the electrical appliances 51. Further, the control of the PCS by the control circuit 62 is performed through the period when an input of a signal instructing discharge is being received.

With an input of a signal instructing charge, the control circuit 62 controls the DC-AC inverter 61*b* to convert the alternating current voltage input to the input/output terminals thereof on the side of the power distribution unit 3 to a direct current voltage, and to output the direct current voltage to the input/output terminals on the side of the storage apparatus 60. The control circuit 62 also controls the DC-DC converter 61*a* to decrease the direct current voltage input to the input/output terminals thereof on the side of the power distribution unit 3, and to output the decreased direct current voltage to the input/output terminals on the side of the storage apparatus 60. Among the cartridges in the storage apparatus 60, one with the corresponding switch circuit being ON transitions into a state of being charged with the supply of the aforementioned direct current voltage. Further, the control of the PCS by the control circuit 62 is performed through the period when an input of a signal instructing charge is being received.

The control circuit 62 also performs the open-close control (nonconduction or conduction) of the switch circuits 211 to 214 in accordance with the control signals transmitted from the power management device 4. Specifically, when the control signal is a signal instructing discharge (i.e., a signal instructing discharge from the storage apparatus 60), the control circuit 62 controls the nonconduction or conduction of the switch circuits 211 to 214 as follows. That is, the control circuit 62 closes (allows conduction of) one of the switch circuits 211 to 214 to establish a connection between the DC-DC converter 61*a* and a cartridge corresponding to the conducting (ON) switch circuit. In the absence of both a signal instructing charge and a signal instructing discharge (i.e., in a default condition), the control circuit 62 leaves all of the switch circuits 211 to 214 open (nonconducting, OFF).

When the control signal is a signal instructing discharge, the control circuit 62 follows the preset procedure as described below as to the conditions for the selection of a cartridge to be connected to the DC-DC converter 61*a* and the priority of the cartridges to be selected. Specifically, from the cartridges 100_1 to 100_4, the control circuit 62 selects a cartridge which, for example, outputs 52 V or higher (the first voltage or higher) as the sustaining voltage. The control circuit 62 always monitors the voltages of all of the cartridges and controls the conduction or nonconduction (ON/OFF) of the switch circuits in accordance with the voltages of the cartridges.

The control circuit 62 performs the following ON/OF operation (selection operation). From among the cartridges having voltages of 52 V or higher, a cartridge is selected in the order of from the cartridge having the highest voltage to the cartridge having the lowest voltage, and the switch circuit is turned on which corresponds to the selected cartridge and turned off when the voltage of the cartridge becomes low. That is, with respect to the cartridges having voltages of 52 V or higher, the control circuit 62 sequentially performs an operation (selection operation) to turn on a switch circuit corresponding to a certain cartridge and turn off the switch circuit when the voltage of the cartridge becomes low. Specifically, the control circuit 62 monitors the voltages of the cartridges connected to the DC-DC converter 61*a*, and turns off a switch circuit when the voltage of the corresponding cartridge becomes, for example, 51 V or lower (the second voltage or lower). Then, the control circuit 62 turns on a switch circuit corresponding to a cartridge having a voltage next highest to the voltage of the previously selected cartridge and maintains the ON state of the switch circuit until the voltage of the corresponding cartridge connected to the DC-DC converter 61*a* becomes 51 V or lower. Thereafter, the control circuit 62 repeats the ON/OFF operation of the switch circuits until there is left no cartridge having a voltage of 52 V or higher.

In the meantime, when the control signal is a signal instructing charge (i.e., a signal instructing charge of the storage apparatus 60), the control circuit 62 performs the following control. That is, the control circuit 62 turns on one of the switch circuits 211 to 214 to establish a connection between the DC-DC converter 61*a* and a cartridge corresponding to the turned-on switch circuit.

When the control signal is a signal instructing charge, the control circuit 62 follows the preset procedure as described below as to the conditions for the selection of a cartridge to be connected to the DC-DC converter 61*a* and the priority of the cartridges to be selected.

Specifically, from the cartridges 100_1 to 100_4, the control circuit 62 selects a cartridge which, for example, outputs 69 V or lower (the third voltage or lower) as the sustaining voltage.

The control circuit 62 performs the following ON/OF operation (selection operation). From among the cartridges having voltages of 69 V or lower, a cartridge is selected in the order of from the cartridge having the highest voltage to the cartridge having the lowest voltage, and the switch circuit is turned on and off which corresponds to the selected cartridge. That is, with respect to the cartridges having voltages of 69 V or lower, the control circuit 62 sequentially performs an operation (selection operation) to turn on a switch circuit corresponding to a certain cartridge and turn off the switch circuit when the voltage of the cartridge becomes high. Specifically, the control circuit 62 monitors the voltages of the cartridges connected to the DC-DC converter 61a, and turns off a switch circuit when the voltage of the corresponding cartridge becomes, for example, 70 V or higher (the fourth voltage or higher). Then, the control circuit 62 turns on a switch circuit corresponding to a cartridge having a voltage next highest to the voltage of the previously selected cartridge and maintains the ON status of the switch circuit until the voltage of the corresponding cartridge connected to the DC-DC converter 61a becomes 70 V or higher. Thereafter, the control circuit 62 repeats the ON/OFF operation of the switch circuits until there is left no cartridge having a voltage of 69 V or lower. Further, a plurality of cartridges may be simultaneously operated.

When the control signal input from the power management device 4 represents a signal instructing withdrawal of a cartridge and a signal indicating the identification number of the cartridge, the control circuit 62 performs the following control.

As mentioned above, the control circuit 62 always monitors the voltages of all of the cartridges and transmits information on the voltages of the cartridges to the power management device 4. The information on the voltages of the cartridges is available to the user through a display device provided on the operation panel 4b. Further, when the storage system 6a is not in operation, the control circuit 62 leaves all of the switch circuits OFF (i.e., in a default condition). At such a time when the storage system 6a is not in operation, a user can safely withdraw any cartridge from the storage apparatus.

On the other hand, when the storage system 6a is in operation, there may be a case where the cartridge intended by a user to be removed is being charged or discharging. In such an instance, the control circuit 62 switches the target of charge or discharge to another cartridge while the cartridge intended by a user to be removed is being charged or discharging. After switching the target of charge or discharge to another cartridge, the control circuit 62 outputs a signal indicating that the cartridge intended by the user to be removed is ready to be withdrawn, and transmits the signal to the power management device 4. The power management device 4 displays on the display screen of the operation panel 4b an indication that the cartridge is ready to be withdrawn, thereby enabling the user to safely withdraw an intended cartridge from the storage apparatus 60.

Next, explanations are made with respect to the control of the charge/discharge of the cartridges and the open-close control of the switch circuits in the construction shown in FIG. 5, referring to FIGS. 6 to 9B.

Figure 6:
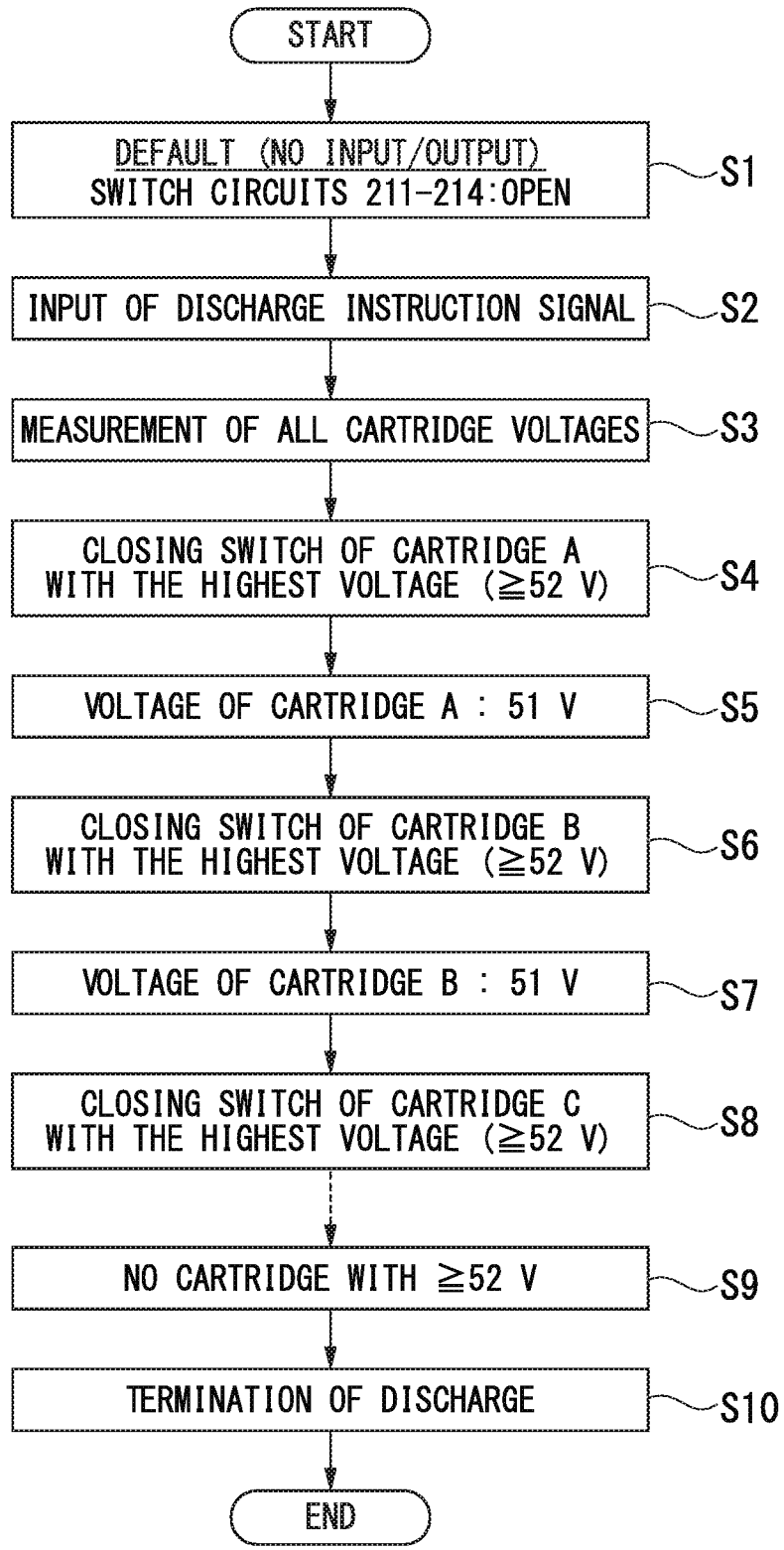
FIG. 6 is a flowchart explaining the discharge from the storage system 6a according to the first embodiment of the present invention.

FIG. 6 is a flowchart explaining the discharge from the storage system 6a according to the first embodiment of the present invention.

In FIG. 6, each of "Cartridge A", "Cartridge B" and "Cartridge C" means any one of cartridges 100_1 to 100_4 shown in FIG. 5.

In the absence of both a discharge instruction signal and a charge instruction signal from the power management device 4, the control circuit 62 leaves all of the switch circuits 211 to 214 open (nonconducting, OFF) (step S1). In this status, with an input of a charge or discharge instruction signal from the power management device 4, it is possible, as needed, to perform a discharge from the cartridge (power supply to the power distribution unit 3) or a charge of the cartridge.

With an input of a discharge instruction signal from the power management device 4, the control circuit 62 moves to the phase of selection of a cartridge in the storage apparatus 60 and operation to supply an alternating current voltage to the power distribution unit 3 (step S2).

The control circuit 62 measures the cartridge voltage (output voltage) in each of the cartridges 100_1 to 100_4 (step S3). Based on the results of the measurement of the cartridge voltages, the control circuit 62 determines the order of conduction of the switch circuits connected to the cartridges. Explanations are made here on the assumption that each of Cartridge A, Cartridge B and Cartridge C has a cartridge voltage of 52 V (the first voltage) or higher, and the cartridge voltage is lower in the order of Cartridge A, Cartridge B and Cartridge C.

The control circuit 62 allows conduction of a switch circuit corresponding to Cartridge A having the highest voltage (step S4). Specifically, the control circuit 62 connects the cartridge A with the DC-DC converter 61a. The control circuit 62 also controls the DC-DC converter 61a to increase the direct current voltage input from Cartridge A to, for example, a direct current voltage of 300 V. The control circuit 62 also controls the DC-AC inverter 61b to convert the direct current voltage input from the DC-DC converter 61a to an alternating current voltage of, for example, 100 V or 200 V. The alternating current voltage is input to the power distribution unit 3 which, in turn, supplies an operating voltage through, for example, the conduction monitor 5 to the electrical appliances 51.

The control circuit 62 monitors the output voltage of Cartridge A connected to the DC-DC converter 61a, and turns off a switch circuit corresponding to Cartridge A when the voltage of Cartridge A becomes, for example, 51 V (the second voltage) or lower (step S5).

Then, the control circuit 62 turns on a switch circuit corresponding to Cartridge B having a voltage next highest to Cartridge A (step S6) and maintains the ON state of the switch circuit until the voltage of Cartridge B becomes 51 V or lower. The control circuit 62 monitors the output voltage of Cartridge B connected to the DC-DC converter 61a, and turns off a switch circuit corresponding to Cartridge B when the voltage of Cartridge B becomes 51 V or lower (step S7).

Then, the control circuit 62 turns on a switch circuit corresponding to Cartridge C having a voltage next highest to Cartridge B (step S8) and maintains the ON state of the switch circuit until the voltage of Cartridge C becomes 51 V or lower. The control circuit 62 monitors the output voltage of Cartridge C connected to the DC-DC converter 61a, and turns off a switch circuit corresponding to Cartridge C when the voltage of Cartridge C becomes 51 V or lower. Thereafter, with respect to the cartridges with their voltages measured in step S3, operations corresponding to steps S4 and S5 or operations corresponding to steps S6 and S7 are repeated until there is left no cartridge having a voltage of 52 V (the first voltage) or higher.

When the control circuit 62 judges that there is no cartridge having a voltage of 52 V (the first voltage) or higher (step S9), the control circuit 62 terminates an operation of discharge from the cartridges (step S10). Further, a plurality of cartridges may be simultaneously operated.

Specifically, the control circuit 62 inactivates the PCS and, for example, outputs a signal indicating the termination of discharge, which is transmitted to the power management device 4. The power management device 4 in turn displays on the display device provided on the operation panel 4b an indication that the operation of discharge from the storage system 6a is terminated. Alternatively, it is also possible to employ a construction such that the power management device 4 displays an indication that the storage system 6a is discharging during the period from the time of output of a discharge instruction signal from the power management device 4 to the storage system 6a to the time of termination of the discharge.

Figure 7:
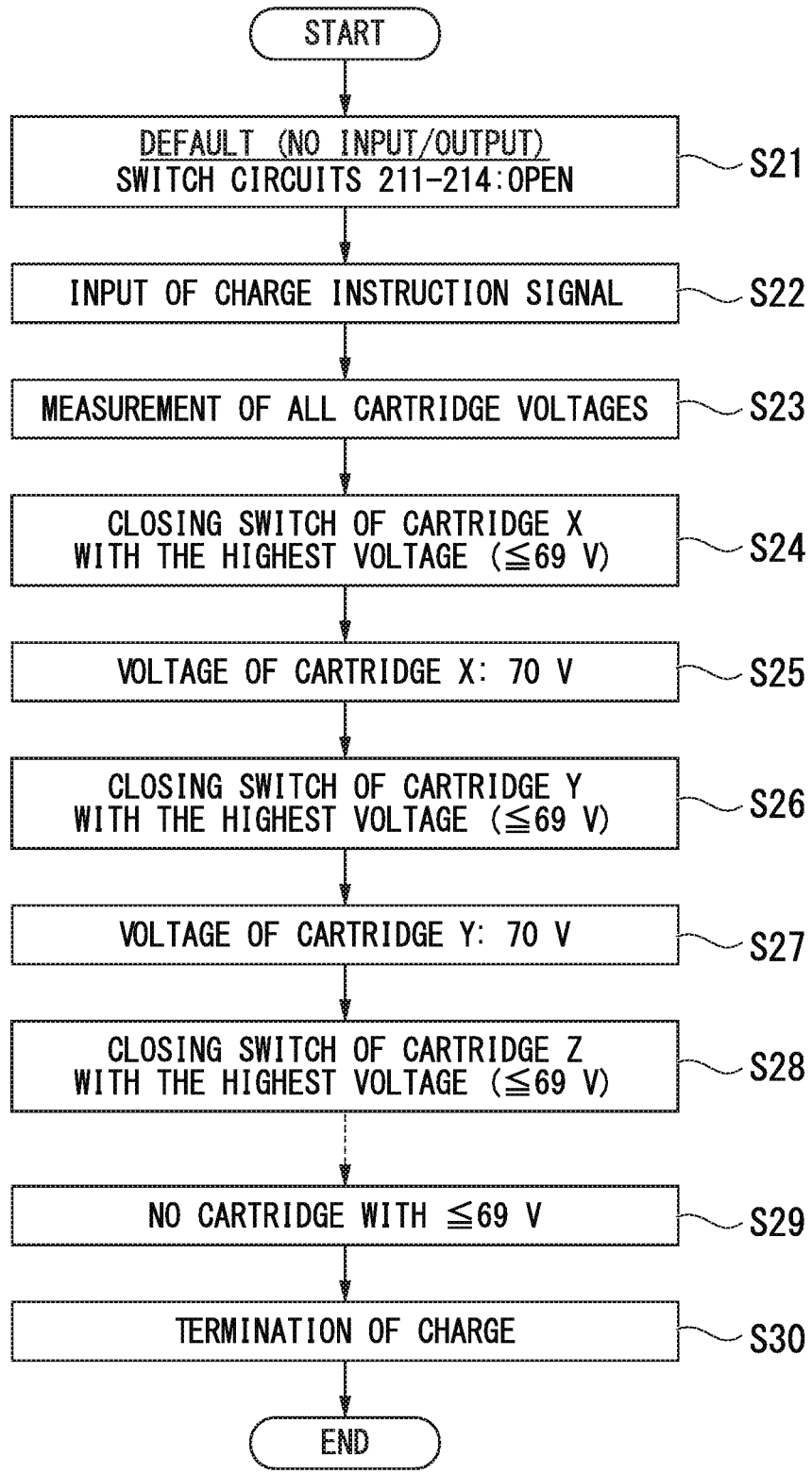
FIG. 7 is a flowchart explaining the charge to the storage system 6a according to the first embodiment of the present invention.

Next, explanations are made on the method of charging the storage system 6a. FIG. 7 is a flowchart explaining the charge to the storage system 6a according to the first embodiment of the present invention. In FIG. 7, each of "Cartridge X", "Cartridge Y" and "Cartridge Z" means any one of cartridges 100_1 to 100_4 shown in FIG. 5.

In the absence of both a discharge instruction signal and a charge instruction signal from the power management device 4, the control circuit 62 leaves all of the switch circuits 211 to 214 in an OFF state (step S21).

With an input of a charge instruction signal from the power management device 4, the control circuit 62 moves to the phase of selection of a cartridge in the storage apparatus 60 and operation to supply a direct current voltage to the selected cartridge (step S22).

The control circuit 62 measures the cartridge voltage in each of the cartridges 100_1 to 100_4 (step S23). Based on the results of the measurement of the cartridge voltages, the control circuit 62 determines the order of conduction of the switch circuits connected to the cartridges. Explanations are made here on the assumption that each of Cartridge X, Cartridge Y and Cartridge Z has a cartridge voltage of 69 V (the third voltage) or lower, and the cartridge voltage is lower in the order of Cartridge X, Cartridge Y and Cartridge Z.

The control circuit 62 allows conduction of a switch circuit corresponding to Cartridge X having the highest voltage (step S24). Specifically, the control circuit 62 connects the cartridge X with the DC-DC converter 61a. The control circuit 62 also controls the DC-AC inverter 61b to convert the alternating current voltage input from the power distribution unit 3 to a direct current voltage. The control circuit 62 also controls the DC-DC converter 61a to decrease the direct current voltage input from DC-AC inverter 61b to, for example, a direct current voltage of 70 V which is then output to Cartridge X via an ON-state switch circuit. Each of the cells connected in series in Cartridge X transitions to a state of being charged at about 4.15 V. Further, a plurality of cartridges may be simultaneously operated.

The control circuit 62 monitors the output voltage of Cartridge X connected to the DC-DC converter 61a, and turns off a switch circuit corresponding to Cartridge X when the voltage of Cartridge X becomes, for example, 70 V (the fourth voltage) or higher (step S25).

Then, the control circuit 62 turns on a switch circuit corresponding to Cartridge Y having a voltage next highest to Cartridge X (step S26) and maintains the ON state of the switch circuit until the voltage of Cartridge Y becomes 70 V or higher. The control circuit 62 monitors the output voltage of Cartridge Y connected to the DC-DC converter 61a, and turns off a switch circuit corresponding to Cartridge Y when the voltage of Cartridge Y becomes 70 V or higher (step S27).

Then, the control circuit 62 turns on a switch circuit corresponding to Cartridge Z having a voltage next highest to Cartridge Y (step S28) and maintains the ON state of the switch circuit until the voltage of Cartridge Z becomes 70 V or higher. The control circuit 62 monitors the output voltage of Cartridge Z connected to the DC-DC converter 61a, and turns off a switch circuit corresponding to Cartridge Z when the voltage of Cartridge Z becomes 70 V or higher. Further, a plurality of cartridges may be simultaneously operated.

Thereafter, with respect to the cartridges with their voltages measured in step S23, operations corresponding to steps S24 and S25 or operations corresponding to steps S26 and S27 are repeated until there is left no cartridge having a voltage of 69 V (the third voltage) or lower. When the control circuit 62 judges that there is no cartridge having a voltage of 69 V (the third voltage) or lower (step S29), the control circuit 62 terminates an operation of charging the cartridges (step S30).

Specifically, the control circuit 62 inactivates the PCS and, for example, outputs a signal indicating the termination of charge, which is transmitted to the power management device 4.

The power management device 4 in turn displays on the display device provided on the operation panel 4b an indication that the operation of charging the storage system 6a is terminated. Alternatively, it is also possible to employ a construction such that the power management device 4 displays an indication that the storage system 6a is being charged during the period from the time of output of a charge instruction signal from the power management device 4 to the storage system 6a to the time of termination of charging.

Next, explanations are made on the method of withdrawing a cartridge during the charging of the storage system 6a. FIGS. 8A and 8B are diagrams explaining the method of withdrawing a cartridge during the charging of the storage system 6a according to the first embodiment of the present invention. In FIGS. 8A and 8B, each of "Cartridge X" and "Cartridge Y" means any one of cartridges 100_1 to 100_4 shown in FIG. 5. FIG. 8A shows a process to be performed when a signal instructing the withdrawal of the cartridge and a signal indicating the identification number of Cartridge Y are input to the control circuit 62 during the charging of Cartridge X. FIG. 8B shows a process to be performed when a signal instructing the withdrawal of the cartridge and a signal indicating the identification number of Cartridge X are input to the control circuit 62 during the charging of Cartridge X.

First, explanations are made with reference to FIG. 8A on the process to be performed when a signal instructing the withdrawal of the cartridge and a signal indicating the identification number of Cartridge Y are input to the control circuit 62 during the charging of Cartridge X.

In the absence of both a discharge instruction signal and a charge instruction signal from the power management device 4, the control circuit 62 leaves all of the switch circuits 211 to 214 open (nonconducting, OFF) (step S31).

With an input of a charge instruction signal from the power management device 4, the control circuit 62 moves to the phase of selection of a cartridge in the storage apparatus 60 and operation to supply a direct current voltage to the selected cartridge (step S32).

The control circuit 62 measures the cartridge voltage (output voltage) in each of the cartridges 100_1 to 100_4 (step S23). Based on the results of the measurement of the cartridge voltages, the control circuit 62 determines the order of conduction of the switch circuits connected to the cartridges. Explanations are made here on the assumption that each of Cartridge X and Cartridge Y has a cartridge voltage of 69 V (the third voltage) or lower, and the cartridge voltage is higher in Cartridge X than Cartridge Y.

The control circuit 62 allows conduction of a switch circuit corresponding to Cartridge X having the highest voltage (step S34). Specifically, the control circuit 62 connects Cartridge X with the DC-DC converter 61a. The control circuit 62 also controls the DC-AC inverter 61b to convert the alternating current voltage input from the power distribution unit 3 to a direct current voltage. The control circuit 62 also controls the DC-DC converter 61a to decrease the direct current voltage input from DC-AC inverter 61b to, for example, a direct current voltage of 70 V which is then output to Cartridge X via an ON-state switch circuit. Each of the cells connected in series in Cartridge X transitions to a state of being charged at about 4.15 V.

The control circuit 62 monitors the output voltage of Cartridge X connected to the DC-DC converter 61a, and turns off a switch circuit corresponding to Cartridge X when the voltage of Cartridge X becomes, for example, 70 V (the fourth voltage) or higher. A user inputs an instruction to withdraw Cartridge Y via the operation panel 4b of the power management device 4 by the time when the voltage of Cartridge X reaches 70 V. A signal instructing the withdrawal of the cartridge and a signal indicating the identification number of Cartridge Y are input to the control circuit 62 (step S35).

The control circuit 62 first excludes Cartridge Y from the cartridges determined in step S33 as target for charge. Specifically, as a cartridge to be charged after Cartridge X, the control circuit 62 selects a cartridge having a voltage next highest to the voltage of Cartridge Y.

Then, with Cartridge Y not being charged, the control circuit 62 outputs a signal indicating that Cartridge Y is ready to be withdrawn, and transmits the signal to the power management device 4 (step S36). The power management device 4 in turn displays on the display device provided on the operation panel 4b an indication that Cartridge Y is ready to be withdrawn from the storage system 6a. The user can withdraw Cartridge Y safely because Cartridge Y is excluded from the cartridges as target of charge and is not connected to the DC-DC converter 61a (step S37). Thereafter, an operation of step S25 and subsequent operations shown in FIG. 7 are performed. However, in these operations, a cartridge having a voltage next lowest to the voltage of Cartridge Y is charged because Cartridge Y is excluded from the cartridges as target of charge. The charging of the cartridges is performed until there is left no cartridge having a voltage of 69 V or lower, and then terminated.

Next, explanations are made with reference to FIG. 8B on the process to be performed when a signal instructing the withdrawal of the cartridge and a signal indicating the identification number of Cartridge X are input to the control circuit 62 during the charging of Cartridge X.

In the absence of both a discharge instruction signal and a charge instruction signal from the power management device 4, the control circuit 62 leaves all of the switch circuits 211 to 214 open (nonconducting, OFF) (step S41).

With an input of a charge instruction signal from the power management device 4, the control circuit 62 moves to the phase of selection of a cartridge in the storage apparatus 60 and operation to supply a direct current voltage to the selected cartridge (step S42).

The control circuit 62 measures the cartridge voltage (output voltage) in each of the cartridges 100_1 to 100_4 (step S43). Based on the results of the measurement of the cartridge voltages, the control circuit 62 determines the order of conduction of the switch circuits connected to the cartridges. Explanations are made here on the assumption that each of Cartridge X and Cartridge Y has a cartridge voltage of 69 V (the third voltage) or lower, and the cartridge voltage is higher in Cartridge X than Cartridge Y.

The control circuit 62 allows conduction of a switch circuit corresponding to Cartridge X having the highest voltage (step S44). Specifically, the control circuit 62 connects the Cartridge X with the DC-DC converter 61a. The control circuit 62 also controls the DC-AC inverter 61b to convert the alternating current voltage input from the power distribution unit 3 to a direct current voltage. The control circuit 62 also controls the DC-DC converter 61a to decrease the direct current voltage input from DC-AC inverter 61b to, for example, a direct current voltage of 70 V which is then output to Cartridge X via an ON-state switch circuit. Each of the cells connected in series in Cartridge X transitions to a state of being charged at about 4.15 V.

The control circuit 62 monitors the output voltage of Cartridge X connected to the DC-DC converter 61a, and turns off a switch circuit corresponding to Cartridge X when the voltage of Cartridge X becomes, for example, 70 V (the fourth voltage) or higher. A user inputs an instruction to withdraw Cartridge X via the operation panel 4b of the power management device 4 by the time when the voltage of Cartridge X reaches 70 V. A signal instructing the withdrawal of the cartridge and a signal indicating the identification number of Cartridge X are input to the control circuit 62 (step S45).

Then, the control circuit 62 closes (allows conduction of or turns "ON") a switch circuit corresponding to Cartridge Y to be charged after Cartridge X and connects Cartridge Y to the DC-DC converter 61a (step S46). Each of the cells connected in series in Cartridge Y transitions to a state of being charged at about 4.15 V.

Then, the control circuit 62 opens (disallows conduction of or turns "OFF") a switch circuit corresponding to Cartridge X and disconnects Cartridge X from the DC-DC converter 61a (step S47). Here, the order of steps S46 and S47 may be reversed. By reversing the order of these steps, it becomes possible to suppress the cross current from occurring due to the difference in cartridge voltage between Cartridge X and Cartridge Y.

Then, with Cartridge X not being charged, the control circuit 62 outputs a signal indicating that Cartridge X is ready to be withdrawn, and transmits the signal to the power management device 4 (step S48). The power management device 4 in turn displays on the display device provided on the operation panel 4b an indication that Cartridge X is ready to be withdrawn from the storage system 6a.

The user can withdraw Cartridge X safely because Cartridge X is excluded from the cartridges as target of charge and is not connected to the DC-DC converter 61a (step S49). Thereafter, an operation of step S27 and subsequent operations shown in FIG. 7 are performed. In these operations, a cartridge having a voltage next highest to the voltage of Cartridge Y is charged. The charging of the cartridges is performed until there is left no cartridge having a voltage of 69 V or lower, and then terminated.

Figure 9A:
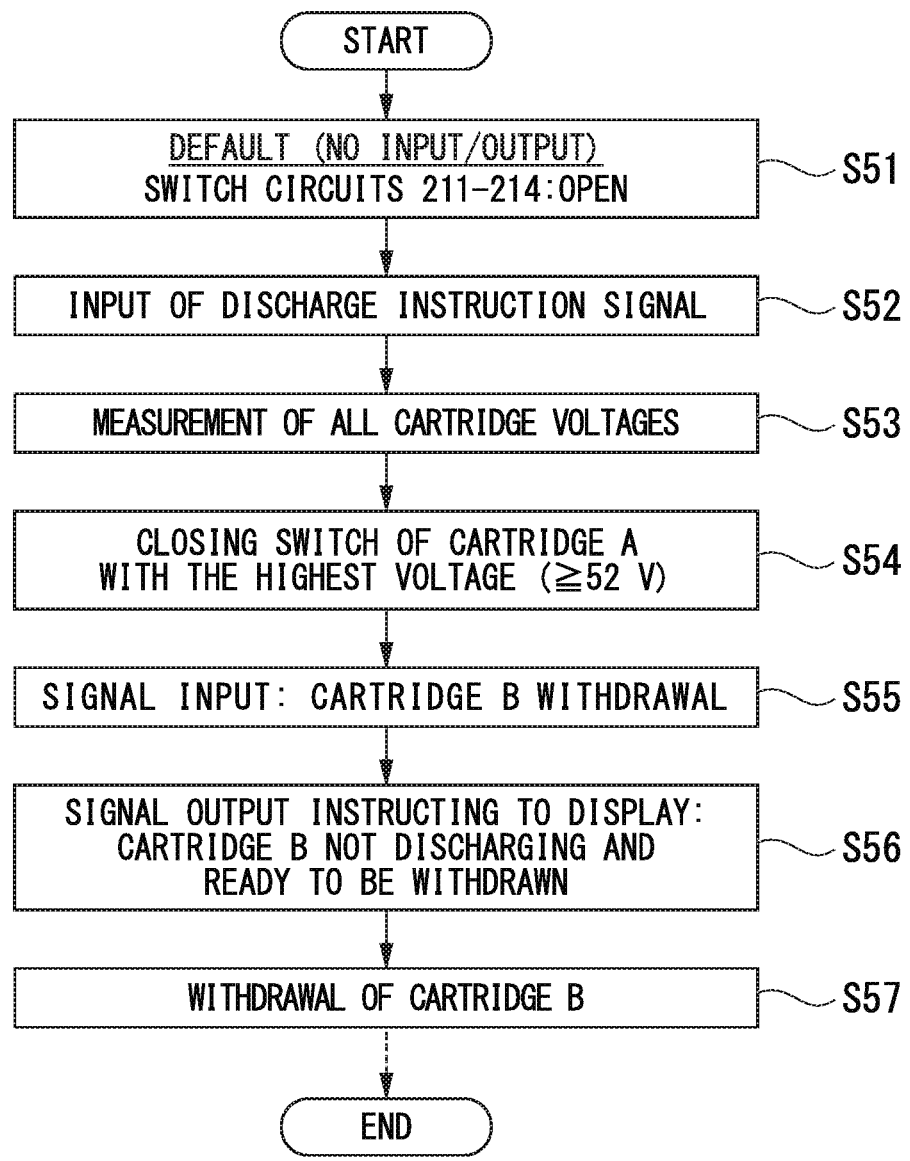
FIG. 9A is a flowchart explaining the withdrawal of a cartridge from the storage system 6a according to the first embodiment of the present invention during the discharge thereof.
Figure 9B:
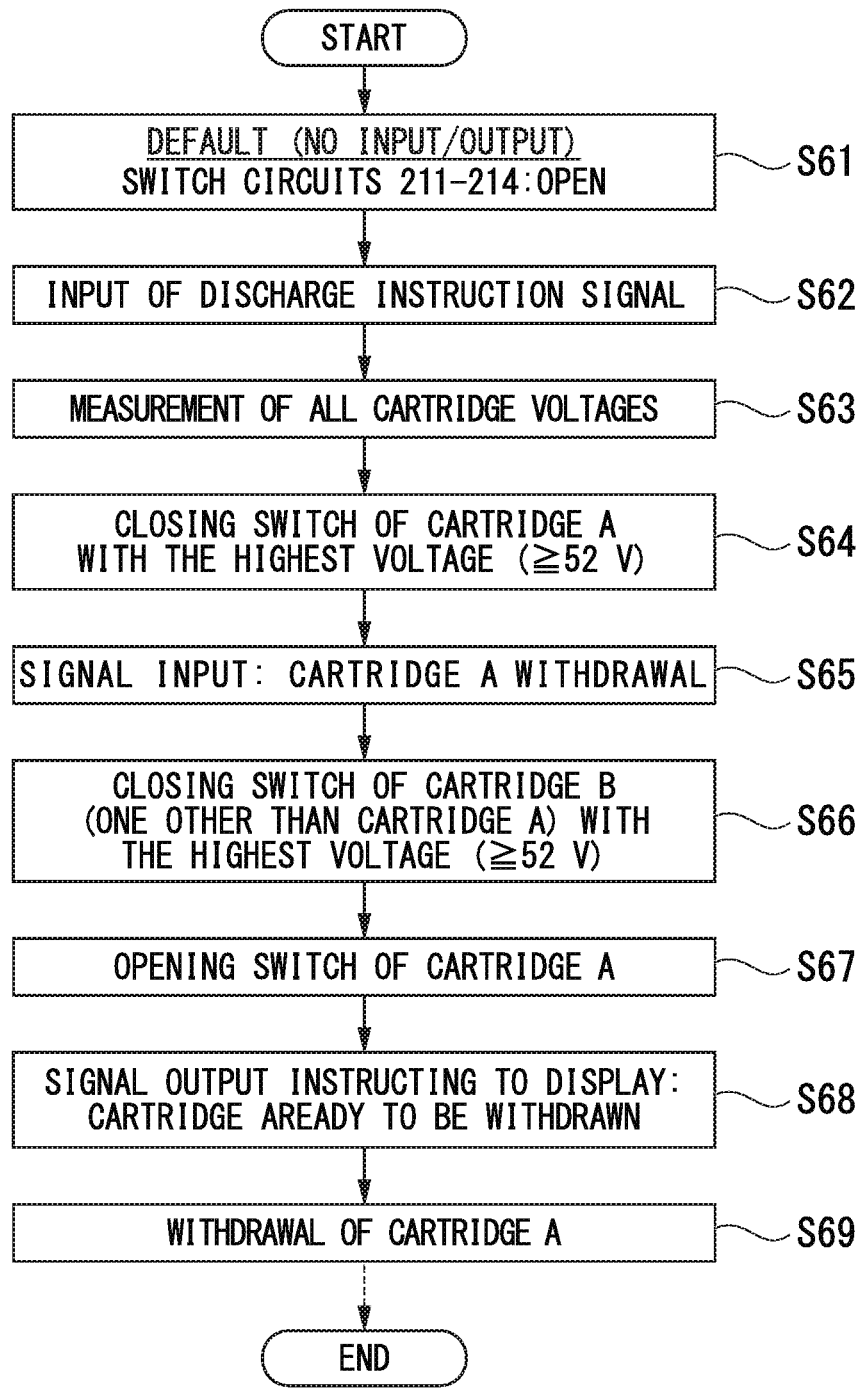
FIG. 9B is a flowchart explaining the withdrawal of a cartridge from the storage system 6a according to the first embodiment of the present invention during the discharge thereof.

Next, explanations are made on the method of withdrawing a cartridge during the discharge of the storage system 6a. FIGS. 9A and 9B are diagrams explaining the method of withdrawing a cartridge during the discharge of the storage system 6a according to the first embodiment of the present invention. In FIGS. 9A and 9B, each of "Cartridge A" and "Cartridge B" means any one of cartridges 100_1 to 100_4 shown in FIG. 5.

FIG. 9A shows a process to be performed when a signal instructing the withdrawal of the cartridge and a signal indicating the identification number of Cartridge B are input to the control circuit 62 during the discharge of Cartridge A. FIG. 9B shows a process to be performed when a signal instructing the withdrawal of the cartridge and a signal indicating the identification number of Cartridge A are input to the control circuit 62 during the discharge of Cartridge A.

First, explanations are made with reference to FIG. 9A on the process to be performed when a signal instructing the withdrawal of the cartridge and a signal indicating the identification number of Cartridge B are input to the control circuit 62 during the discharge of Cartridge A.

In the absence of both a discharge instruction signal and a charge instruction signal from the power management device 4, the control circuit 62 leaves all of the switch circuits 211 to 214 open (nonconducting, OFF) (step S51).

With an input of a discharge instruction signal from the power management device 4, the control circuit 62 moves to the phase of selection of a cartridge in the storage apparatus 60 and operation to supply an alternating current voltage to the power distribution unit 3 (step S52).

The control circuit 62 measures the cartridge voltage (output voltage) in each of the cartridges 100_1 to 100_4 (step S53). Based on the results of the measurement of the cartridge voltages, the control circuit 62 determines the order of conduction of the switch circuits connected to the cartridges. Explanations are made here on the assumption that each of Cartridge A and Cartridge B has a cartridge voltage of 52 V (the first voltage) or higher, and the cartridge voltage is lower in Cartridge B than Cartridge A.

The control circuit 62 allows conduction of a switch circuit corresponding to Cartridge A having the highest voltage (step S54). Specifically, the control circuit 62 connects the cartridge A with the DC-DC converter 61a. The control circuit 62 also controls the DC-DC converter 61a to increase the direct current voltage input from Cartridge A to, for example, a direct current voltage of 300 V. The control circuit 62 also controls the DC-AC inverter 61b to convert the direct current voltage input from the DC-DC converter 61a to an alternating current voltage of, for example, 100 V or 200 V. The alternating current voltage is input to the power distribution unit 3 which, in turn, supplies an operating voltage through, for example, the conduction monitor 5 to the electrical appliances 51.

The control circuit 62 monitors the output voltage of Cartridge A connected to the DC-DC converter 61a, and turns off a switch circuit corresponding to Cartridge A when the voltage of Cartridge A becomes, for example, 51 V (the second voltage) or lower. A user inputs an instruction to withdraw Cartridge B via the operation panel 4b of the power management device 4 by the time when the voltage of Cartridge A reaches 51 V. A signal instructing the withdrawal of the cartridge and a signal indicating the identification number of Cartridge B are input to the control circuit 62 (step S55).

The control circuit 62 first excludes Cartridge B from the cartridges determined in step S53 as target for discharge. Specifically, as a cartridge to discharge after Cartridge A, the control circuit 62 selects a cartridge having a voltage next highest to the voltage of Cartridge B. Then, with Cartridge B not discharging, the control circuit 62 outputs a signal indicating that Cartridge B is ready to be withdrawn, and transmits the signal to the power management device 4 (step S56). The power management device 4 in turn displays on the display device provided on the operation panel 4b an indication that Cartridge B is ready to be withdrawn from the storage system 6a. The user can withdraw Cartridge B safely because Cartridge B is excluded from the cartridges as target of discharge and is not connected to the DC-DC converter 61a (step S57).

Thereafter, an operation of step S5 and subsequent operations shown in FIG. 6 are performed. However, in these operations, a cartridge having a voltage next highest to the voltage of Cartridge B is discharged because Cartridge B is excluded from the cartridges as target of discharge. The discharge of the cartridges is performed until there is left no cartridge having a voltage of 52 V or higher, and then terminated.

Next, explanations are made with reference to FIG. 9B on the process to be performed when a signal instructing the withdrawal of the cartridge and a signal indicating the identification number of Cartridge A are input to the control circuit 62 during the discharge of Cartridge A.

In the absence of both a discharge instruction signal and a charge instruction signal from the power management device 4, the control circuit 62 leaves all of the switch circuits 211 to 214 open (nonconducting, OFF) (step S61).

With an input of a discharge instruction signal from the power management device 4, the control circuit 62 moves to the phase of selection of a cartridge in the storage apparatus 60 and operation to supply an alternating current voltage from the selected cartridge to the power distribution unit 3 (step S62).

The control circuit 62 measures the cartridge voltage (output voltage) in each of the cartridges 100_1 to 100_4 (step S63). Based on the results of the measurement of the cartridge voltages, the control circuit 62 determines the order of conduction of the switch circuits connected to the cartridges. Explanations are made here on the assumption that each of Cartridge A and Cartridge B has a cartridge voltage of 52 V (the first voltage) or higher, and the cartridge voltage is lower in Cartridge B than Cartridge A.

The control circuit 62 allows conduction of a switch circuit corresponding to Cartridge A having the highest voltage (step S64). Specifically, the control circuit 62 connects the cartridge A with the DC-DC converter 61a. The control circuit 62 also controls the DC-DC converter 61a to increase the direct current voltage input from Cartridge A to, for example, a direct current voltage of 300 V. The control circuit 62 also controls the DC-AC inverter 61b to convert the direct current voltage input from the DC-DC converter 61a to an alternating current voltage of, for example, 100 V or 200 V. The alternating current voltage is input to the power distribution unit 3 which, in turn, supplies an operating voltage through, for example, the conduction monitor 5 to the electrical appliances 51.

The control circuit 62 monitors the output voltage of Cartridge A connected to the DC-DC converter 61a, and turns off a switch circuit corresponding to Cartridge A when the voltage of Cartridge A becomes, for example, 51 V (the second voltage) or lower. A user inputs an instruction to withdraw Cartridge A via the operation panel 4b of the power management device 4 by the time when the voltage of Cartridge A reaches 51 V. A signal instructing the withdrawal of the cartridge and a signal indicating the identification number of Cartridge A are input to the control circuit 62 (step S65).

Then, the control circuit 62 closes (allows conduction of or turns "ON") a switch circuit corresponding to Cartridge B to be charged after Cartridge A and connects Cartridge B to the DC-DC converter 61a (step S66). The cartridge B transitions to a state of discharging to the power distribution unit 3.

Then, the control circuit 62 opens (disallows conduction of or turns "OFF") a switch circuit corresponding to Cartridge A and disconnects Cartridge A from the DC-DC converter 61a (step S67). Here, the order of steps S66 and S67 may be reversed. By reversing the order of these steps, it becomes possible to suppress the cross current from occurring due to the difference in cartridge voltage between Cartridge A and Cartridge B.

Then, with Cartridge A not discharging, the control circuit 62 outputs a signal indicating that Cartridge A is ready to be withdrawn, and transmits the signal to the power management device 4 (step S68). The power management device 4 in turn displays on the display device provided on the operation panel 4b an indication that Cartridge A is ready to be withdrawn from the storage system 6a. The user can withdraw Cartridge A safely because Cartridge A is excluded from the cartridges as target of discharge and is not connected to the DC-D converter 61a (step S69).

Thereafter, an operation of step S7 and subsequent operations shown in FIG. 6 are performed. In these operations, a cartridge having a voltage next highest to the voltage of Cartridge A is discharged. The discharge of the cartridges is performed until there is left no cartridge having a voltage of 52 V or higher, and then terminated.

As mentioned above, the electricity storage system 6a according to the first embodiment of the present invention comprises a plurality of cartridges 100_1 to 100_4 connected together in parallel, each cartridge comprising a plurality of cells connected together, wherein each of the cartridges independently maintains a voltage convertible to a commercial voltage. The electricity storage system 6a may comprises: a DC-DC converter 61a provided in association with the cartridges connected together in parallel; a DC-AC inverter 61b provided between the DC-DC converter 61a and a node outputting the commercial voltage; a plurality of switch circuits which are respectively provided between the cartridges connected together in parallel and the DC-DC converter 61a; and a control circuit 62 for controlling the switch circuits to allow or disallow the flow of current.

By the electricity storage system 6a according to the first embodiment of the present invention, each of the cartridges independently maintains a voltage convertible to a commercial voltage, thereby eliminating the need for leveling to balance energies between the cartridges. Further, this construction enables utmost output from the electricity charged in each cartridge without being influenced by the charged electricity in other cartridges so that the energy charged in each cartridge can be efficiently used.

The Second Embodiment

Figure 10:
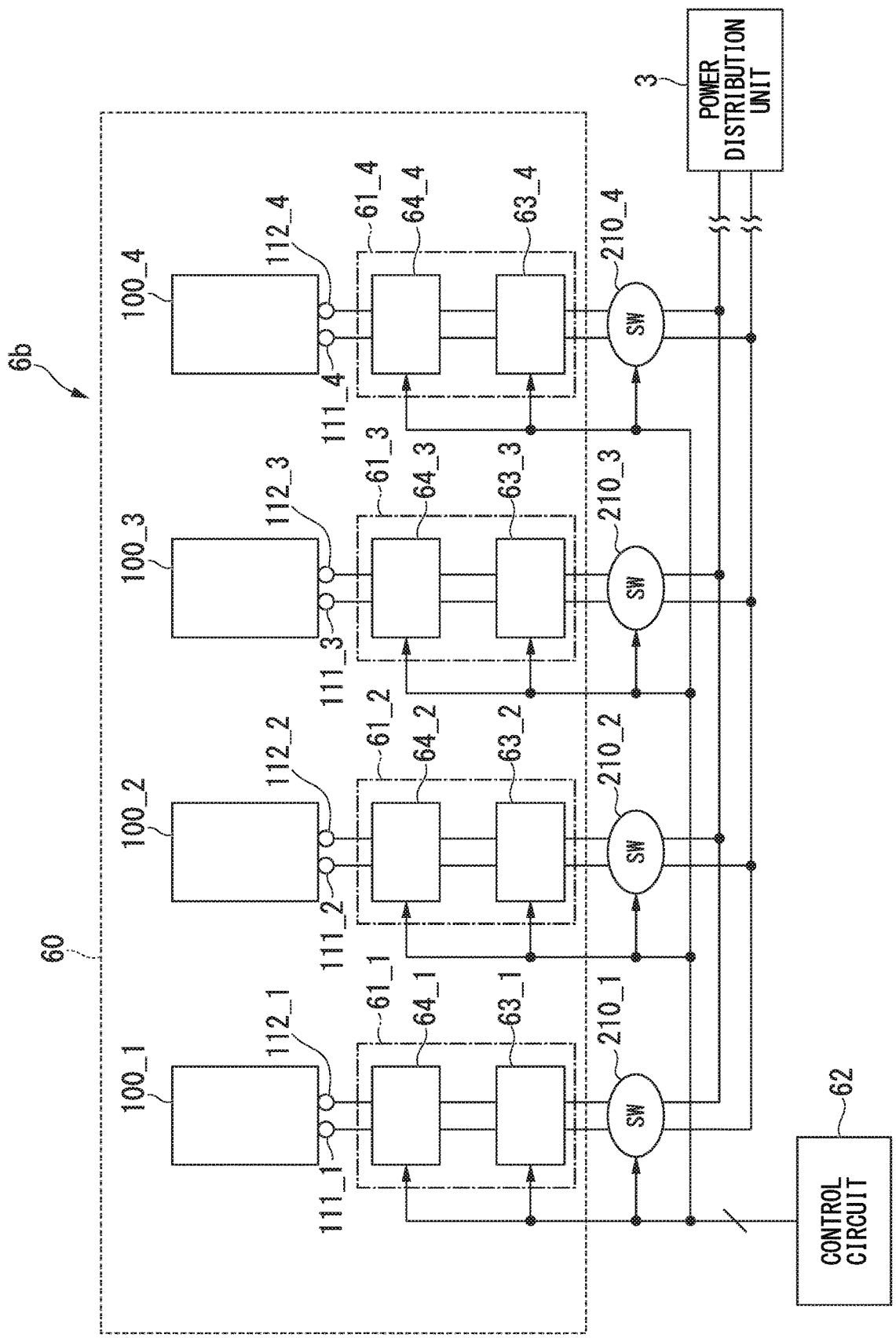
FIG. 10 is a diagram explaining the constructions of cartridges 100_1 to 100_4 in a storage system 6b according to the second embodiment of the present invention.

FIG. 10 is a diagram explaining the constructions of cartridges 100_1 to 100_4 in a storage system 6b according to the second embodiment of the present invention.

As shown in FIG. 10, the storage system 6b according to the second embodiment of the present invention has a storage apparatus 60, SW 210_1, 210_2, 210_3, 210_4 (hereinafter, referred to as "switch circuits") corresponding to the cartridges 100_1 to 100_4 in the storage apparatus 60, and a control circuit 62. Further, the storage device 60 comprises four cartridges 100_1 to 100_4 and PCS61_1 to PCS61_4 which are respectively connected to the cartridges 100_1 to 100_4.

Each PCS61_$i$ (i=1 to 4) is comprised of a DC-DC converter 64_$i$ and a DC-AC inverter 63_$i$.

The + terminal 111_$i$ and the − terminal 112_$i$ of the cartridge 100_$i$ are connected to input/output terminals of the PCS 61_$i$ on the side of the cartridge. Further, with respect to the PCS61_$i$, the input/output terminals thereof on a side opposite to the input/output terminals on the side of the cartridge (i.e., terminals on the side of the power distribution unit 3) are connected to the input/output terminals of the switch circuit 210_$i$. Further, the terminals on the other side of the switch circuit 210_$i$ (i.e., node outputting or receiving a commercial voltage) is connected to the power distribution unit 3. PCS61_$i$ (i=1 to 4) may be provided inside the cartridge. In such an instance, the + terminal 111_$i$ and the − terminal 112_$i$ are connected to the input/output terminals provided on the side of the PCS and between the PCS and the switch circuit 210_$i$.

Thus, the cartridges constituting the storage apparatus 60 are connected to the power distribution unit 3 via the PCSs and the switch circuits which are provided in correspondence with the respective cartridges.

The control circuit 62 performs the open-close control (on-off control) of the switch circuits 210_1 to 210_4 in accordance with the control signals transmitted from the power management device 4, wherein the signals includes a signal instructing discharge, a signal instructing charge, a signal instructing the withdrawal of the cartridge and a signal indicating the identification number of the cartridge. Further, in response to the on-off control of the switch circuits 210_1 to 210_4, the control circuit 62 performs the control of each PCS (control by the PCS of the charge of the cartridge and the discharge from the cartridge) provided between the switch circuit and the corresponding cartridge.

Next, the control of the PCS61_$i$ (i=1 to 4) by the control circuit 62 is explained with reference to FIG. 11.

Figure 11:
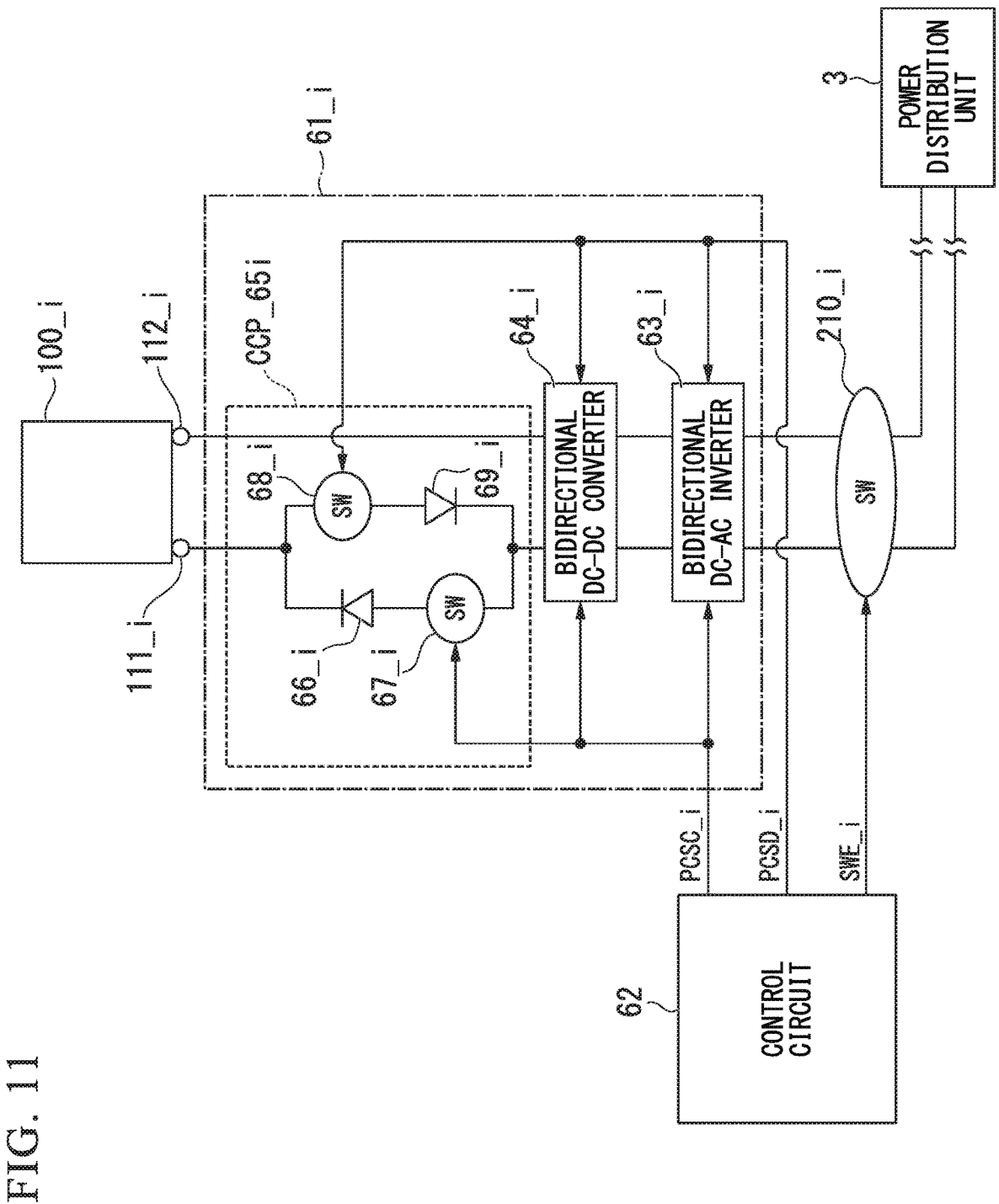
FIG. 11 is a diagram explaining the construction of PCS61_i in a storage system 6b according to the second embodiment of the present invention.

FIG. 11 is a diagram explaining the construction of PCS61_$i$ in a storage system 6b according to the second embodiment of the present invention. In FIG. 11, any one of the PCS61_1 to PCS61_4 shown in FIG. 10 is indicated as PCS61_$i$.

With respect to the DC-AC inverter 63_$i$ constituting the PCS61_$i$, the input/output terminal (input node) thereof on the side of the power distribution unit 3 is connected to a terminal of the switch circuit 210_$i$, while the input/output terminal (output node) on the side of the cartridge 100_$i$ is connected to the input/output terminal (input node) of the DC-DC converter 64_$i$ on the side of the power distribution unit 3. Further, the other terminal of the switch circuit 210_$i$ (i.e., node outputting a commercial voltage) is connected to the power distribution unit 3.

Further, with respect to the DC-DC converter 64_$i$ constituting the PCS61_$i$, the input/output terminals thereof on the side of the power distribution unit 3 are connected to the input/output terminals of the DC-AC inverter 63_$i$ on the side of the cartridge 100_$i$.

The aforementioned input/output terminals include a positive electrode terminal and a negative electrode terminal which correspond to the cartridge.

Further, with respect to the input/output terminals of the DC-DC converter 64_$i$ which are provided on the side of the cartridge 100_$i$, a positive electrode-side terminal is connected to the + terminal 111_$i$ of the cartridge 100_$i$ via the cross current prevention circuit CCP_65$i$, while a negative electrode-side terminal is connected to the − terminal 112_$i$ of the cartridge 100_$i$.

The cross current prevention circuit CCP_65$i$ is comprised of a diode 66_$i$, a switch circuit 67_$i$, a switch circuit 68_$i$ and a diode 69_$i$.

With respect to the diode 66_$i$, an anode terminal is connected to a terminal of the switch circuit 67_$i$, while a cathode terminal is connected to the + terminal 111_$i$ of the cartridge 100_$i$.

With respect to the switch circuit 67_$i$, one terminal thereof is connected to the anode terminal of the diode 66_$i$, while another terminal is connected to an input/output terminal (positive electrode-side terminal) of the DC-DC converter 64_$i$ on the side of the cartridge 100_$i$.

With respect to the switch circuit 68_i, one terminal thereof is connected to the + terminal 111_i of the cartridge 100_i, while another terminal is connected to an anode terminal of the diode 69_i.

With respect to the diode 66_i, an anode terminal is connected to a terminal of the switch circuit 67_i, while a cathode terminal is connected to the input/output terminal (positive electrode-side terminal) of the DC-DC converter 64_i on the side of the cartridge 100_i.

The switch circuit 67_i transitions to a closed state (i.e., a state of conduction (ON)) to connect the DC-DC converter 64_i to the diode 66_i when, for example, the control circuit 62 changes the PCS control signal PCSC_i from a low (L) level to a high (H) level. On the other hand, the switch circuit 67_i transitions to an open state (i.e., a state of nonconduction (OFF)) to disconnect the DC-DC converter 64_i from the diode 66_i when, for example, the control circuit 62 changes the PCS control signal PCSC_i from H level to L level.

The switch circuit 68_i transitions to an ON state to connect the cartridge 100_i to the diode 69_i when, for example, the PCS control signal PCSD_i is changed from L level to H level. On the other hand, the switch circuit 67_i transitions to an OFF state to disconnect the cartridge 100_i from the diode 69_i when, for example, the PCS control signal PCSC_i is changed from H level to L level.

The cross current prevention circuit CCP_65i has a function to prevent cross current from occurring between the cartridge 100_i and other cartridge having a voltage different from the cartridge 100_i when a plurality of cartridges including the cartridge 100_i are selected by the control circuit 62 and, for example, the cartridge 100_i is being charged. The cross current prevention circuit CCP_65i also has a function to prevent cross current from occurring between the cartridge 100_i and other cartridge having a voltage different from the cartridge 100_i when a plurality of cartridges including the cartridge 100_i are selected by the control circuit 62 and, for example, the cartridge 100_i is discharging.

In the second embodiment of the present invention, a construction is employed wherein the cross current prevention circuit CCP_65i is provided between the cartridge 100_i and the DC-DC converter 64_i; however, it is also possible to employ a construction wherein the cross current prevention circuit CCP_65i is provided between the DC-DC converter 64_i and the DC-AC inverter 63_i.

The control circuit 62 also performs the open-close control (nonconduction or conduction) of the switch circuit 210_i, and the switch circuits 67_i and 68_i of the cross current prevention circuit CCP_65i, in accordance with the control signals transmitted from the power management device 4.

Specifically, when the control signal is a discharge instruction signal (i.e., a signal instructing discharge from the storage apparatus 60), the control circuit 62 controls the open and close of the switch circuits 210_i, 67_i and 68_i as follows. The control circuit 62 changes the switch control signal SWE_i and the PCS control signal PCSD_i from L level to H level to turn on at least one switch circuits 210_i of the switch circuits 210_1 to 210_4 and the switch circuit 68_i. Thus, the cartridge with the switch circuit closed is connected to the power distribution unit 3. In the absence of both a discharge instruction signal and a charge instruction signal (i.e., in a default condition), the control circuit 62 maintains the switch control signal SWE_i and the PCS control signal PCSD_i at L level so as to leave all of the switch circuits 210_i, 67_i and 68_i in an OFF state.

When the control signal is a signal instructing discharge, the control circuit 62 follows the preset procedure as described below as to the conditions for the selection/non-selection of a cartridge to be connected to the power distribution unit 3. Specifically, from the cartridges 100_1 to 100_4, the control circuit 62 selects a cartridge which, for example, outputs 47.8 V or higher (the first voltage or higher) as the sustaining voltage (cartridge voltage). The control circuit 62 always monitors the cartridge voltages of all of the cartridges and controls the conduction or nonconduction (ON/OFF) of the switch circuits in accordance with the output voltages of the cartridges. With respect to the switch circuits (switch circuits 210_i and 68_i) corresponding to the cartridges having a cartridge voltage of 47.8 V or higher, the control circuit 62 changes the switch control signal SWE_i and the PCS control signal PCSD_i from L level to H level, and selects the cartridge 100_i. In this manner, at least one cartridge is selected and connected to the power distribution unit 3.

With respect to a cartridge with its cartridge voltage decreased to 47.8 V or lower (the second voltage or lower) among the selected cartridges, the control circuit 62 turns off the corresponding switch circuit by changing the switch control signal SWE_i and the PCS control signal PCSD_i from H level to L level, and non-selects the cartridge. That is, with respect to each of the cartridges, the cartridge is non-selected and disconnected from the power distribution unit 3 the instant the cartridge voltage has decreased to 46.8 V or lower.

Thereafter, the control circuit 62 repeats the operation of turning off the switch circuit to non-select the cartridge until there is left no cartridge having a voltage of 46.8 V or higher.

On the other hand, when the control signal is a charge instruction signal (i.e., a signal instructing charge of the storage apparatus 60), the control circuit 62 controls the open and close of the switch circuits 210_i, 67_i and 68_i as follows. The control circuit 62 changes the switch control signal SWE_i and the PCS control signal PCSC_i from L level to H level to turn on at least one switch circuits 210_i of the switch circuits 210_1 to 210_4 and the switch circuit 67_i. Thus, the cartridge with the switch circuit closed is connected to the power distribution unit 3.

Further, when the control signal is a charge instruction signal, the control circuit 62 follows the preset procedure as described below as to the conditions for the selection/non-selection of a cartridge to be connected to the power distribution unit 3. Specifically, from the cartridges 100_1 to 100_4, the control circuit 62 selects a cartridge having a cartridge voltage of, for example, 69.6 V or lower (the third voltage or lower).

With respect to the switch circuits (switch circuits 210_i and 67_i) corresponding to the cartridges having a cartridge voltage of 69.6 V or lower, the control circuit 62 changes the switch control signal SWE_i and the PCS control signal PCSC_i from L level to H level, and selects the cartridge 100_i. In this manner, at least one cartridge is selected and connected to the power distribution unit 3.

With respect to a cartridge with its cartridge voltage increased to 70.6 V or higher (the fourth voltage or higher) among the selected cartridges, the control circuit 62 turns off the corresponding switch circuit by changing the switch control signal SWE_i and the PCS control signal PCSC_i from H level to L level, and non-selects the cartridge. That is, with respect to each of the cartridges, the cartridge is non-selected and disconnected from the power distribution unit 3 the instant the cartridge voltage has increased to 70.6 V or higher.

Thereafter, the control circuit 62 repeats the operation of turning off the switch circuit to non-select the cartridge until there is left no cartridge having a voltage of 70.6 V or lower.

When the control signal input from the power management device 4 represents a signal instructing withdrawal of a cartridge and a signal indicating the identification number of the cartridge, the control circuit 62 performs the following control.

As mentioned above, the control circuit 62 always monitors the voltages of all of the cartridges and transmits information on the voltages of the cartridges to the power management device 4. The information on the voltages of the cartridges is available to the user through a display device provided on the operation panel 4*b*. Further, when the storage system 6*b* is not in operation, the control circuit 62 leaves all of the switch circuits OFF (i.e., in a default condition). At such a time when the storage system 6*b* is not in operation, a user can safely withdraw any cartridge from the storage apparatus.

On the other hand, when the storage system 6*b* is in operation, there may be a case where the cartridge intended by a user to be removed is being charged or discharging. In such an instance, the control circuit 62 turns off the aforementioned switch circuit to non-select the cartridge while the cartridge is being charged or discharging. In such an instance, when there is a cartridge being charged or discharging other than the cartridge intended by a user to be removed, the charge or discharge of such other cartridge is continued. Needless to say, when the cartridge intended by a user to be removed is the last one which is being charged or discharging, the corresponding switch circuit is turned off to non-select the cartridge. After the cartridge intended by the user to be removed has become non-selected, the control circuit 62 outputs a signal indicating that the cartridge intended by the user to be removed is ready to be withdrawn, and transmits the signal to the power management device 4. The power management device 4 displays on the display screen of the operation panel 4*b* an indication that the cartridge is ready to be withdrawn, thereby enabling the user to safely withdraw an intended cartridge from the storage apparatus 60.

The control circuit 62 allows the DC-DC converter 64_*i* to increase or decrease voltage and allows the DC-AC inverter 63_*i* to perform a power conversion operation in accordance with the control signals (a discharge instruction signal and a charge instruction signal) transmitted from the power management device 4.

Specifically, with an input of a discharge instruction signal, the control circuit 62 changes the PCS control signal PCSD_i from L level to H level to control the DC-DC converter 64_*i*. In this case, the DC-DC converter 64_*i* increases, via the switch circuit 68_*i* and diode 69_*i*, the direct current voltage (i.e., sustaining voltage of the cartridge) input to the input/output terminals thereof on the side of the cartridge 100_*i*, and to output the increased direct current voltage (e.g., a direct current voltage of 300 V) to the input/output terminals on the side of the power distribution unit 3. Further, the control circuit 62 changes the PCS control signal PCSD_i from L level to H level to control the DC-AC inverter 63_*i*. The DC-AC inverter 63_*i* converts the direct current voltage input to the input/output terminals thereof on the side of the cartridge 100_*i* to an alternating current voltage (e.g., an alternating current voltage of 100 V or 200 V), and to output the alternating current voltage to the input/output terminals on the side of the power distribution unit 3.

In this situation, the switch circuit 210_*i* is in the ON state as mentioned above; therefore, an alternating current voltage converted from a direct current voltage of a cartridge corresponding to the switch circuit 210_*i*, i.e., the selected cartridge, is input to the power distribution unit 3. The power distribution unit 3 supplies an operating voltage through, for example, the conduction monitor 5 to the electrical appliances 51. Further, the control of the PCS61_*i* by the control circuit 62 is performed through the period when an input of a signal instructing discharge is being received and the PCS control signal PCSD_i is at H level. That is, the control is performed from the time of input of a discharge instruction signal to the time when the cartridge voltage of the cartridge 100_*i* becomes 46.8 V or lower. When the cartridge voltage of the cartridge 100_*i* becomes 46.8 V or lower, the control circuit 62 changes the PCS control signal PCSD_i to L level and terminates the control of the PCS61_*i*.

Further, with an input of a charge instruction signal, the control circuit 62 changes the PCS control signal PCSC_i from L level to H level to control the DC-AC inverter 63_*i*. In this case, the DC-AC inverter 63_*i* converts the alternating current voltage input, via the "ON" circuit 210_*i*, to the input/output terminals thereof on the side of the power distribution unit 3 to a direct current voltage, and to output the direct current voltage to the input/output terminals on the side of the cartridge 100_*i*. Further, the control circuit 62 changes the PCS control signal PCSC_i from L level to H level to control the DC-DC converter 64_*i*. In this case, the DC-DC converter 64_*i* decreases the direct current voltage input to the input/output terminals thereof on the side of the power distribution unit 3, and outputs the decreased direct current voltage to the input/output terminals of the cartridge 100_*i* via the switch circuit 67_*i* and the diode 66_*i*.

In this situation, the switch circuit 210_*i* is in the ON state as mentioned above; therefore, among the cartridges in the storage apparatus 60, one with the corresponding switch circuit being ON transitions into a state of being charged with the supply of the aforementioned direct current voltage. Further, the control of the PCS61_*i* by the control circuit 62 is performed through the period when an input of a charge instruction signal is being received and the PCS control signal PCSC_i is at H level. That is, the control is performed from the time of input of a charge instruction signal to the time when the cartridge voltage of the cartridge 100_*i* becomes 70.6 V or higher. When the cartridge voltage of the cartridge 100_*i* becomes 70.6 V or higher, the control circuit 62 changes the PCS control signal PCSC_i to L level and terminates the control of the PCS61_*i*.

Next, explanations are made with respect to the control of the charge/discharge of the cartridges and the open-close (ON-OFF) control of the switch circuits in the construction shown in FIG. 10, referring to FIGS. 12 to 15.

Figure 12:
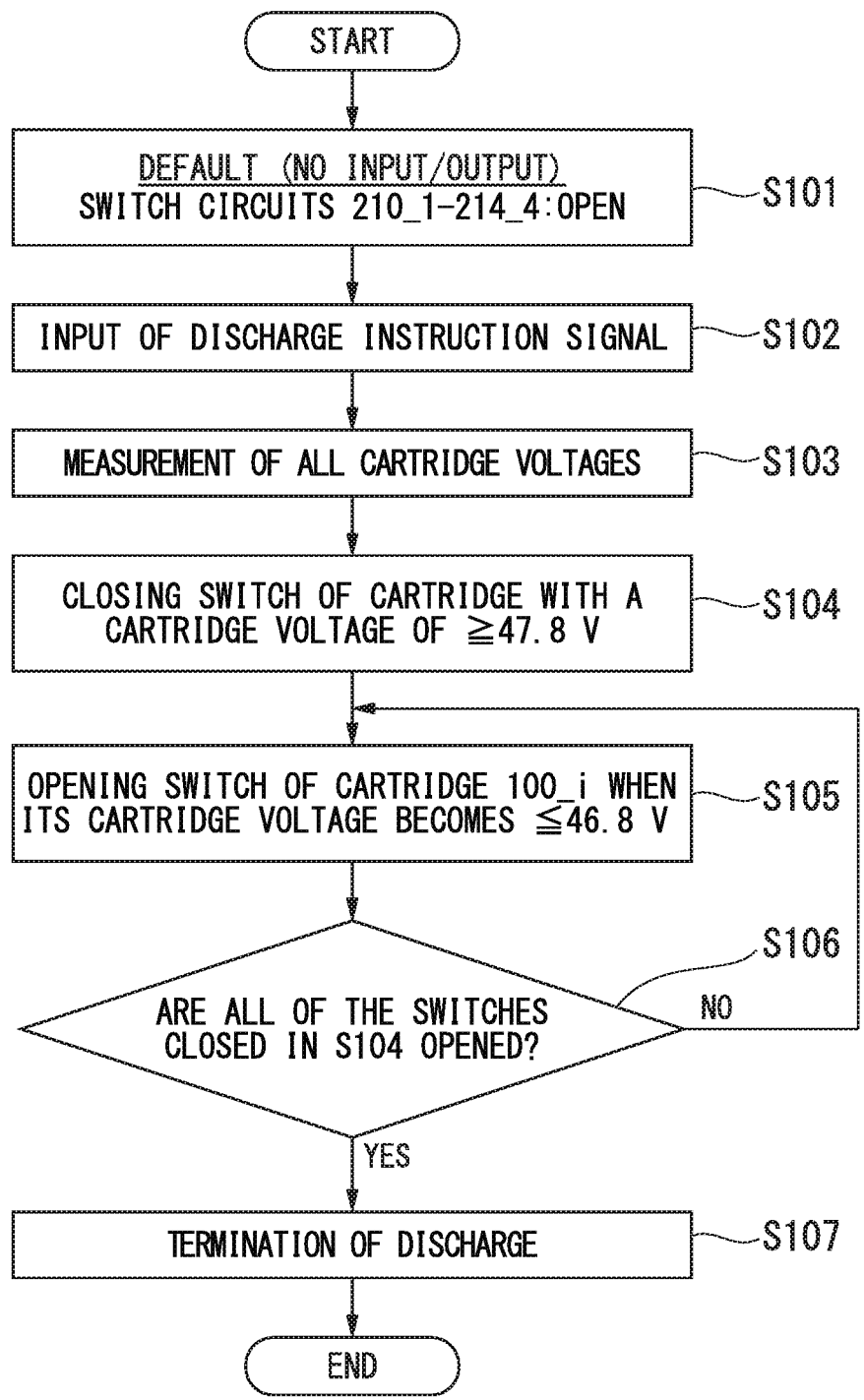
FIG. 12 is a flowchart explaining the discharge from the storage system 6b according to the second embodiment of the present invention.

FIG. 12 is a diagram explaining the discharge from the storage system 6*b* according to the second embodiment of the present invention.

In the absence of both a discharge instruction signal and a charge instruction signal from the power management device 4, the control circuit 62 leaves all of the switch circuits 210_1 to 210_4 in an OFF state (step S101). Specifically, the control circuit 62 maintains the switch control signal SWE_i, the PCS control signal PCSC_i and the PCS control signal PCSD_i (i=1 to 4) at L level at the switch circuits 210_1 to 210_4 and PCS61_1 to PCS61_4. In this status, with an input of a charge or discharge instruction signal from the power management device 4, it is possible, as needed, to perform a discharge from the cartridge (power supply to the power distribution unit 3) or a charge of the cartridge.

With an input of a discharge instruction signal from the power management device 4, the control circuit 62 moves to the phase of selection of a cartridge in the storage apparatus 60 and operation to supply an alternating current voltage from the selected cartridge to the power distribution unit 3 (step S102).

The control circuit 62 measures the cartridge voltage (output voltage) in each of the cartridges 100_1 to 100_4 (step S103). Based on the results of the measurement of the cartridge voltages, the control circuit 62 determines which of the switch circuits (switch circuit 210_$i$ and switch circuit 68_$i$) connected to the cartridges should be selected. Explanations are made here on the assumption that three cartridges (Cartridge A, Cartridge B and Cartridge C) of the cartridges 100_1 to 100_4 have a cartridge voltage of 47.8 V (the first voltage) or higher, and the cartridge voltage is lower in the order of Cartridge A, Cartridge B and Cartridge C.

The control circuit 62 turns on the switch circuits (switch circuit 210_$i$ and switch circuit 68_$i$) corresponding to a cartridge having a voltage of 47.8 V or higher (step S104). In this instance, the control circuit 62 turns on the switch circuits respectively corresponding to Cartridge A to Cartridge C. Specifically, the control circuit 62 changes the switch control signal SWE_$i$ and the PCS control signal PCSD_$i$ corresponding to Cartridge A to Cartridge C from L level to H level, to thereby connect Cartridge A to Cartridge C to the power distribution unit 3. Further, with respect to each of Cartridge A to Cartridge C, the control circuit 62 also controls the DC-DC converter 64_$i$ to increase the direct current voltage input from the cartridge to, for example, a direct current voltage of 300 V. Further, with respect to each of Cartridge A to Cartridge C, the control circuit 62 also controls the DC-AC inverter 63_$i$ to convert the direct current voltage input from the DC-DC converter 64_$i$ to an alternating current voltage of, for example, 100 V or 200 V. The alternating current voltage converted from the direct current voltage from each of the cartridges A to C is input to the power distribution unit 3 which, in turn, supplies an operating voltage through, for example, the conduction monitor 5 to the electrical appliances 51.

The control circuit 62 monitors the cartridge voltages of the cartridges, and turns off a switch circuit when the voltage of the corresponding cartridge 100_$i$ becomes 46.8 V (the second voltage) or lower (step S146). Specifically, the control circuit 62 changes the switch control signal SWE_$i$ and the PCS control signal PCSD_$i$ corresponding to the cartridge 100_$i$ from H level to L level. Thus, the switch circuit (switch circuit 210_$i$ and switch circuit 68_$i$) corresponding to the cartridge 100_$i$ is turned off and the PCS 61_$i$ is inactivated. In this embodiment, since the cartridge voltage is lower in the order of Cartridge A to Cartridge C, there is a tendency that the non-selection (i.e., disconnection from the power distribution unit 3) of the cartridge in step S106 is performed in the order of Cartridge C to Cartridge A.

The control circuit 62 judges if all of the switch circuits (switch circuit 210_$i$ and switch circuit 68_$i$) corresponding to the cartridges selected in step S104 are turned off (step S106). In this instance, the control circuit 62 judges if all of the switch circuits corresponding to Cartridge A to Cartridge C are turned off. The cartridge with its corresponding switch circuit OFF has a cartridge voltage of 46.8 V or lower in step S105. Therefore, in step S106, when all of the switch circuits corresponding to Cartridge A to Cartridge C are OFF, the cartridges selected in step S103 (all of Cartridge A to Cartridge C in this example) have a cartridge voltage of 46.8 V or lower.

When all of the switch circuits corresponding to Cartridge A to Cartridge C are turned off, the process moves on to step S107 (step S106—Yes). On the other hand, when there is a cartridge with its switch circuit still ON among the cartridges selected in step S104, the process moves on to step S105 (step S106—No). In this embodiment, there is a tendency that, when Cartridge C is non-selected, Cartridge A and Cartridge B still have a cartridge voltage of 46.8 V or higher. Therefore, the ON state of the switch circuits (switch circuit 210_$i$ and switch circuit 68_$i$) corresponding to Cartridge A and Cartridge B and the activated state of the PCS 61_$i$ are maintained. Then, through the repetition of step S105 and step S106, the cartridge voltages of Cartridge A and Cartridge B become 46.8 V or lower. Thus, Cartridge B and Cartridge A become non-selected (step S105) and all of the switch circuits corresponding to Cartridge A to Cartridge C are turned off, whereafter the process moves on to step S107 (step S106—Yes).

The control circuit 62, for example, outputs a signal indicating the termination of discharge, which is transmitted to the power management device 4 (step S107). The power management device 4 in turn displays on the display device provided on the operation panel 4$b$ an indication that the operation of discharge from the storage system 6$b$ is terminated. Alternatively, it is also possible to employ a construction such that the power management device 4 displays an indication that the storage system 6$b$ is discharging during the period from the time of output of a discharge instruction signal from the power management device 4 to the storage system 6$b$ to the time of termination of the discharge.

Figure 13:
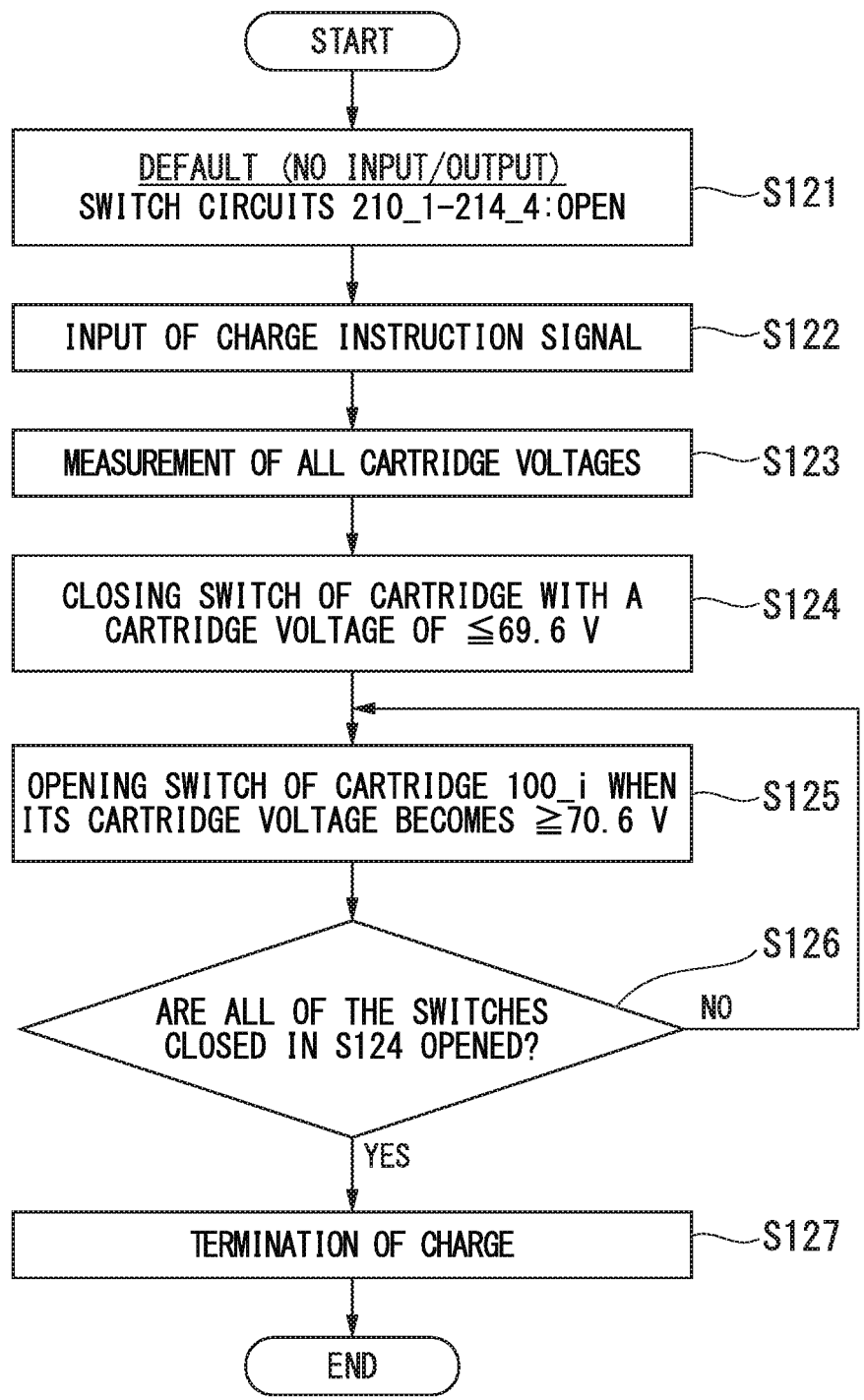
FIG. 13 is a flowchart explaining the charge of the storage system 6b according to the second embodiment of the present invention.

Next, explanations are made on the method of charging the storage system 6$b$. FIG. 13 is a flowchart explaining the charge of the storage system 6$b$ according to the second embodiment of the present invention.

In the absence of both a discharge instruction signal and a charge instruction signal from the power management device 4, the control circuit 62 leaves all of the switch circuits 210_1 to 210_4 in an OFF state (step S121). Specifically, the control circuit 62 maintains the switch control signal SWE_$i$, the PCS control signal PCSC_$i$ and the PCS control signal PCSD_$i$ ($i$=1 to 4) at L level at the switch circuits 210_1 to 210_4 and PCS61_1 to PCS61_4.

With an input of a charge instruction signal from the power management device 4, the control circuit 62 moves to the phase of selection of a cartridge in the storage apparatus 60 and operation to supply a direct current voltage to the selected cartridge (step S122).

The control circuit 62 measures the cartridge voltage in each of the cartridges 100_1 to 100_4 (step S123). Based on the results of the measurement of the cartridge voltages, the control circuit 62 determines which of the switch circuits (switch circuit 210_$i$ and switch circuit 67_$i$) connected to the cartridges should be selected. Explanations are made here on the assumption that three cartridges (Cartridge X, Cartridge Y and Cartridge Z) of the cartridges 100_1 to 100_4 have a cartridge voltage of 69.6 V (the third voltage) or lower, and the cartridge voltage is lower in the order of Cartridge X, Cartridge Y and Cartridge Z.

The control circuit 62 turns on the switch circuits (switch circuit 210_$i$ and switch circuit 67_$i$) corresponding to a cartridge having a voltage of 69.6 V or lower (step S124). In this instance, the control circuit 62 turns on the switch circuits respectively corresponding to Cartridge X to Cartridge Z. Specifically, the control circuit 62 changes the switch control signal SWE_i and the PCS control signal PCSC_i corresponding to Cartridge X to Cartridge Z from L level to H level, to thereby connect the cartridges to the power distribution unit 3. With respect to each of Cartridge X to Cartridge Z, the control circuit 62 also controls the DC-AC inverter 63_$i$ to convert the alternating current voltage input from the power distribution unit 3 to a direct current voltage. Further, with respect to each of Cartridge X to Cartridge Z, the control circuit 62 also controls the DC-DC converter 64_$i$ to decrease the direct current voltage input from the DC-AC inverter 63_$i$ to, for example, a direct current voltage of 70.6 V. Each of the cells connected in series in each of the selected Cartridge X to Cartridge Z transitions to a state of being charged at about 4.15 V.

The control circuit 62 monitors the cartridge voltages of the cartridges, and turns off a switch circuit when the voltage of the corresponding cartridge 100_$i$ becomes 70.6 V (the fourth voltage) or higher (step S125). Specifically, the control circuit 62 changes the switch control signal SWE_i and the PCS control signal PCSC_i corresponding to the cartridge 100_$i$ from H level to L level. Thus, the switch circuit (switch circuit 210_$i$ and switch circuit 67_$i$) corresponding to the cartridge 100_$i$ is turned off and the PCS 61_$i$ is inactivated. In this embodiment, since the cartridge voltage is lower in the order of Cartridge X to Cartridge Z, there is a tendency that the non-selection (i.e., disconnection from the power distribution unit 3) of the cartridge in step S106 is performed in the order of Cartridge X to Cartridge Z.

The control circuit 62 judges if all of the switch circuits (switch circuit 210_$i$ and switch circuit 67_$i$) corresponding to the cartridges selected in step S124 are turned off (step S126). In this instance, the control circuit 62 judges if all of the switch circuits corresponding to Cartridge X to Cartridge Z are turned off. The cartridge with its corresponding switch circuit OFF has a cartridge voltage of 70.6 V or higher in step S125. Therefore, in step S126, when all of the switch circuits corresponding to Cartridge X to Cartridge Z are OFF, the cartridges selected in step S123 (all of Cartridge X to Cartridge Z in this example) have a cartridge voltage of 70.6 V or lower.

When all of the switch circuits corresponding to Cartridge X to Cartridge Z are turned off, the process moves on to step S127 (step S126—Yes). On the other hand, when there is a cartridge with its switch circuit still ON among the cartridges selected in step S124, the process moves on to step S125 (step S126—No). In this embodiment, there is a tendency that, when Cartridge X is non-selected, Cartridge Y and Cartridge Z still have a cartridge voltage of 70.6 V or lower. Therefore, the ON state of the switch circuits (switch circuit 210_$i$ and switch circuit 67_$i$) corresponding to Cartridge Y and Cartridge Z and the activated state of the PCS 61_$i$ are maintained. Then, through the repetition of step S125 and step S126, the cartridge voltages of Cartridge Y and Cartridge Z become 70.6 V or higher. Thus. Cartridge Y and Cartridge Z become non-selected (step S125) and all of the switch circuits corresponding to Cartridge X to Cartridge Z are turned off, whereafter the process moves on to step S127 (step S126—Yes).

The control circuit 62, for example, outputs a signal indicating the termination of charge, which is transmitted to the power management device 4 (step S127). The power management device 4 in turn displays on the display device provided on the operation panel 4_b_ an indication that the operation of charging the storage system 6_b_ is terminated. Alternatively, it is also possible to employ a construction such that the power management device 4 displays an indication that the storage system 6_b_ is being charged during the period from the time of output of a charge instruction signal from the power management device 4 to the storage system 6_b_ to the time of termination of charging.

Figure 14:
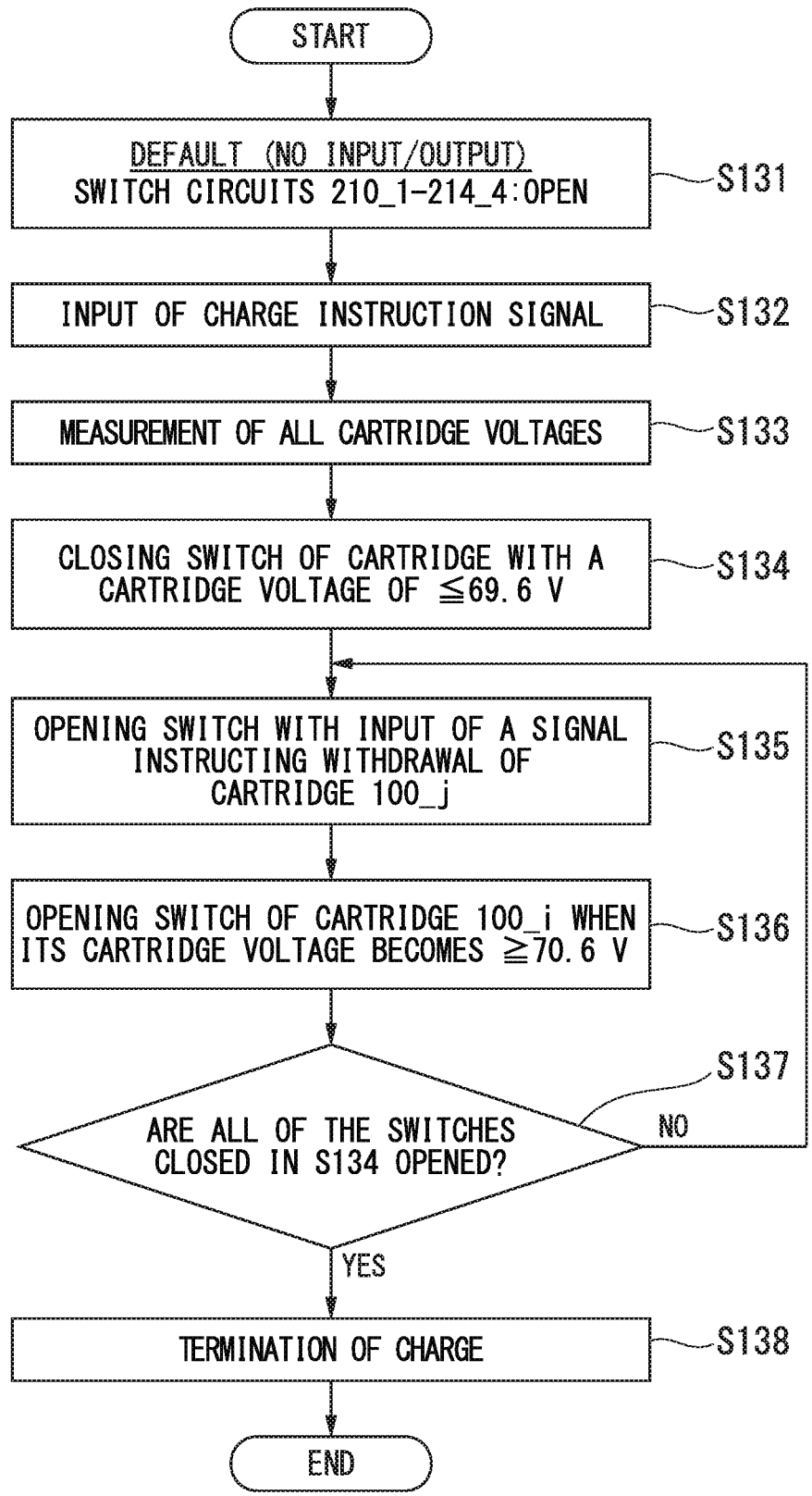
FIG. 14 is a flowchart explaining the withdrawal of a cartridge from the storage system 6b according to the second embodiment of the present invention during the charge thereof.

Next, explanations are made on the method of withdrawing a cartridge during the charging of the storage system 6_b_. FIG. 14 is a flowchart explaining the withdrawal of a cartridge from the storage system 6_b_ according to the second embodiment of the present invention during the charge thereof. Here, it is supposed that the cartridges charged in the process of FIG. 14 are Cartridge X to Cartridge Z used in the explanation of FIG. 13. It is also supposed that three cartridges (Cartridge X, Cartridge Y and Cartridge Z) have a cartridge voltage of 69.6 V (the third voltage) or lower.

FIG. 14 shows a process to be performed when a signal instructing the withdrawal of the cartridge and a signal indicating the identification number of the cartridge 100_$j$ are input to the control circuit 62 during the charging of at least one of the Cartridge X to Cartridge Z. Here, the cartridge 100_$j$ means any one of the Cartridge X to Cartridge Z. For example, the cartridge 100_$j$ may be one cartridge of the Cartridge X to Cartridge Z, or two Cartridges X and Y, or three Cartridges X, Y and Z.

In the absence of both a discharge instruction signal and a charge instruction signal from the power management device 4, the control circuit 62 leaves all of the switch circuits 210_1 to 210_4 in an OFF state (step S131). Specifically, the control circuit 62 maintains the switch control signal SWE_i, the PCS control signal PCSC_i and the PCS control signal PCSD_i (i=1 to 4) at L level at the switch circuits 210_$i$ to 210_4 and PCS61_1 to PCS61_4.

With an input of a charge instruction signal from the power management device 4, the control circuit 62 moves to the phase of selection of a cartridge in the storage apparatus 60 and operation to supply a direct current voltage to the selected cartridge (step S132).

The control circuit 62 measures the cartridge voltage in each of the cartridges 100_1 to 100_4 (step S133). Based on the results of the measurement of the cartridge voltages, the control circuit 62 determines which of the switch circuits (switch circuit 210_$i$ and switch circuit 67_$i$) connected to the cartridges should be selected.

The control circuit 62 turns on the switch circuits (switch circuit 210_$i$ and switch circuit 67_$i$) corresponding to a cartridge having a voltage of 69.6 V or lower (step S134). In this instance, the control circuit 62 turns on the switch circuits respectively corresponding to Cartridge X to Cartridge Z. Specifically, the control circuit 62 changes the switch control signal SWE_i and the PCS control signal PCSC_i corresponding to Cartridge X to Cartridge Z from L level to H level, to thereby connect the cartridges to the power distribution unit 3. With respect to each of Cartridge X to Cartridge Z, the control circuit 62 also controls the DC-AC inverter 63_$i$ to convert the alternating current voltage input from the power distribution unit 3 to a direct current voltage. Further, with respect to each of Cartridge X to Cartridge Z, the control circuit 62 also controls the DC-DC converter 64_$i$ to decrease the direct current voltage input from the DC-AC inverter 63_$i$ to, for example, a direct current voltage of 70.6 V. Each of the cells connected in series in each of the selected Cartridge X to Cartridge Z transitions to a state of being charged at about 4.15 V.

A user inputs an instruction to withdraw the cartridge 100_$j$ via the operation panel 4_b_ of the power management device 4 by the time when the voltages of all cartridges of Cartridge X to Cartridge X reach 70.6 V. A signal instructing the withdrawal of the cartridge and a signal indicating the identification number of the cartridge 100_j are input to the control circuit 62.

The control circuit 62 turns off a switch circuit corresponding to the cartridge 100_j (step S135). Specifically, the control circuit 62 changes the switch control signal SWE_j and the PCS control signal PCSC_j corresponding to the cartridge 100_j from H level to L level. Thus, the switch circuit (switch circuit 210_j and switch circuit 67_j) corresponding to the cartridge 100_j is turned off and the PCS 61_j is inactivated.

Then, with the cartridge 100_j being non-selected, i.e., not being charged, the control circuit 62 outputs a signal indicating that the cartridge 100_j is ready to be withdrawn, and transmits the signal to the power management device 4. The power management device 4 in turn displays on the display device provided on the operation panel 4b an indication that the cartridge 100_j is ready to be withdrawn from the storage system 6b. The user can withdraw the cartridge 100_j safely because the cartridge 100_j is excluded from the cartridges as target of charge and is not connected to the PCS61_j.

The control circuit 62 monitors the cartridge voltages of the cartridges, and turns off a switch circuit when the voltage of the corresponding cartridge 100_j becomes 70.6 V (the fourth voltage) or higher (step S136). Specifically, the control circuit 62 changes the switch control signal SWE_i and the PCS control signal PCSC_i corresponding to the cartridge 100_i from H level to L level. Thus, the switch circuit (switch circuit 210_i and switch circuit 67_i) corresponding to the cartridge 100_i is turned off and the PCS 61_i is inactivated. In this step S136, the cartridges except for the cartridge 100_j which has been non-selected in step S135 are non-selected, i.e., disconnected from the power distribution unit 3.

The control circuit 62 judges if all of the switch circuits (switch circuit 210_i and switch circuit 67_i) corresponding to the cartridges selected in step S134 are turned off (step S137). In this instance, the control circuit 62 judges if all of the switch circuits corresponding to Cartridge X to Cartridge Z are turned off. The cartridge with its corresponding switch circuit OFF is either a cartridge non-selected in step S135 or a cartridge which is judged in step S136 as having a cartridge voltage of 70.6 V or higher. Therefore, in step S137, when all of the switch circuits corresponding to Cartridge X to Cartridge Z are OFF, the cartridges selected in step S133 (all of Cartridge X to Cartridge Z in this example) have a cartridge voltage of 70.6 V or higher.

When all of the switch circuits corresponding to Cartridge X to Cartridge Z are turned off, the process moves on to step S138 (step S137—Yes). On the other hand, when there is a cartridge with its switch circuit still ON among the cartridges selected in step S134, the process moves on to step S135 (step S137—No). In this embodiment, there is a tendency that a cartridge voltage of 70.6 V or lower is still exhibited by cartridges except for a cartridge non-selected in step S135 or a cartridge which is judged in step S136 as having a cartridge voltage of 70.6 V or higher. Therefore, the ON state of the switch circuits (switch circuit 210_i and switch circuit 67_i) corresponding to such remaining cartridges and the activated state of the PCS 61_i are maintained. Through the repetition of step S135, step S136 and step S137, such remaining cartridges become non-selected (step S135, step S136) and all of the switch circuits corresponding to Cartridge X to Cartridge Z are turned off, whereafter the process moves on to step S138 (step S137—Yes).

The control circuit 62, for example, outputs a signal indicating the termination of charge, which is transmitted to the power management device 4 (step S138). The power management device 4 in turn displays on the display device provided on the operation panel 4b an indication that the operation of charging the storage system 6b is terminated.

Figure 15:
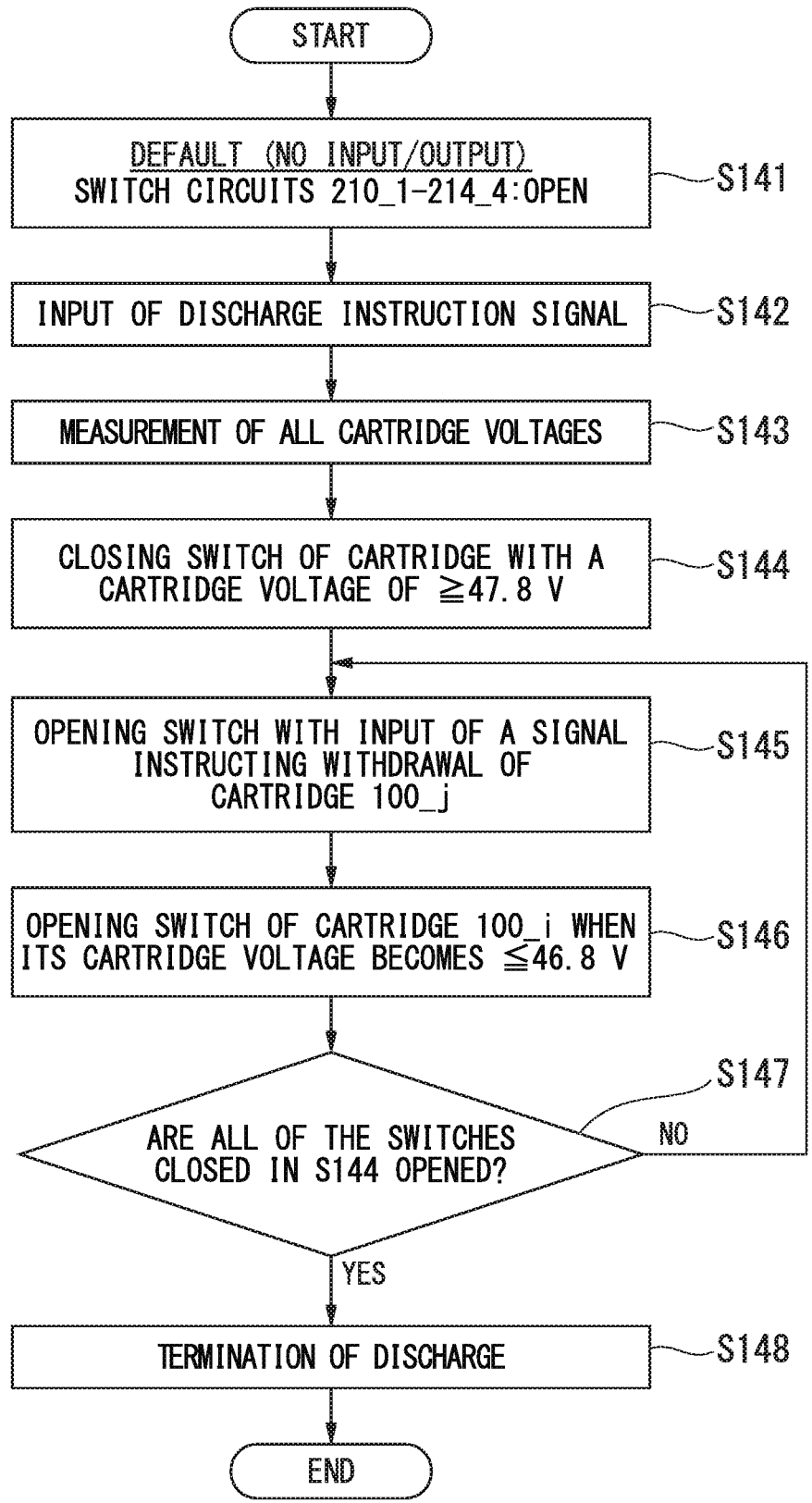
FIG. 15 is a flowchart explaining the withdrawal of a cartridge from the storage system 6b according to the second embodiment of the present invention during the discharge thereof.

Next, explanations are made on the method of withdrawing a cartridge during the discharge of the storage system 6b. FIG. 15 is a flowchart explaining the withdrawal of a cartridge from the storage system 6b according to the second embodiment of the present invention during the discharge thereof. Here, it is supposed that the cartridges which discharge in the process of FIG. 15 are Cartridge A to Cartridge C used in the explanation of FIG. 12. It is also supposed that three cartridges (Cartridge A, Cartridge B and Cartridge C) have a cartridge voltage of 47.8 V (the first voltage) or higher.

FIG. 15 shows a process to be performed when a signal instructing the withdrawal of the cartridge and a signal indicating the identification number of the cartridge 100_j are input to the control circuit 62 during the charging of at least one of the Cartridge A to Cartridge C. Here, the cartridge 100_j means any one of the Cartridge A to Cartridge C. For example, the cartridge 100_j may be one cartridge of the Cartridge A to Cartridge C, or two Cartridges A and B, or three Cartridges A, B and C.

In the absence of both a discharge instruction signal and a charge instruction signal from the power management device 4, the control circuit 62 leaves all of the switch circuits 210_1 to 210_4 in an OFF state (step S141). Specifically, the control circuit 62 maintains the switch control signal SWE_i, the PCS control signal PCSC_i and the PCS control signal PCSD_i (i=1 to 4) at L level at the switch circuits 210_1 to 210_4 and PCS61_1 to PCS61_4. In this status, with an input of a charge or discharge instruction signal from the power management device 4, it is possible, as needed, to perform a discharge from the cartridge (power supply to the power distribution unit 3) or a charge of the cartridge.

With an input of a discharge instruction signal from the power management device 4, the control circuit 62 moves to the phase of selection of a cartridge in the storage apparatus 60 and operation to supply an alternating current voltage to the power distribution unit 3 (step S142).

The control circuit 62 measures the cartridge voltage (output voltage) in each of the cartridges 100_1 to 100_4 (step S143). Based on the results of the measurement of the cartridge voltages, the control circuit 62 determines which of the switch circuits (switch circuit 210_i and switch circuit 68_i) connected to the cartridges should be selected.

The control circuit 62 turns on the switch circuits (switch circuit 210_i and switch circuit 68_i) corresponding to a cartridge having a voltage of 47.8 V or higher (step S144). In this instance, the control circuit 62 turns on the switch circuits respectively corresponding to Cartridge A to Cartridge C. Specifically, the control circuit 62 changes the switch control signal SWE_i and the PCS control signal PCSC_i corresponding to Cartridge A to Cartridge C from L level to H level, to thereby connect Cartridge A to Cartridge C to the power distribution unit 3. Further, with respect to each of Cartridge A to Cartridge C, the control circuit 62 also controls the DC-DC converter 64_i to increase the direct current voltage input from the cartridge to, for example, a direct current voltage of 300 V. Further, with respect to each of Cartridge A to Cartridge C, the control circuit 62 also controls the DC-AC inverter 63_i to convert the direct current voltage input from the DC-DC converter 64_i to an alternating current voltage of, for example, 100 V or 200 V. The alternating current voltage converted from the direct current voltage from each of the cartridges A to C is input to the power distribution unit 3 which, in turn, supplies an operating voltage through, for example, the conduction monitor 5 to the electrical appliances 51.

A user inputs an instruction to withdraw the cartridge 100_$j$ via the operation panel 4$b$ of the power management device 4 by the time when the voltages of all cartridges of Cartridge A to Cartridge C reach 46.8 V. A signal instructing the withdrawal of the cartridge and a signal indicating the identification number of the cartridge 100_$j$ are input to the control circuit 62.

The control circuit 62 turns off a switch circuit corresponding to the cartridge 100_$j$ (step S145). Specifically, the control circuit 62 changes the switch control signal SWE_$j$ and the PCS control signal PCSD_$j$ corresponding to the cartridge 100_$j$ from H level to L level. Thus, the switch circuit (switch circuit 210_$j$ and switch circuit 68_$j$) corresponding to the cartridge 100_$j$ is turned off and the PCS 61_$j$ is inactivated.

Then, with the cartridge 100_$j$ being non-selected, i.e., not discharging, the control circuit 62 outputs a signal indicating that the cartridge 100_$j$ is ready to be withdrawn, and transmits the signal to the power management device 4. The power management device 4 in turn displays on the display device provided on the operation panel 4$b$ an indication that the cartridge 100_$j$ is ready to be withdrawn from the storage system 6$b$. The user can withdraw the cartridge 100_$j$ safely because the cartridge 100_$j$ is excluded from the cartridges as target of discharge and is not connected to the PCS61_$j$.

The control circuit 62 monitors the cartridge voltages of the cartridges, and turns off a switch circuit when the voltage of the corresponding cartridge 100_$i$ becomes 46.8 V (the second voltage) or lower (step S146). Specifically, the control circuit 62 changes the switch control signal SWE_$i$ and the PCS control signal PCSD_$i$ corresponding to the cartridge 100_$i$ from H level to L level. Thus, the switch circuit (switch circuit 210_$i$ and switch circuit 68_$i$) corresponding to the cartridge 100_$i$ is turned off and the PCS 61_$i$ is inactivated. In this step S146, the cartridges except for the cartridge 100_$j$ which has been non-selected in step S145 are non-selected, i.e., disconnected from the power distribution unit 3.

The control circuit 62 judges if all of the switch circuits (switch circuit 210_$i$ and switch circuit 68_$i$) corresponding to the cartridges selected in step S144 are turned off (step S147). In this instance, the control circuit 62 judges if all of the switch circuits corresponding to Cartridge A to Cartridge C are turned off. The cartridge with its corresponding switch circuit OFF is either a cartridge non-selected in step S145 or a cartridge which is judged in step S146 as having a cartridge voltage of 46.8 V or lower. Therefore, in step S147, when all of the switch circuits corresponding to Cartridge A to Cartridge C are OFF, the cartridges selected in step S143 (all of Cartridge A to Cartridge C in this example) have a cartridge voltage of 46.8 V or lower.

When all of the switch circuits corresponding to Cartridge A to Cartridge C are turned off, the process moves on to step S148 (step S147—Yes). On the other hand, when there is a cartridge with its switch circuit still ON among the cartridges selected in step S144, the process moves on to step S145 (step S147—No). In this embodiment, there is a tendency that a cartridge voltage of 46.8 V or lower is still exhibited by cartridges except for a cartridge non-selected in step S145 or a cartridge which is judged in step S146 as having a cartridge voltage of 46.8 V or higher. Therefore, the ON state of the switch circuits (switch circuit 210_$i$ and switch circuit 68_$i$) corresponding to such remaining cartridges and the activated state of the PCS 61_$i$ are maintained. Through the repetition of step S145, step S146 and step S147, such remaining cartridges become non-selected (step S145, step S146) and all of the switch circuits corresponding to Cartridge A to Cartridge C are turned off, whereafter the process moves on to step S148 (step S147—Yes).

The control circuit 62, for example, outputs a signal indicating the termination of discharge, which is transmitted to the power management device 4 (step S148). The power management device 4 in turn displays on the display device provided on the operation panel 4$b$ an indication that the operation of discharge from the storage system 6$b$ is terminated.

As mentioned above, the electricity storage system 6$b$ according to the second embodiment of the present invention comprises a plurality of the cartridges 100_1 to 100_4 connected together in parallel, each cartridge comprising a plurality of cells connected together, wherein each of the cartridges independently maintains a voltage convertible to a commercial voltage, and wherein any of the cartridges which satisfy a predetermined voltage condition are charged with a direct voltage converted from a commercial voltage, or are caused to discharge so that the electricity storage system 6$b$ outputs a commercial voltage.

The electricity storage system 6$b$ is provided with one or more sets of:

a switch circuit (switch circuits 210_1 to 210_4), a DC-AC inverter 63_$i$ with its input node connected with the switch circuit, and a DC-DC converter 64_$i$ with its input node connected with an output node of the DC-AC inverter 63_$i$ and with its output node connected with the cartridge 100_$i$, wherein each set being provided between a node discharging the commercial voltage and each of the cartridges 100_1 to 100_4, the electricity storage system 6$b$ further comprising a control circuit 62 for controlling each switch circuit to allow or disallow the flow of current.

In the electricity storage system 6$b$ according to the second embodiment of the present invention, the battery packs are provided as cartridges so that the cartridges can be used as a power supply for not only stationary purpose but also replacement in other facilities or apparatuses. Thus, electricity can be efficiently utilized. Particularly, it becomes possible to provide an electricity storage system which is capable of outputting sufficient amount of energy through each cartridge without a need for equalization to balance energies between the cartridges.

The Third Embodiment

Figure 16:
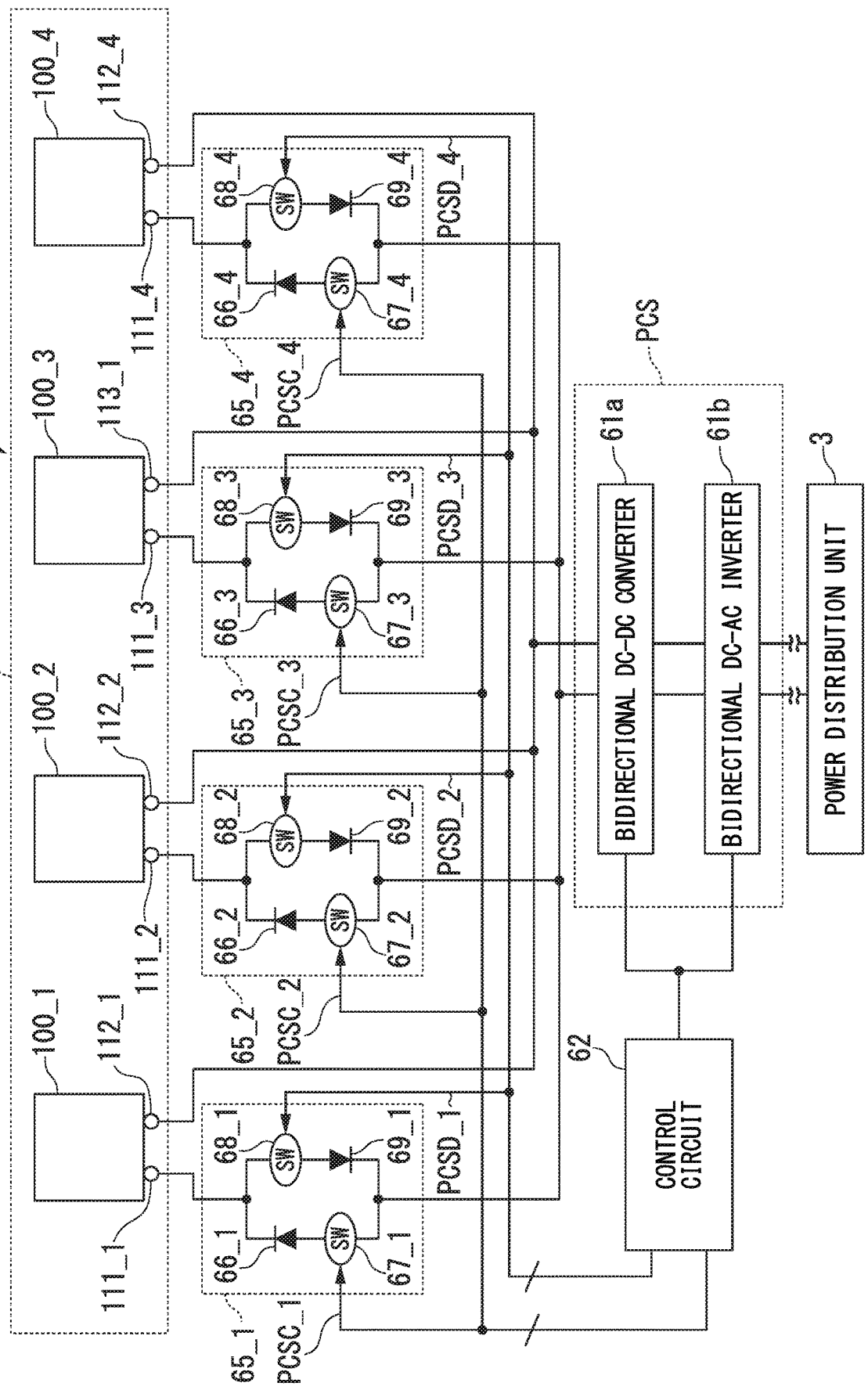
FIG. 16 is a diagram explaining the connections of cartridges 100_1 to 100_4 in the storage system 6c according to the third embodiment of the present invention.
Figure 17:
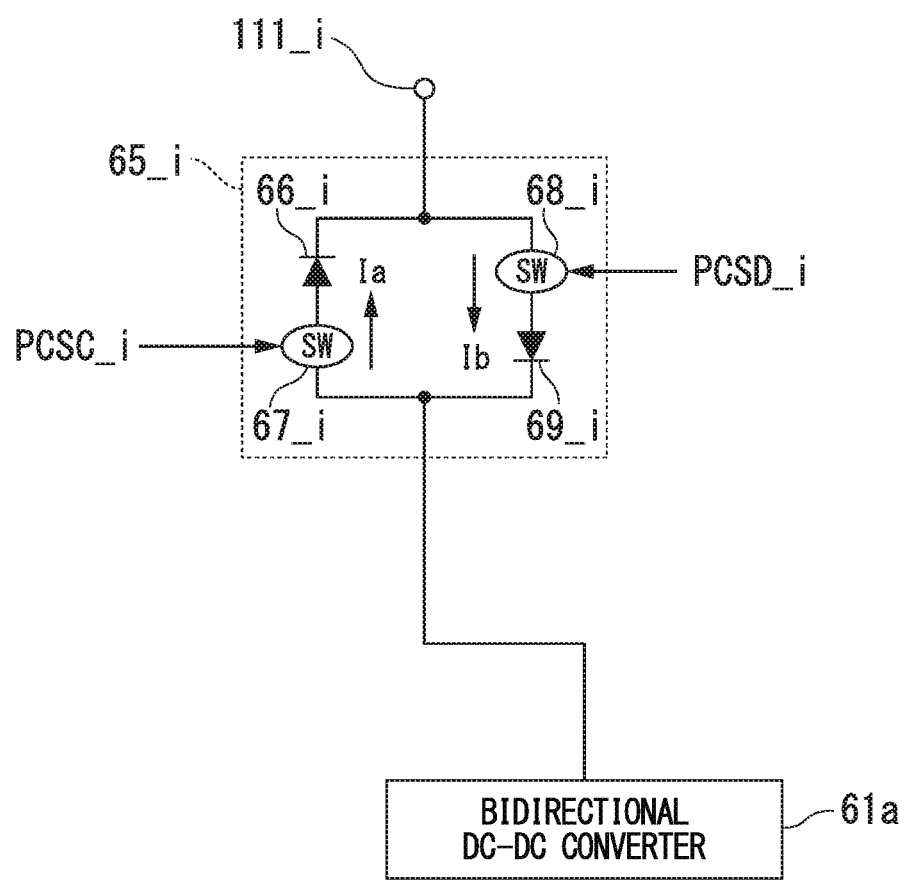
FIG. 17 is a diagram explaining the connection of a reverse current prevention circuit 65_i in the storage system 6c according to the third embodiment of the present invention.

FIG. 16 is a diagram explaining the connections of cartridges 100_1 to 100_4 in the storage system 6$c$ according to the third embodiment of the present invention. FIG. 17 is a diagram explaining the connection of a reverse current prevention circuit 65_$i$ in the storage system 6$c$ according to the third embodiment of the present invention.

The electricity storage system 6$c$ has a storage apparatus 60, a PCS (power conditioner), a control circuit 62 and a cross current prevention circuit (CCP) 65_1 to 65_4. The PCS is comprised of a DC-DC converter 61$a$ and a DC-AC inverter 61$b$.

As shown in FIG. 17, the cross current prevention circuit CCP65_$i$ is comprised of a diode 66_$i$ (the second diode), a switch circuit 67_$i$ (the second switch circuit), a switch circuit 68_i (the first switch circuit) and a diode 69_i (the first diode). Here, the "i" is any number of 1 to 4, and is used as designation corresponding to the subject of control (e.g., circuit or control signal). The cross current prevention circuit CCP65_i enables the prevention of cross current between the cartridges 100_1 to 100_4 by restricting the flow of current only in one direction with respect to each of the cartridges.

The diode 66_i and the switch circuit 67_i are connected in series. The diode 66_i and the switch circuit 67_i form a current flow path where the current Ia is cased to flow in only a charge direction with respect to the cartridge 100_i.

With respect to the diode 66_i, an anode terminal is connected to a terminal of the switch circuit 67_i, while a cathode terminal is connected to the + terminal 111_i of the cartridge 100_i.

With respect to the switch circuit 67_i, one terminal thereof is connected to the anode terminal of the diode 66_i, while another terminal is connected to an input/output terminal (positive electrode-side terminal) of the DC-DC converter 61a.

The diode 69_i and the switch circuit 68_i are connected in series. The diode 69_i and the switch circuit 68_i form a current flow path where the current Ib is cased to flow in only a discharge direction.

With respect to the switch circuit 68_i, one terminal thereof is connected to the + terminal 111_i of the cartridge 100_i, while another terminal is connected to an anode terminal of the diode 69_i.

With respect to the diode 69_i, an anode terminal is connected to a terminal of the switch circuit 68_i, while a cathode terminal is connected to the input/output terminal (positive electrode-side terminal) of the DC-DC converter 61a.

The switch circuit 67_i is controlled by the PCS control signal PCSC_i from the control circuit 62. Specifically, the switch circuit 67_i transitions to an OFF state when the PCS control signal PCSC_i is at L level and transitions to an ON state when the PCS control signal PCSC_i is at H level. The switch circuit 68_i is controlled by the PCS control signal PCSD_i from the control circuit 62. Specifically, the switch circuit 68_i transitions to an OFF state when the PCS control signal PCSD_i is at L level and transitions to an ON state when the PCS control signal PCSD_i is at H level.

When the switch circuit 68_i is in an OFF state and the switch circuit 67_i is in an ON state, the current Ia can be controlled to flow only in a charge direction with respect to the cartridge 100_i. When the switch circuit 67_i is in an OFF state and the switch circuit 68_i is in an ON state, the current Ib can be controlled to flow only in a discharge direction with respect to the cartridge 100_i.

The diode 66_i and the switch circuit 67_i in the cross current prevention circuit CCP65_i need to be connected in series, where the switch circuit 67_i may be provided on the side of + terminal 111_i and the diode 66_i may be provided on the side of DC-DC converter 61a, which are connected in series. The diode 69_i and the switch circuit 68_i in the cross current prevention circuit CCP65_i need to be connected in series, where the switch circuit 69_i may be provided on the side of + terminal 111_i and the diode 68_i may be provided on the side of DC-DC converter 61a, which are connected in series.

Turning now back to FIG. 16, the + terminals 111_1 to 111_4 of the cartridges 100_1 to 100_4 are connected via the cross current prevention circuit 65_1 to 65_4 to input/output terminal (positive electrode-side terminal) of the DC-DC converter 61a on the side of the storage apparatus 60. The − terminals 112_1 to 112_4 of the cartridges 100_1 to 100_4 are connected to input/output terminal (negative electrode-side terminal) of the DC-DC converter 61a on the side of the storage apparatus 60.

With respect to the DC-DC converter 61a constituting the PCS, the input/output terminal thereof (positive electrode-side terminal) on the side of the storage apparatus 60 is, as mentioned above, connected via the cross current prevention circuits 65_1 to 65_4 to the + terminals 111_1 to 111_4 of the cartridges 100_1 to 100_4. With respect to the DC-DC converter 61a constituting the PCS, the input/output terminal thereof (negative electrode-side terminal) on the side of the storage apparatus 60 is connected to the − terminals 112_1 to 112_4 of the cartridges 100_1 to 100_4.

With respect to the DC-AC inverter 61b constituting the PCS, the input/output terminals thereof on the side of the storage apparatus 60 are connected to the input/output terminals of the DC-DC converter 61a on the side of the power distribution unit 3, while the input/output terminals (nodes outputting the commercial voltage) of DC-AC inverter 61b are connected to the power distribution unit 3.

Further, in this embodiment, the PCS (power conditioner) has a construction in which it is comprised of a DC-DC converter and a DC-AC inverter. However, this is only one example, and the PCS may have a construction in which two pairs of a single direction DC-DC converter and a single direction DC-AC inverter (respectively, referred to as "PCS1" and "PCS2") are provided and the pairs supply voltages in the opposite directions. When this construction is employed, the connections between each of PCS1 and PCS2, the cartridges 100_1 to 100_4, and the power distribution unit 3 are as follows.

In the PCS1, the input terminal thereof (positive electrode-side terminal) on the side of the storage apparatus 60 is connected via the cross current prevention circuits 65_1 to 65_4 to the + terminals 111_1 to 111_4 of the cartridges 100_1 to 100_4. In the PCS 1, the input terminal thereof (negative electrode-side terminal) on the side of the storage apparatus 60 is connected to the − terminals 112_1 to 112_4 of the cartridges 100_1 to 100_4. In the PCS1, the output terminal thereof on the side of the storage apparatus 60 is connected to the power distribution unit 3.

On the other hand, in the PCS2, the output terminal thereof (positive electrode-side terminal) on the side of the storage apparatus 60 is connected via the cross current prevention circuits 65_1 to 65_4 to the + terminals 111_1 to 111_4 of the cartridges 100_1 to 100_4. In the PCS2, the output terminal thereof (negative electrode-side terminal) on the side of the storage apparatus 60 is connected to the − terminals 112_1 to 112_4 of the cartridges 100_1 to 100_4. In the PCS2, the input terminal thereof on the side of the storage apparatus 60 is connected to the power distribution unit 3.

Thus, the PCS (power conditioner) converts a commercial voltage into a direct voltage to charge the cartridges 100_1 to 100_4 simultaneously or causes the cartridges 100_1 to 100_4 to discharge simultaneously so that a commercial voltage is output, and either a DC-DC converter or a DC-AC inverter may be used.

The control circuit 62 allows the DC-DC converter 61a to increase or decrease voltage and allows the DC-AC inverter 61b to perform a power conversion operation in accordance with the control signals (a signal instructing discharge and a signal instructing charge) transmitted from the power management device 4.

Specifically, with an input of a signal instructing discharge, the control circuit 62 controls the DC-DC converter 61a to increase the direct current voltage input to the input/output terminals thereof (i.e., sustaining voltage of the cartridge) on the side of the storage apparatus 60, and to output the increased direct current voltage (e.g., a direct current voltage of 300 V) to the input/output terminals on the side of the power distribution unit 3. The control circuit 62 also controls the DC-AC inverter 61b to convert the direct current voltage input to the input/output terminals thereof on the side of the storage apparatus 60 to an alternating current voltage (e.g., an alternating current voltage of 100 V or 200 V), and to output the alternating current voltage to the input/output terminals on the side of the power distribution unit 3. The alternating current voltage is input to the power distribution unit 3 which, in turn, supplies an operating voltage through, for example, the conduction monitor 5 to the electrical appliances 51. Further, the control of the PCS by the control circuit 62 is performed through the period when an input of a signal instructing discharge is being received.

With an input of a signal instructing charge, the control circuit 62 controls the DC-AC inverter 61b to convert the alternating current voltage input to the input/output terminals thereof on the side of the power distribution unit 3 to a direct current voltage, and to output the direct current voltage to the input/output terminals on the side of the storage apparatus 60. The control circuit 62 also controls the DC-DC converter 61a to decrease the direct current voltage input to the input/output terminals thereof on the side of the power distribution unit 3, and to output the decreased direct current voltage to the input/output terminals on the side of the storage apparatus 60. The cartridges 100_1 to 100_4 in the storage apparatus 60 transitions into a state of being charged with the supply of the aforementioned direct current voltage. Further, the control of the PCS by the control circuit 62 is performed through the period when an input of a signal instructing charge is being received.

The control circuit 62 also performs the open-close control (nonconduction or conduction) of the switch circuits 67_1 to 67_4 and the switch circuits 68_1 to 68_4 of the cross current prevention circuit 65_1 to 65_4, in accordance with the control signals transmitted from the power management device 4.

In the absence of both a charge instruction signal and a discharge instruction signal (i.e., in a default condition), the control circuit 62 leaves open (nonconducting, OFF) all of the switch circuits 67_1 to 67_4 and the switch circuits 68_1 to 68_4 of the cross current prevention circuit 65_1 to 65_4.

Specifically, when the control signal is a discharge instruction signal (i.e., a signal instructing discharge from the storage apparatus 60), the control circuit 62 keeps the PCS control signal PCSD_1 to PCSD_4 at H level and keeps the PCS control signal PCSC_1 to PCSC_4 at L level. With respect to the cross current prevention circuit 65_1 to 65_4, the control circuit 62 also performs a control to allow conduction of the switch circuits 68_1 to 68_4 and disallow conduction of the switch circuits 671 to 67_4. In this instance, with respect to each cross current prevention circuit 65_i, the switch circuit 68_i and the diode 69_i form a current flow path where the current Ib is cased to flow only in a discharge direction.

Specifically, when the control signal is a charge instruction signal (i.e., a signal instructing charge of the storage apparatus 60), the control circuit 62 keeps the PCS control signal PCSC_1 to PCSC_4 at H level and keeps the PCS control signal PCSD_1 to PCSD_4 at L level. With respect to the cross current prevention circuit 65_1 to 65_4, the control circuit 62 also performs a control to allow conduction of the switch circuits 67_1 to 67_4 and disallow conduction of the switch circuits 68_1 to 68_4. In this instance, with respect to each cross current prevention circuit 65_i, the switch circuit 67_i and the diode 66_i form a current flow path where the current Ia is cased to flow only in a charge direction.

Here, it is supposed that the control signal input from the power management device 4 represents a signal instructing withdrawal of a cartridge and a signal indicating the identification number of the cartridge. With respect to the cross current prevention circuit 65_1 to 65_4, the control circuit 62 also performs a control during discharging to allow conduction of the switch circuits 68_1 to 68_4 and disallow conduction of the switch circuits 67_1 to 67_4. With an input of a signal instructing the withdrawal of the cartridge and a signal indicating the identification number of the cartridge, the control circuit 62 changes the PCS control signal PCSD_j ("j" designates a cartridge to be withdrawn) to L level and disallows conduction of the switch circuit 68_j corresponding to the cartridge intended by a user to be removed. Then, the control circuit 62 outputs a signal indicating that the cartridge intended by the user to be removed is ready to be withdrawn, and transmits the signal to the power management device 4. The power management device 4 displays on the display screen of the operation panel 4b an indication that the cartridge is ready to be withdrawn, thereby enabling the user to safely withdraw an intended cartridge from the storage apparatus 60.

Here, it is supposed that the control signal input from the power management device 4 represents a signal instructing withdrawal of a cartridge during charging and a signal indicating the identification number of the cartridge. With respect to the cross current prevention circuit 65_1 to 65_4 in such a case where the charging is performed, the switch circuits 67_1 to 67_4 are conducting whereas the switch circuits 68_1 to 68_4 are not conducting. With an input of a signal instructing the withdrawal of the cartridge and a signal indicating the identification number of the cartridge, the control circuit 62 changes the PCS control signal PCSC_j ("j" designates a cartridge to be withdrawn) to L level and disallows conduction of the switch circuit 67_j corresponding to the cartridge intended by a user to be removed. Then, the control circuit 62 outputs a signal indicating that the cartridge intended by the user to be removed is ready to be withdrawn, and transmits the signal to the power management device 4. The power management device 4 displays on the display screen of the operation panel 4b an indication that the cartridge is ready to be withdrawn, thereby enabling the user to safely withdraw an intended cartridge from the storage apparatus 60.

Figure 18:
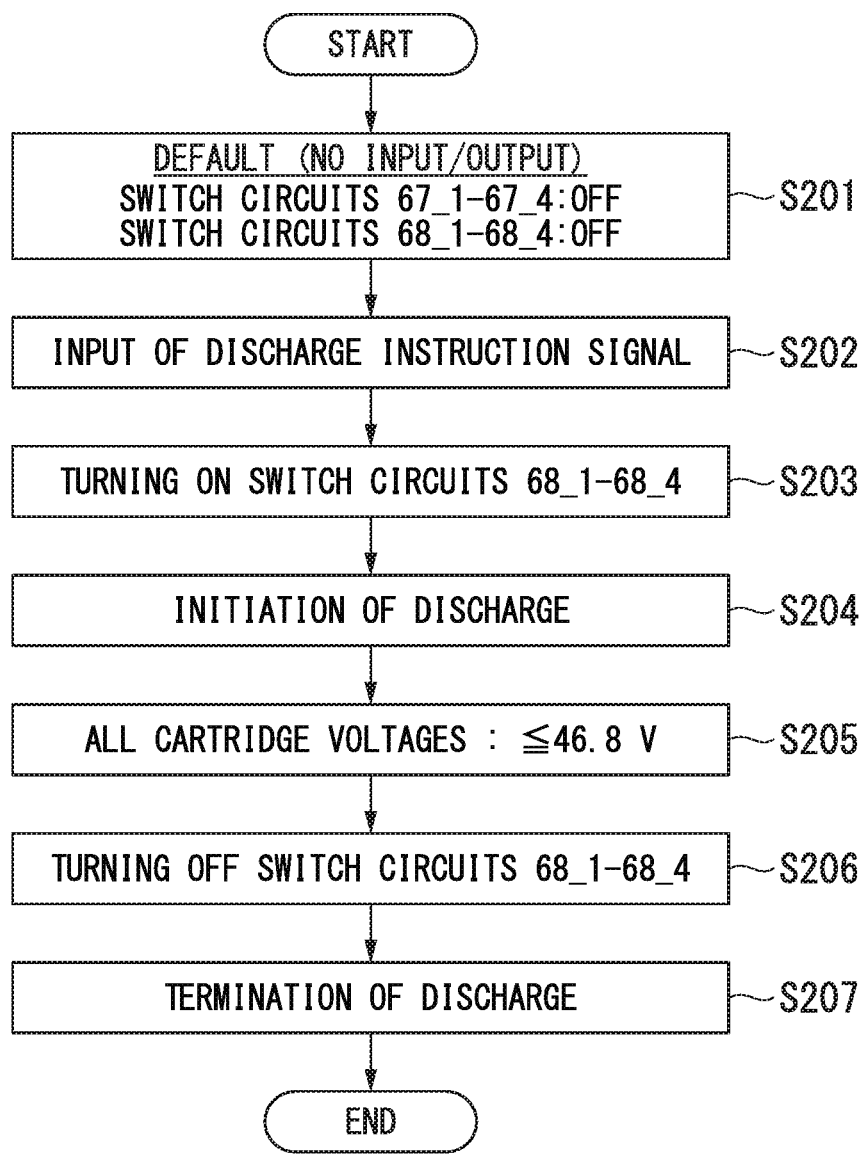
FIG. 18 is a diagram explaining the discharge from the storage system 6c according to the third embodiment of the present invention.

FIG. 18 is a flowchart explaining the discharge from the storage system 6c according to the third embodiment of the present invention.

In the absence of both a discharge instruction signal and a charge instruction signal from the power management device 4, the control circuit 62 leaves OFF all of the switch circuits 67_1 to 67_4 and the switch circuits 68_1 to 68_4 of the cross current prevention circuit 65_1 to 65_4 (step S1). Specifically, the control circuit 62 maintains the PCS control signals PCSC_1 to PCSC_4 and the PCS control signals PCSD_1 to PCSD_4 at L level.

With an input of a discharge instruction signal from the power management device 4, the control circuit 62 moves to the phase of operation to supply an alternating current voltage from the cartridge to the power distribution unit 3 (step S2). Further, the control circuit 62 changes the PCS control signals PCSD_1 to PCSD_4 from L level to H level.

This turns on the switch circuits 68_1 to 68_4 with respect to the cross current prevention circuit 65_1 to 65_4 (step S3). Thus, with respect to each cross current prevention circuit 65_i, the switch circuit 68_i and the diode 69_i form a current flow path where the current Ib is cased to flow only in a discharge direction of the cartridge 100_i.

The control circuit 62 also controls the DC-DC converter 61a to increase the direct current voltage input from the cartridges 100_1 to 100_4 to, for example, a direct current voltage of 300 V. The control circuit 62 also controls the DC-AC inverter 61b to convert the direct current voltage input from the DC-DC converter 61a to an alternating current voltage of, for example, 100 V or 200 V. The alternating current voltage converted from the direct current voltage from each of the cartridges 100_1 to 100_4 is input to the power distribution unit 3 which, in turn, supplies an operating voltage through, for example, the conduction monitor 5 to the electrical appliances 51. Thus, a plurality of the cartridges 100_1 to 100_4 are simultaneously in a discharging state (step S4).

The control circuit 62 monitors the cartridge voltages of the cartridges, and changes the PCS control signals PCSD_1 to PCSD_4 from H level to L level when the voltages of all of the cartridge 100_1 to 100_4 becomes 46.8 V (the first voltage) or lower (step S5).

Thus, with respect to the cross current prevention circuits 65_1 to 65_4, the switch circuits 68_1 to 68_4 are turned OFF (step S6) and both current paths of the discharge current Ib and the charge current Ia are interrupted at the respective cross current prevention circuits 65_i.

The control circuit 62, for example, outputs a signal indicating the termination of discharge, which is transmitted to the power management device 4 (step S7). The power management device 4 in turn displays on the display device provided on the operation panel 4b an indication that the operation of discharge from the storage system 6c is terminated. Alternatively, it is also possible to employ a construction such that the power management device 4 displays an indication that the storage system 6c is discharging during the period from the time of output of a discharge instruction signal from the power management device 4 to the storage system 6c to the time of termination of the discharge.

Figure 19:
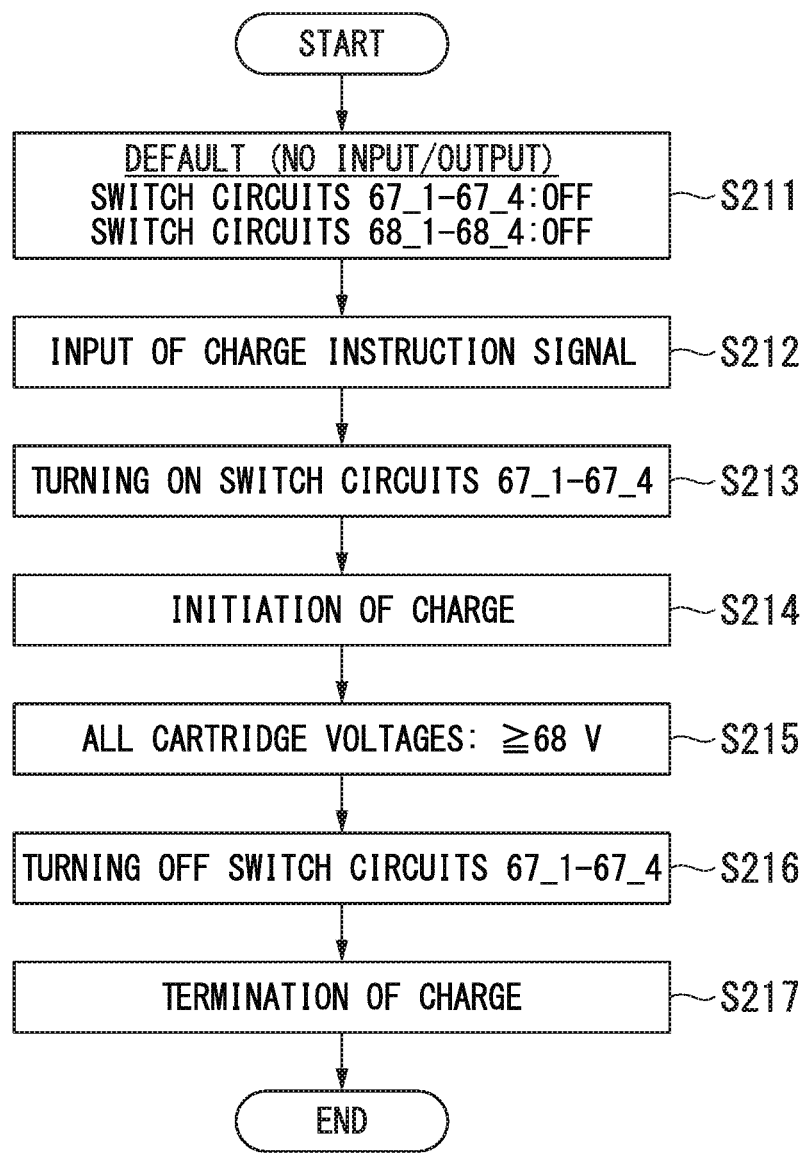
FIG. 19 is a diagram explaining the charge of the storage system 6c according to the third embodiment of the present invention.

Next, explanations are made on the method of charging the storage system 6c. FIG. 19 is a flowchart explaining the charge of the storage system 6c according to the third embodiment of the present invention.

In the absence of both a discharge instruction signal and a charge instruction signal from the power management device 4, the control circuit 62 leaves OFF all of the switch circuits 67_1 to 67_4 and the switch circuits 68_1 to 68_4 of the cross current prevention circuit 65_1 to 65_4 (step S11). Specifically, the control circuit 62 maintains the PCS control signals PCSC_1 to PCSC_4 and the PCS control signals PCSD_1 to PCSD_4 at L level.

With an input of a charge instruction signal from the power management device 4, the control circuit 62 moves to the phase of operation to supply a direct current voltage to the cartridge (step S12). Further, the control circuit 62 changes the PCS control signals PCSC_1 to PCSC_4 from L level to H level. This turns on the switch circuits 67_1 to 67_4 with respect to the cross current prevention circuit 65_1 to 65_4 (step S13). Thus, with respect to each cross current prevention circuit 65_i, the switch circuit 67_i and the diode 66_i form a current flow path where the current Ia is cased to flow only in a charge direction of the cartridge 100_i.

The control circuit 62 also controls the DC-AC inverter 61b to convert the alternating current voltage input from the power distribution unit 3 to a direct current voltage. The control circuit 62 also controls the DC-DC converter 61a to decrease the direct current voltage input from DC-DC converter 61a to a lower direct current voltage. Thus, a plurality of the cartridges 100_1 to 100_4 are simultaneously in a state of being charged (step S14).

The control circuit 62 monitors the cartridge voltages of the cartridges, and changes the PCS control signals PCSC_1 to PCSC_4 from H level to L level when the voltages of all of the cartridge 100_1 to 100_4 becomes 68 V (the second voltage) or higher (step S15). Thus, with respect to the cross current prevention circuits 65_1 to 65_4, the switch circuits 67_1 to 67_4 are turned OFF (step S16) and both current paths of the discharge current Ib and the charge current Ia are interrupted at the respective cross current prevention circuits 65_i. However, the second voltage varies depending on the number of cells in the cartridge. For example, when the final voltage of a cell is 4.15 V and 100 of such cells are serially connected in a cartridge, the second voltage of the cartridge is 415 V.

The control circuit 62, for example, outputs a signal indicating the termination of charge, which is transmitted to the power management device 4 (step S17). The power management device 4 in turn displays on the display device provided on the operation panel 4b an indication that the operation of charging the storage system 6c is terminated. Alternatively, it is also possible to employ a construction such that the power management device 4 displays an indication that the storage system 6c is being charged during the period from the time of output of a charge instruction signal from the power management device 4 to the storage system 6c to the time of termination of charging.

Figure 20:
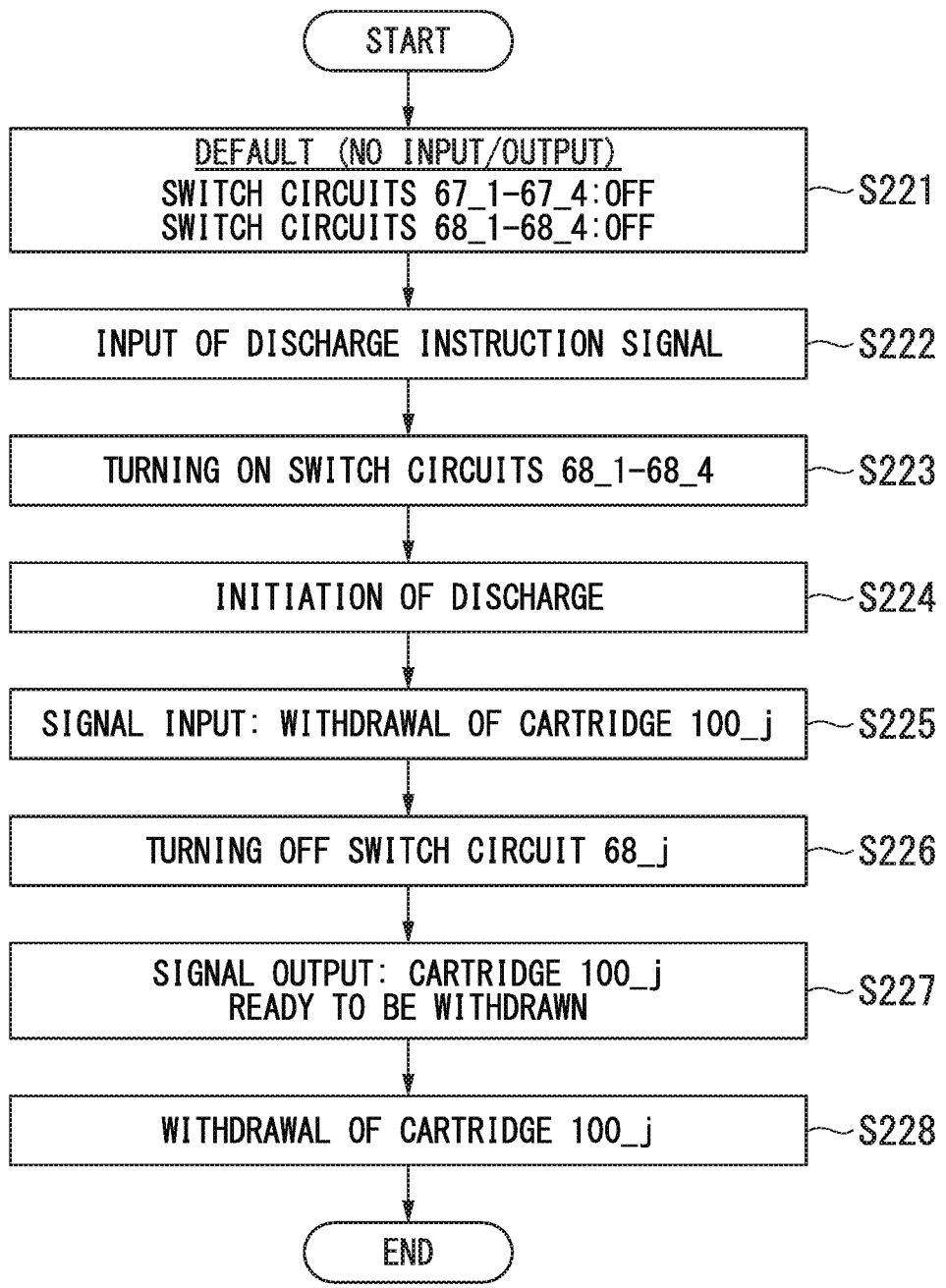
FIG. 20 is a flowchart explaining the withdrawal of a cartridge from the storage system 6c according to the third embodiment of the present invention during the discharge thereof.

Next, explanations are made on the method of withdrawing a cartridge during the charging of the storage system 6c. FIG. 20 is a flowchart explaining the withdrawal of a cartridge from the storage system 6c according to the third embodiment of the present invention during the discharge thereof.

FIG. 20 shows a process to be performed when a signal instructing the withdrawal of the cartridge and a signal indicating the identification number of the cartridge 100_j are input to the control circuit 62 during the discharge of the cartridge. Here, the cartridge 100_j means any one of the cartridges 100_1 to 100_4 which is to be withdrawn.

In the absence of both a discharge instruction signal and a charge instruction signal from the power management device 4, the control circuit 62 leaves OFF the switch circuits 67_1 to 67_4 and the switch circuits 68_1 to 68_4 of the cross current prevention circuit 65_1 to 65_4 (step S21). Specifically, the control circuit 62 maintains the PCS control signals PCSC_1 to PCSC_4 and the PCS control signals PCSD_1 to PCSD_4 at L level.

With an input of a discharge instruction signal from the power management device 4, the control circuit 62 moves to the phase of operation to supply an alternating current voltage from the cartridges 100_1 to 100_4 to the power distribution unit 3 (step S22). Further, the control circuit 62 changes the PCS control signals PCSD_1 to PCSD_4 from L level to H level. This turns on the switch circuits 68_1 to 68_4 with respect to the cross current prevention circuit 65_1 to 65_4 (step S23). Thus, with respect to each cross current prevention circuit 65_i, the switch circuit 68_i and the diode 69_i form a current flow path where the current Ib is cased to flow only in a discharge direction of the cartridge 100_i. The control circuit 62 also controls the DC-DC converter 61a to increase the direct current voltage input from the cartridges 100_1 to 100_4 to, for example, a direct current voltage of 300 V. The control circuit 62 also controls the DC-AC inverter 61b to convert the direct current voltage input from the DC-DC converter 61a to an alternating current voltage of, for example, 100 V or 200 V. The alternating current voltage converted from the direct current voltage from each of the cartridges 100_1 to 100_4 is input to the power distribution unit 3 which, in turn, supplies an operating voltage through, for example, the conduction monitor 5 to the electric appliances 51 (step S24).

When a user inputs an instruction to withdraw the cartridge 100_j via the operation panel 4b of the power management device 4 by the time when the voltages of all cartridges of the cartridges 100_1 to 100_4 reach 46.8 V (the first voltage), a signal instructing the withdrawal of the cartridge and a signal indicating the identification number of the cartridge 100_j are input to the control circuit 62 (step 25). However, the first voltage varies depending on the number of cells in the cartridge. For example, when the final voltage of a cell is 2.7 V and 100 of such cells are serially connected in a cartridge, the second voltage of the cartridge is 270 V.

The control circuit 62 turns off a switch circuit 68_j of the cross current prevention circuit 65_j corresponding to the cartridge 100_j (step S26). Specifically, the control circuit 62 changes the PCS control signal PCSD_j from H level to L level. This turns off a switch circuit 68_j of the cross current prevention circuit 65_j corresponding to the cartridge 100_j.

Then, with the cartridge 100_j not discharging, the control circuit 62 outputs a signal indicating that the cartridge 100_j is ready to be withdrawn, and transmits the signal to the power management device 4. The power management device 4 in turn displays on the display device provided on the operation panel 4b an indication that the cartridge 100_j is ready to be withdrawn from the storage system 6c (step S27). The user can withdraw the cartridge 100_j safely because the cartridge 100_j is excluded from the cartridges as target of discharge (step S28).

Figure 21:
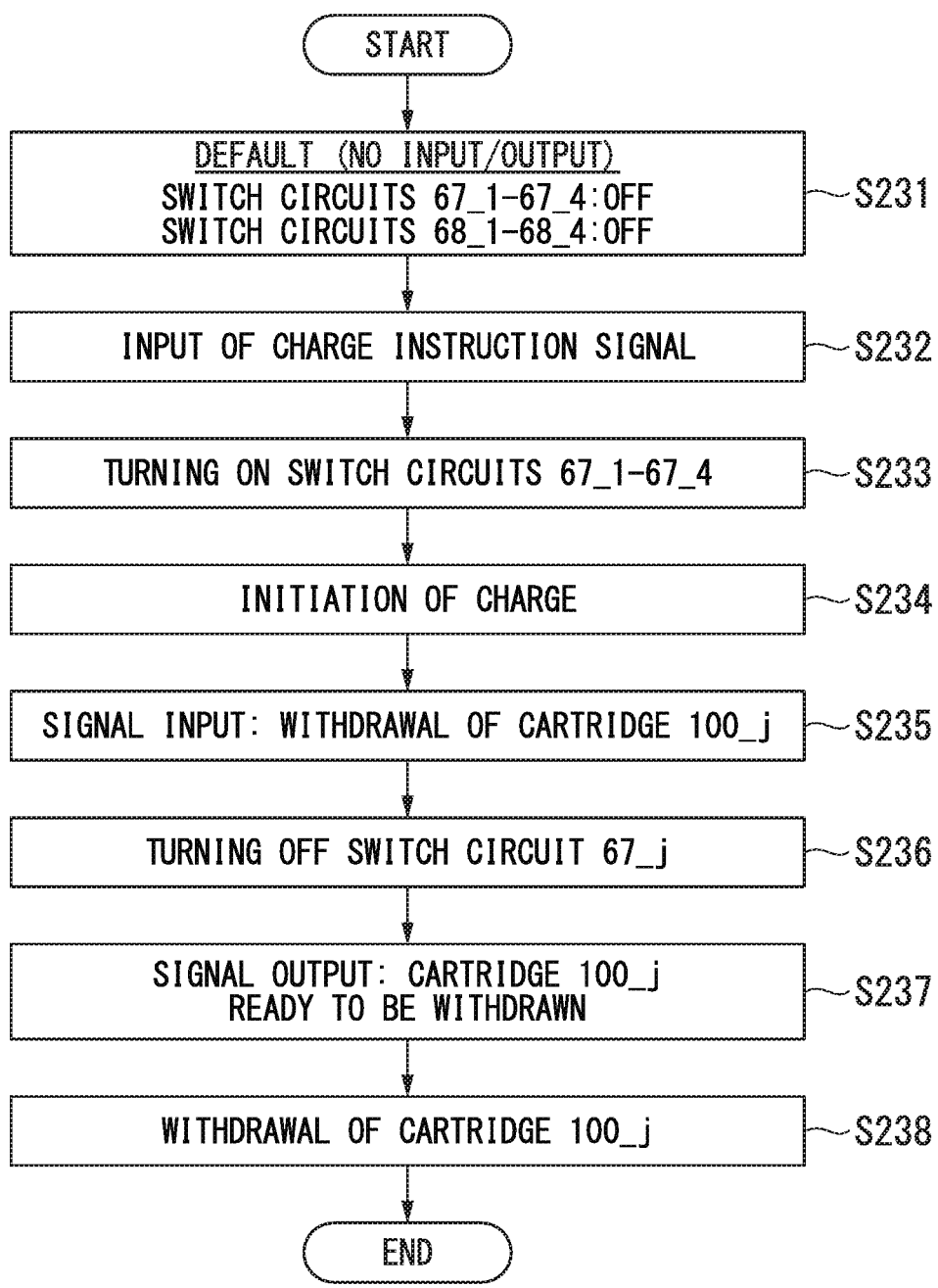
FIG. 21 is a diagram explaining the withdrawal of a cartridge from the storage system 6c according to the third embodiment of the present invention during the charge thereof.

Next, explanations are made on the method of withdrawing a cartridge during the charging of the storage system 6c. FIG. 21 is a flowchart explaining the withdrawal of a cartridge from the storage system 6c according to the third embodiment of the present invention during the charge thereof.

FIG. 21 shows a process to be performed when a signal instructing the withdrawal of the cartridge and a signal indicating the identification number of the cartridge 100_j are input to the control circuit 62 during the charge of the cartridge. Here, the cartridge 100_j means any one of the cartridges 100_1 to 100_4 which is to be withdrawn.

In the absence of both a discharge instruction signal and a charge instruction signal from the power management device 4, the control circuit 62 leaves OFF all of the switch circuits 67_1 to 67_4 and the switch circuits 68_1 to 68_4 of the cross current prevention circuit 65_1 to 65_4 (step S31). Specifically, the control circuit 62 maintains the PCS control signals PCSC_1 to PCSC_4 and the PCS control signals PCSD_1 to PCSD_4 at L level.

With an input of a charge instruction signal from the power management device 4, the control circuit 62 moves to the phase of operation to supply a direct current voltage to the cartridges 100_1 to 100_4 (step S32). Further, the control circuit 62 changes the PCS control signals PCSC_1 to PCSC_4 from L level to H level. This turns on the switch circuits 67_1 to 67_4 with respect to the cross current prevention circuit 65_1 to 65_4 (step S33). Thus, with respect to each cross current prevention circuit 65_i, the switch circuit 67_i and the diode 66_i form a current flow path where the current Ia is cased to flow only in a charge direction of the cartridge 100_i. The control circuit 62 also controls the DC-AC inverter 61b to convert the alternating current voltage input from the power distribution unit 3 to a direct current voltage. The control circuit 62 also controls the DC-DC converter 61a to decrease the direct current voltage input from AC-DC converter 61b to a lower direct current voltage (step S34).

When a user inputs an instruction to withdraw the cartridge 100_j via the operation panel 4b of the power management device 4 by the time when the voltages of all cartridges of the cartridges 100_1 to 100_4 reach 68 V (the second voltage), a signal instructing the withdrawal of the cartridge and a signal indicating the identification number of the cartridge 100_j are input to the control circuit 62 (step S35).

The control circuit 62 turns off a switch circuit 67_j of the cross current prevention circuit 65_j corresponding to the cartridge 100_j (step S36). Specifically, the control circuit 62 changes the PCS control signal PCSC_j of the cross current prevention circuit 65_j corresponding to the cartridge 100_j from H level to L level. This turns off a switch circuit 67_j of the cross current prevention circuit 65_j corresponding to the cartridge 100_j.

Then, with the cartridge 100_j not being charged, the control circuit 62 outputs a signal indicating that the cartridge 100_j is ready to be withdrawn, and transmits the signal to the power management device 4. The power management device 4 in turn displays on the display device provided on the operation panel 4b an indication that the cartridge 100_j is ready to be withdrawn from the storage system 6c (step S37). The user can withdraw the cartridge 100_j safely because the cartridge 100_j is excluded from the cartridges as target of charge (step S38).

Figure 22A:
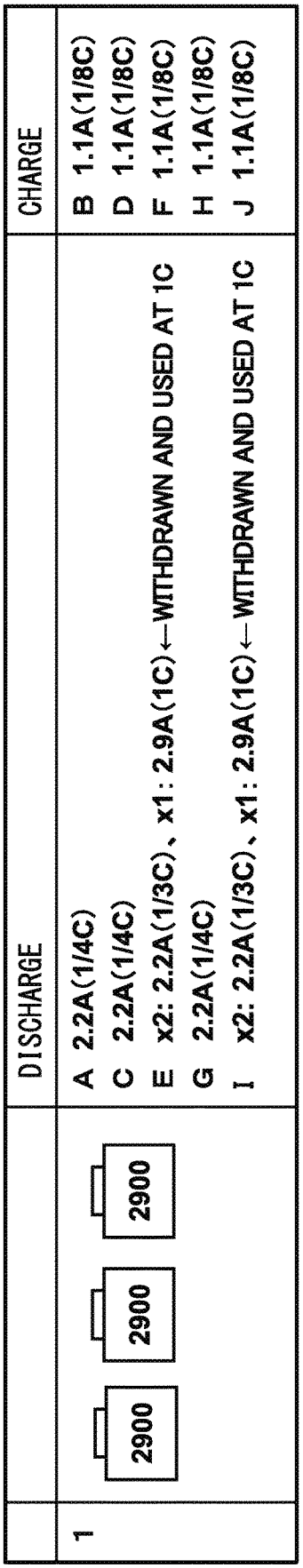
FIG. 22A is a diagram showing the results of the first cycle test of the storage system 6c according to the third embodiment of the present invention.

Next, explanations are made on the results of cycle test where the charge/discharge of a plurality of cartridges according to an embodiment of the present invention is simultaneously performed. FIGS. 22A to 22C are diagrams showing the results of the first cycle test of the storage system 6c according to the third embodiment of the present invention. FIGS. 23A to 23C are diagrams showing the results of the second cycle test of the storage system 6c according to the third embodiment of the present invention.

In the first cycle test, cartridges of the same capacity (2,900 Wh) as shown in FIG. 22A are used, and the charge/discharge is repeated under conditions as shown in FIG. 22A. FIG. 22B shows the results of the discharge, and FIG. 22C shows the results of the charge. In this cycle test, no current was observed while the charge and the discharge were not performed, whereby it was confirmed that no cross current occurred. This is attributable to the function of the cross current prevention circuit comprised of a diode and a switch circuit. The charge capacity and the discharge capacity did not reach the theoretical values, which is considered to be due to the occurrence of heat loss at the diode.

In the second cycle test, cartridges of the different capacities (2,900 Wh, 2,900 Wh, 2,400 Wh) as shown in FIG. 23A are used, and the charge/discharge is repeated under conditions as shown in FIG. 23A. FIG. 23B shows the results of the discharge, and FIG. 23C shows the results of the charge. In this cycle test also, no current was observed while the charge and the discharge were not performed, whereby it was confirmed that no cross current occurred. This is attributable to the function of the cross current prevention circuit comprised of a diode and a switch circuit. The charge capacity and the discharge capacity did not reach the theoretical values, which is considered to be due to the occurrence of heat loss at the diode.

As mentioned above, the electricity storage system 6c according to the third embodiment of the present invention comprises a plurality of the cartridges 100_1 to 100_4 connected together in parallel, each cartridge comprising a plurality of cells connected together, and the cross current prevention circuit 65_1 to 65_4, which restrict the current in each of the cartridges 100_1 to 100_4 so as to cause the current to flow in one direction selected from a discharge direction and a charge direction, wherein the cartridges 100_1 to 100_4 connected together in parallel are simultaneously charged with a direct voltage converted from a commercial voltage, or the cartridges 100_1 to 100_4 connected together in parallel are caused to discharge simultaneously so that a commercial voltage is output.

The electricity storage system 6c according to the third embodiment of the present invention comprises: a DC-DC converter 61a provided in association with the cartridges 100_1 to 100_4 connected together in parallel; a DC-AC inverter 61b provided between the DC-DC converter 61a and a node outputting the commercial voltage; cross current prevention circuits 65_1 to 65_4 comprising diodes 66_1 to 66_4, 69_1 to 69_4 and switch circuits 67_1 to 67_4, 68_1 to 68_4 which restrict the current in each of the cartridges 100_1 to 100_4 so as to cause the current to flow in one direction selected from a discharge direction and a charge direction; and a control circuit 62 for controlling the switch circuits 67_1 to 67_4, 68_1 to 68_4 of the cross current prevention circuits 65_1 to 65_4 to allow or disallow the flow of current.

By the electricity storage system 6c according to the third embodiment of the present invention, a plurality of cartridges can simultaneously discharge or be charged; hence, the discharge or charge can be performed efficiently. Further, by the electricity storage system 6c according to the third embodiment of the present invention, the cross current prevention circuits 65_1 to 65_4 which restrict the current to flow in one direction are provided, thereby enabling the prevention of cross current from occurring even when simultaneous discharge or charge is carried out with respect to the cartridges.

The Fourth Embodiment

Hereinbelow, explanations are made with respect to the battery management system and the storage system according to the fourth embodiment of the present invention, referring to the drawings.

The electricity storage system is a system which performs a management wherein the electricity derived from the natural energy and the grid connected power (commercial power) are stored in cells provided in a cartridge, and the power is supplied for stationary purpose inside a building from the cells provided in the cartridge. As examples of electricity derived from the natural energy, there can be mentioned electricity obtained by the solar photovoltaics or the wind power generation.

The electricity storage system comprises a lithium ion secondary battery (hereinafter, referred to as "LiB") as a storage device, and performs a battery management using a battery pack of a cartridge-type (hereinafter, simply referred to as a "cartridge") in which a plurality of LiB cells are connected and cartridges are fixed.

The cartridges are easily replaceable in the storage system. In the present invention, not only is the electricity storage system usable for residential houses, buildings, plants, etc., but the cartridge can diverted to use in a bicycle, an electric vehicle etc. Further, the system can be easily maintained.

This embodiment relates to a system which stores the electricity derived from the natural energy and the grid connected power, and performs a management thereof. Specifically, the present invention provides a cartridge comprising a plurality of LiB cells connected together and an electricity storage system which manages the power supply with the fixed cartridges. In order to realize these, it is necessary that the cells are electrically connected together inside the cartridge, and such cartridges are connected in parallel. Such a cartridge needs to be safely replaceable; therefore, the electrical connection portion between the cartridge and the storage system is protected with a cover. Alternatively, the power management can also be performed wireless. Further, cartridges having different residual battery capacities may be introduced into the electricity storage system. Therefore, the electricity storage system of the present invention may have a means to perform a leveling of capacities of the cartridges.

According to the first aspect of this embodiment of the present invention, there is provided an electricity storage system comprising a plurality of cartridges connected together in parallel, each cartridge comprising a plurality of cells (lithium ion secondary batteries) connected together, wherein a voltage in each of the cartridges is maintained at a voltage convertible to a commercial voltage.

In the electricity storage system, a plurality of cartridges are connected in parallel; hence, the storage system can be operated irrespective of the number of cartridges mounted therein. The voltage of the electricity storage system equals to the voltage of the cartridge. Therefore, when connected to the electricity storage system, each cartridge needs to maintain a voltage convertible to a commercial voltage. As a power converter for converting voltage, there can be mentioned a voltage transformer. This power converter converts a direct current voltage output from the cartridge to a predetermined voltage (for example, 100 V or 200 V).

Further, in the second aspect of this embodiment, there is provided a battery management system and an electricity storage system which are operable when the number of cartridges mounted in the system is (a) which is a positive number obtained by the following formula: (n)−1, wherein (n) is a positive number representing a maximum number of mountable cartridges (for example, (n)<30). For applying the cartridges to other use when connected to the electricity storage system, the storage system must be operated with a smaller number of cartridges than the initial number of cartridges. In such a case, a battery management system is required which can operate even when the number of cartridges is (a), though the output may become lower.

In the third aspect of this embodiment, there are provided cartridges used in the first aspect which have approximately the same shape. Due to approximately the same shape, the cartridges are used for various purposes without any limitation.

Further, according to the fourth aspect of this embodiment, there are provided a battery management system and an electricity storage system, wherein, when cartridges with different residual capacities are mounted to the system of the first aspect, the cartridges except for one with a less residual capacity output electricity until voltages of all of the cartridges become equal, whereafter all of the cartridges output electricity. In an electricity storage system comprises cartridges, when a cartridge is used for other purpose and is returned to the storage system, this results in that the returned cartridge has a residual capacity different from those of other cartridges. In conventional systems, no switch is provided between the cartridges; therefore, the voltage of a cartridge having the smallest residual capacity becomes the output voltage of the storage system, resulting in the lowering of performance of the entire system. On the other hand, in this aspect of the present invention, this problem is solved by the switches provided between the cartridges, which force a cartridge with a less residual capacity out of the circuit. Further, when only cartridges with larger residual capacities are used while cartridges with smaller residual capacities are not used, only cartridges with larger residual capacities are connected to the electricity storage system while cartridges with smaller residual capacities are not connected to the electricity storage system. When the residual capacities of the cartridges become equal as a result of supplying power through the connected cartridges, the cartridges unconnected by that time is then connected to the electricity storage system to supply power.

Further, according to the fifth aspect of this embodiment, there are provided a battery management system and an electricity storage system, wherein a circuit is provided between the cartridges, which enables the power transmission from the cartridges with larger residual capacities to the cartridges with smaller residual capacities. The features of this fifth aspect can be used in combination with the features of the fourth aspect. In this fifth aspect, since a switch is provided between the cartridges, it becomes possible to perform power transmission and reception only between specific cells. This enables a leveling of residual capacities of all cartridges, thereby preventing the deterioration that shortens the life of the cartridges.

Further, according to the sixth aspect of this embodiment, there is provided cartridges and an electricity storage system, which are provided with covers on the sides of the electricity storage system and the cartridges at connections therebetween so that, when the cartridges are inserted to the electricity storage system, connection portions are exposed to establish electrical connections. The cartridges must be electrically connected to the storage system. However, it is preferred to see that tabs of a large-scale lithium ion secondary battery are not carelessly exposed. For this purpose, the electrode tabs of the cartridges and the electricity storage system may be provided with covers. The covers enable not only safe connection, but also prevention of connection failure due to dust or dirt.

Further, according to the seventh aspect of this embodiment, there is provided cartridges and an electricity storage system, which are provided with wireless power transmission devices on the sides of the electricity storage system and the cartridges at connections therebetween so as to establish transmission and reception of electricity between the electricity storage system and the cartridges without physical contact. The features of this seventh aspect can be used in combination with the features of the sixth aspect. For safety reasons and prevention of connection failure, it is preferred that the connection portions such as electrode tabs are not exposed. Therefore, the storage system may be provided with electrical parts (such as spiral wires) on the sides of power reception and power transmission to enable the wireless charging.

Further, according to the eighth aspect of this embodiment, there is provided an electricity storage system, which can be applied to general residential houses, shops, buildings, plants, power backup, mega solar power storage, wind power storage, geothermal energy storage, electric vehicles, plug-in hybrid vehicles or hybrid vehicles.

Further, according to the ninth aspect of this embodiment, there is provided an electricity storage system, which is connected to a LAN (local area network) to receive weather forecast information, based on which the amount of electricity to be generated by a solar battery in the future is calculated, wherein:

the electricity storage system predicts the amount of output from the solar battery based on the weather forecast information when the result of calculation shows that the term during which the amount of electricity to be generated by the solar battery equals or exceeds half of a rated output is less than the predetermined period of time, and a charging from the grid is not carried out when the result of calculation shows that the term during which the amount of electricity to be generated by the solar battery equals or exceeds half of a rated output is equal to or more than the predetermined period of time. The above-mentioned predetermined period of time may be appropriately selected and may be, for example, 3 hours.

Thus, by the connection of the electricity storage system with an IT (information technology) device such as LAN, an efficient use of energy becomes possible. In a residential house equipped with a solar photovoltaics system, the aforementioned system of the present invention predicts the amount of output in the future (e.g., next day) by the solar photovoltaics based on the weather forecast information, to thereby judge whether a charging with the commercial grid-connected power source should be performed on the previous day or the power should be supplied through the solar photovoltaics on the next day. This enables the achievement of an efficient use of energy.

Further, the electricity storage system is connected to a LAN to receive weather forecast information from an outside server in order to facilitate efficient use of electricity derived from a solar battery or a grid power. It is preferred to construct an energy total management system taking a life pattern into consideration. The "life pattern" means information such as a domestic power consumption profile depending on the time of the day. When a smart meter is connected to the storage system, the storage system receives information on the life style from the smart meter and, based on the received information, supplies power from the cartridges or charges the cartridges in accordance with the state of domestic power use.

Further, according to the tenth aspect of this embodiment, there are provided cells and a cartridge, wherein the cells connected in each cartridge of the electricity storage system of the first aspect exhibits a capacity maintenance ratio of 90% or more at the 100th cycle in a cycle test where the charge and discharge are carried out at 5 C. In the second and fourth aspects, with a small number of cartridges, the electricity storage system can be operated and the power management between the cartridges is effected. In such an instance, when the cells in the cartridges have a rapid discharge-charge capacity, the energy can be efficiently utilized by increasing the C-rate even if the number of cartridges mounted in the system is (a) ((n)−1).

So far, the first to tenth aspects of the present invention are explained above. In the present invention, at least two of these may be combined to provide a cartridge, a battery management system or en electricity storage system.

Figure 24:
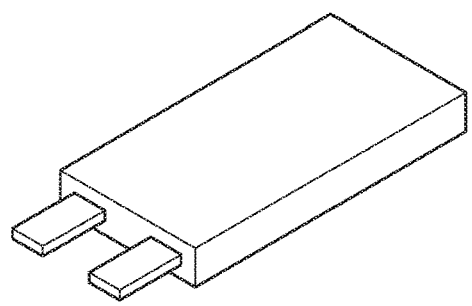
FIG. 24 is a diagram showing the appearance of a cell used in the fourth embodiment of the present invention.

FIG. 24 is a diagram showing the appearance of a cell used in the battery management system or the electricity storage system according to the fourth embodiment of the present invention. The cell has an approximate rectangular parallelepiped shape and has tabs on one side thereof (upper side in FIG. 24). With respect to the size of the cell, for example, the cell may have a width of about 10 cm, a height of about 0.5 cm, and a depth of about 30 cm.

Figure 25:
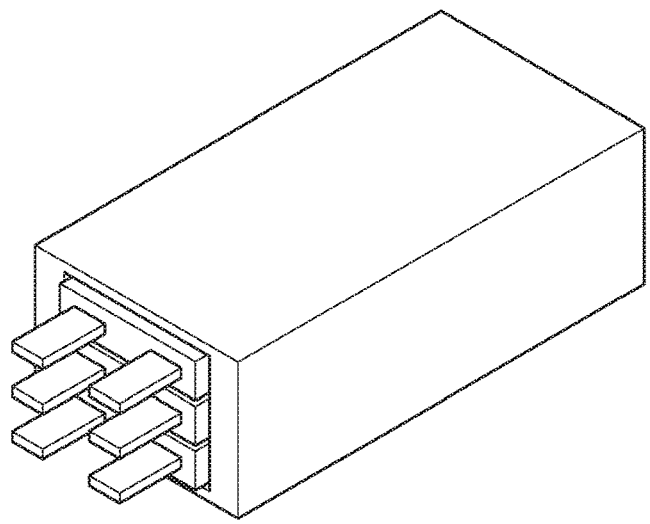
FIG. 25 is a diagram showing the appearance of a cartridge used in the fourth embodiment of the present invention.

FIG. 25 is a diagram showing the appearance of a cartridge used in the fourth embodiment of the present invention.

The cartridge is composed of a plurality of cells. FIG. 25 exemplarily shows a cartridge composed of three (3) cells. In this example, three (3) cells are arranged in parallel and accommodated in the cartridge, while the tabs of the cells are exposed outside the cartridge. With respect to the size of the cartridge, for example, the cartridge may have a width of about 15 cm, a height of about 3 cm, and a length of about 40 cm.

When the cells are mounted in the storage apparatus, the cells are connected in series in the storage apparatus.

Though FIG. 25 shows an example where the cartridge has three (3) cells, the number of cells is not limited to this example, and may be one (1), two (2) or four (4) or more.

Figure 26:
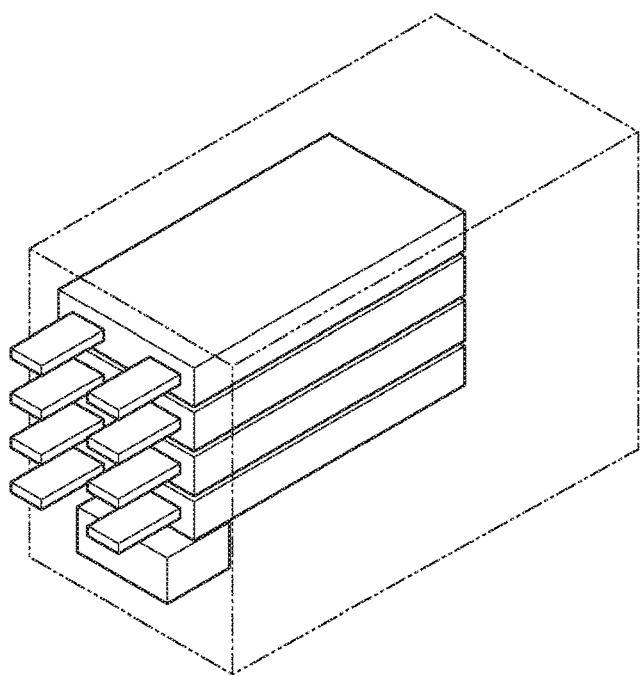
FIG. 26 is a diagram showing the appearance of another example of a cartridge used in the fourth embodiment of the present invention.

FIG. 26 is a diagram showing an appearance of another example of the cartridge. In FIG. 26, a BMS (battery management system) is provided in the casing of the cartridge. The battery management system has a function to manage charge of the cell from the storage apparatus, discharge to an electrical load connected to a part outside the cell, etc., to thereby control the charge and discharge for, for example, preventing overcharge and overdischarge.

Figure 27:
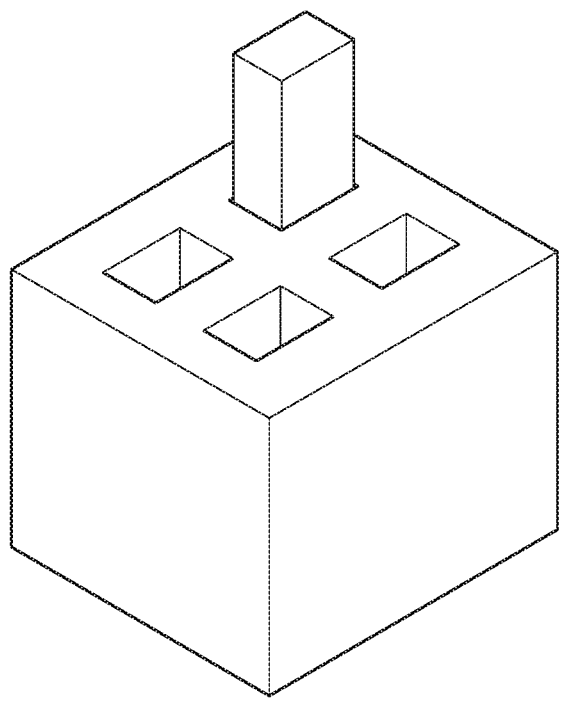
FIG. 27 is a diagram showing the appearance of a storage system according to the fourth embodiment of the present invention.

FIG. 27 is a diagram showing an appearance of one example of the electricity storage system. This electricity storage system is composed of one or more cartridges and an storage apparatus. In the system of FIG. 27, the storage apparatus has four ports through which the cartridges are mounted and connected where the maximum number of mountable cartridges is 4. With respect to the size of the storage apparatus, for example, the storage apparatus may have a width of about 100 cm, a height of about 50 cm, and a length of about 100 cm. In FIG. 27, one (1) cartridge is mounted to the storage apparatus.

Figure 28:
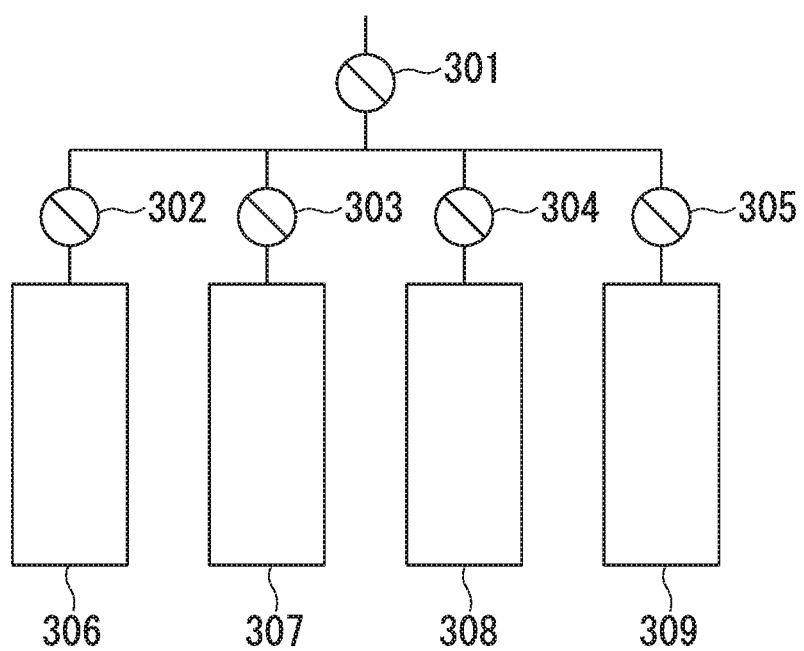
FIG. 28 is a diagram explaining the connections of the cartridges with the storage apparatus according to the fourth embodiment of the present invention.

FIG. 28 is a diagram explaining the connections of the cartridges with the storage apparatus. Here, explanations are made on the case where maximum four (4) cartridges 306 to 309 can be connected to the storage apparatus. In this drawing, the storage apparatus is provided with switches 301 to 305. The switch 301 has one terminal thereof connected to one terminal of each of the switches 302 to 305, whereas the other terminal of switch 301 may function to selectively connect through the storage apparatus to an electrical load (e.g., electrical equipment provided inside a building) or to cut off the aforementioned various circuits from the switches 302 to 305.

Each of the switches 302 to 305 has one terminal thereof connected to one terminal of the switch 301. While being in an ON state, the other terminal of each of the switches 302 to 305 is connected to any one of the cells, and while being in an OFF state, the switches are cut off from the cell.

Here, the control circuit provided in the storage system turns on and off the switches 301 to 305, to thereby manage the power between the cartridges 306, 307, 308 and 309. For example, when only the switch 302 and the switch 305 are turned on, the power transmission is performed between the cartridge 306 and the cartridge 309.

FIG. 28 is a diagram explaining the cartridges. With respect to this example, explanations are made on the case where the terminals of the cartridge are accommodated inside the cover provided on the cartridge.

In this instance, a cover 313 which is openable and closable is provided on one side of the cartridge 310. This cover 313 opens laterally. Further, a + terminal 311 and a − terminal 312 are provided inside the cover of the cartridge 310. Through the + terminal 311 and the − terminal 312, the power supply from the cells provided in the cartridge 310 and the charge of the cells can be performed. The cells inside the cartridge 310 are connected in series and, when connected through the + terminal 311 and the − terminal 312 to the storage apparatus or an electrical load, the cells can be charged or discharge.

Figure 29:
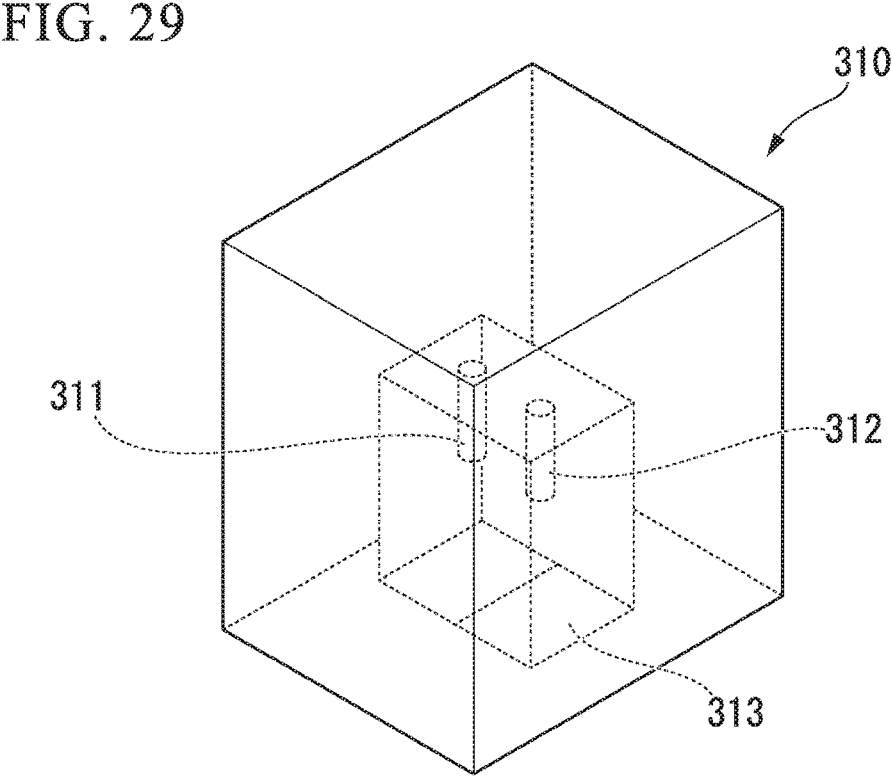
FIG. 29 is a diagram explaining the storage system according to the fourth embodiment of the present invention.
Figure 30:
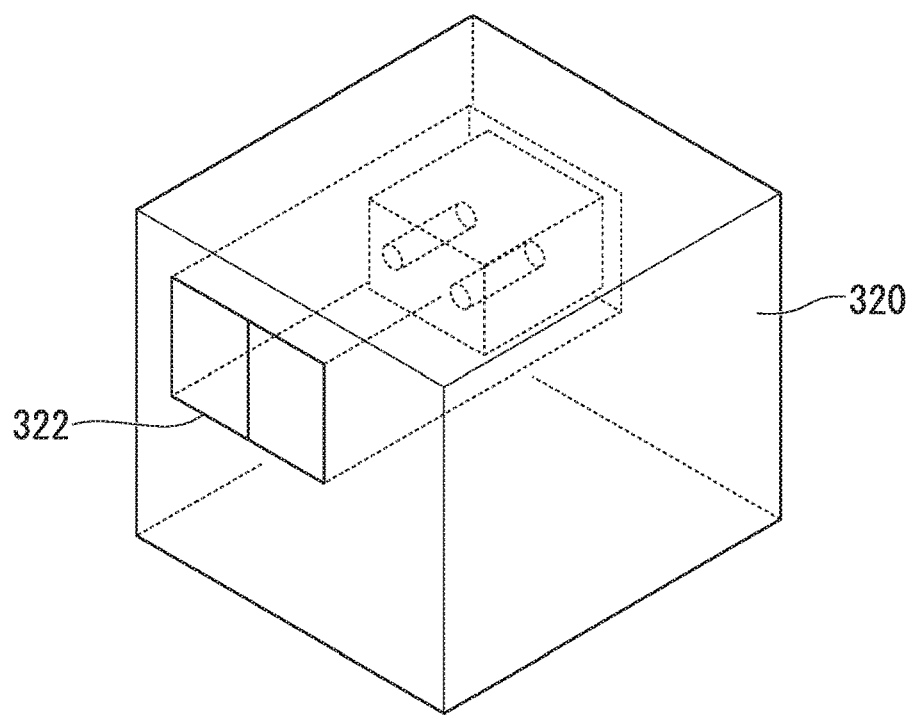
FIG. 30 is a diagram explaining an electricity storage device 320 used in the storage system according to the fourth embodiment of the present invention.

FIG. 30 is a diagram explaining a storage apparatus 320 used in the electricity storage system of the present invention. In this drawing, a cover 322 (corresponding to the cover 313 shown in FIG. 29) which is openable and closable is provided on one side of the storage apparatus 320. This cover 322 opens laterally. Inside the cover 322 are provided two (2) terminal ports 321, through which the + terminal 311 and the − terminal 312 are inserted. This makes it possible to electrically connect the storage apparatus 320 with the cartridge 310.

According to the aforementioned embodiment, for example, a storage battery for stationary purpose can be used as an extender for electric cars where the maximum driving distances largely vary depending on the driving conditions. Further when the storage battery is applied to a bicycle, the time for charging the battery can be omitted thereby improving the convenience of the use of the bicycle. The storage apparatus of this embodiment is also advantageous in that, when it is intended to change the amount of domestic power use due to increase in the number of family members, etc., the power supply can be increased easily and that with a high economy because the introduction of a new system is not necessary.

In the another embodiment of the present invention, the management of charge/discharge can be performed by a method in which a program for implementing the functions of the electricity storage system 6 (6a, 6b, 6c) shown in FIG. 1 is recorded in a computer-readable recording medium, and the program recorded in this medium is loaded into the computer system and implemented. Herein, the "computer system" may embrace the operating system (OS) and the hardware such as peripheral devices.

The computer system using the WWW system may embrace a homepage provider environment (or a homepage display environment).

The "computer-readable recording media" may encompass flexible disks, magneto-optic disks, ROM, portable media such as CD-ROM, and other storage devices such as hard-disk units installed in computers. Additionally, the computer-readable recording media may encompass storage measures, which are able to retain programs for a certain period of time, such as internal volatile memory (RAM) of computers acting as servers or clients when the programs are transmitted through networks (e.g. the Internet) or communication lines (e.g. telephone lines). The aforementioned program may be one for implementing a part of the functions mentioned above, or may be one which can implement the functions when combined with a program already recorded in the computer system.

Various embodiments are explained above referring to the drawings; however, the specific construction is not limited to those of the embodiments and may be altered as long as the alterations do not deviate from the gist of the present invention.

For example, the aforementioned embodiments are explained with respect to an electricity storage system applicable to general residential houses. However, the electricity storage system of the present invention can also be applied to shops, buildings, plants, power backup, mega solar power storage, wind power storage, geothermal energy storage, electric vehicles, plug-in hybrid vehicles or hybrid vehicles.

Further, the aforementioned embodiments are explained with respect to an example where the cartridge and the electricity storage system are physically connected. However, alternatively, the electricity storage system may be provided with wireless power transmission devices on the sides of the electricity storage system and the cartridges at connections therebetween so as to establish transmission of electricity between the electricity storage system and the cartridges without physical contact. For safety reasons and prevention of connection failure at the time of removal of the cartridge, it is preferred that the connection portions such as electrode tabs are not exposed. Therefore, the storage system may be provided with electrical parts (such as spiral wires) on the sides of power reception and power transmission to enable the wireless charging.

Further, this embodiment may employ a construction wherein the power management device 4 controls the charge and discharge of the storage system 6 based on the weather forecast information. For more efficient use of electricity derived from a solar battery or a grid power, the electricity storage system may have the following construction. That it, the electricity storage system may have a construction wherein the system receives weather forecast information, based on which the amount of electricity to be generated by a solar battery in the future is calculated, wherein:

the electricity storage system predicts the amount of output from the solar battery based on the weather forecast information when the result of calculation shows that the term during which the amount of electricity to be generated by the solar battery equals or exceeds half of a rated output is less than the predetermined period of time, and a charging from the grid is not carried out when the result of calculation shows that the term during which the amount of electricity to be generated by the solar battery equals or exceeds half of a rated output is equal to or more than the predetermined period of time.

Further, the sizes and characteristics of the cartridge 100 and the cell 101 shown in FIG. 3 are mere examples, and are not limited to those shown in this drawing. Similarly, with respect to the reference voltages (the first and second voltages) at which the control circuit 62 turns on and off the switch circuits 67_1 to 67_4 and the switch circuits 68_1 to 68_4, the values show in FIG. 3 are mere examples, and are not limited to such values. Needless to say, the cartridge 100 is independently capable of outputting a direct current or an alternating current even in a state of being removed from the electricity storage system 6.

INDUSTRIAL APPLICABILITY

The present invention can be widely applicable to electricity storage systems, and since the battery packs are provided as cartridges, the cartridges can be used as a power supply for not only stationary purpose but also replacement in other facilities or apparatuses. Thus, electricity can be efficiently utilized. Particularly, it becomes possible to withdraw sufficient amount of energy through each cartridge without a need for leveling to balance energies between the cartridges.

Further, according to the present invention, a plurality of cartridges can simultaneously and efficiently discharge or be charged. Furthermore, the present invention enables the prevention of cross current from occurring due to the difference in terminal voltages of the cartridges when simultaneous discharge or charge of the cartridges is performed.

DESCRIPTION OF THE REFERENCE SYMBOLS

1 Power supply network
2 Power meter
3 Power distribution unit
4 Power management device
4*a* Control device
4*b* Operation panel
5 Conduction monitor
6 Electricity storage system
6*a* Electricity storage system
6*b* Electricity storage system
6*c* Electricity storage system
9 Solar panel
10 Solar module
16 Internet
17 Outside server
18 Electric vehicle
22 Cover
51 Electric appliance
60 Storage apparatus
61_*i* PCS (power conditioner)
61_1 PCS (power conditioner)
61_2 PCS (power conditioner)
61_3 PCS (power conditioner)
61_4 PCS (power conditioner)
61*a* DC-DC converter
61*b* DC-AC inverter
62 Control circuit
63_*i* DC-AC inverter
63_1 DC-AC inverter
63_2 DC-AC inverter
63_3 DC-AC inverter
63_4 DC-AC inverter
64_*i* DC-DC converter
64_1 DC-DC converter
64_2 DC-DC converter
64_3 DC-DC converter
64_4 DC-DC converter
65_*i* Cross current prevention circuit
65_1 Cross current prevention circuit
65_2 Cross current prevention circuit
65_3 Cross current prevention circuit
65_4 Cross current prevention circuit
66_*i* Diode
66_1 Diode
66_2 Diode
66_3 Diode
66_4 Diode
67_*i* Switch circuit
67_1 Switch circuit
67_2 Switch circuit
67_3 Switch circuit
67_4 Switch circuit
68_*i* Switch circuit
68_1 Switch circuit
68_2 Switch circuit
68_3 Switch circuit
68_4 Switch circuit
69_*i* Diode
69_1 Diode 69_2 Diode
69_3 Diode
69_4 Diode
100 Cartridge
100_$i$ Cartridge
100_1 Cartridge
100_2 Cartridge
100_3 Cartridge
100_4 Cartridge
101 Cell
102 Safety circuit
103 Handle
111 + terminal
111_$i$ + terminal
111_1 + terminal
111_2 + terminal
111_3 + terminal
111_4 + terminal
112 − terminal
112_$i$ − terminal
112_1 − terminal
112_2 − terminal
112_3 − terminal
112_4 − terminal
210_$i$ Switch circuit
210_1 Switch circuit
210_2 Switch circuit
210_3 Switch circuit
210_4 Switch circuit
211 Switch circuit
212 Switch circuit
213 Switch circuit
214 Switch circuit
301 Switch
302 Switch
303 Switch
304 Switch
305 Switch
306 Switch
307 Switch
308 Switch
309 Cartridge
310 Cartridge
311 + terminal
312 − terminal
313 Cover
322 Cover
320 Storage apparatus
321 Terminal port
CCP_65$i$ Cross current prevention circuit
PCSC_i PCS control signal
PCSC_1 PCS control signal
PCSC_2 PCS control signal
PCSC_3 PCS control signal
PCSC_4 PCS control signal
PCSD_i PCS control signal
PCSD_1 PCS control signal
PCSD_2 PCS control signal
PCSD_3 PCS control signal
PCSD_4 PCS control signal

What is claimed is:

1. An electricity storage system, comprising:
a plurality of cartridges connected together in parallel, each cartridge comprising a plurality of cells connected together, wherein each of said cartridges independently maintains a voltage convertible to a commercial voltage, and
wherein said electricity storage system is configured to, upon receipt of a cartridge withdrawal signal input by a user and indicating a user's intention to withdraw any cartridge of the plurality of cartridges regardless of the operational state of a selected cartridge, including whether the selected cartridge is charging or discharging, disallow conductions with respect to the cartridge to be withdrawn and output a signal indicating that the selected cartridge is ready to be withdrawn.

2. The electricity storage system according to claim 1, further comprising:
a DC-DC converter provided in association with the said cartridges connected together in parallel,
a DC-AC inverter provided between said DC-DC converter and a node outputting said commercial voltage,
a plurality of switch circuits which are respectively provided between said cartridges connected together in parallel and said DC-DC converter, and
a control circuit for controlling the switch circuits to allow or disallow the flow of current.

3. The electricity storage system according to claim 2, wherein, upon receipt of an input of discharge instruction signal from said electricity storage system, said control circuit selects, in accordance with a predetermined order, a cartridge with a sustaining voltage equal to or higher than a predetermined first voltage from among said cartridges connected in parallel, and allows conduction through the switch circuit for the selected cartridge, so that said commercial voltage is output until a sustaining voltage in said cartridge is lowered to a second voltage which is lower than said first voltage.

4. The electricity storage system according to claim 3, wherein, upon receipt of an input of charge instruction signal from said electricity storage system, said control circuit selects, in accordance with a predetermined order, a cartridge with a sustaining voltage equal to or lower than a predetermined third voltage from among said cartridges connected in parallel, and allows conduction through the switch circuit for the selected cartridge, so that said electricity storage system is charged with a commercial voltage until a sustaining voltage in said cartridge is increased to a fourth voltage which is higher than said third voltage.

5. The electricity storage system according to claim 3, wherein, upon receipt of an input of cartridge withdrawal signal in addition to said discharge instruction signal, said cartridge withdrawal signal indicating a user's intention to withdraw any cartridge of said cartridges connected in parallel,
said control circuit, when said signaled cartridge is discharging, allows conduction through the switch circuit for other cartridge with a sustaining voltage which is next lower than the signaled cartridge and is equal to or higher than said first voltage, while disallowing conduction through the switch circuit for the signaled cartridge, and outputs a signal indicating that the signaled cartridge is ready to be withdrawn, or
said control circuit, when said signaled cartridge is not discharging, outputs a signal indicating that the signaled cartridge is ready to be withdrawn.

6. The electricity storage system according to claim 3, wherein, upon receipt of an input of cartridge withdrawal signal in addition to said charge instruction signal, said cartridge withdrawal signal indicating a user's intention to withdraw any cartridge of said cartridges connected in parallel, said control circuit, when said signaled cartridge is being charged, allows conduction through the switch circuit for other cartridge with a sustaining voltage which is next higher than the signaled cartridge and is equal to or lower than said third voltage, while disallowing conduction through the switch circuit for the signaled cartridge, and outputs a signal indicating that the signaled cartridge is ready to be withdrawn, or said control circuit, when said signaled cartridge is not being charged, outputs a signal indicating that the signaled cartridge is ready to be withdrawn.

7. The electricity storage system according to claim 1, which is operable when the number of cartridges mounted in said system is (a), which is a positive number obtained by the formula (n)−1, wherein (n) is a positive number representing a maximum number of mountable cartridges.

8. The electricity storage system according to claim 1, which is provided with covers on the sides of the electricity storage system and the cartridges at connections therebetween so that, when the cartridges are inserted to the electricity storage system, connection portions are exposed to establish electrical connections.

9. The electricity storage system according to claim 1, which is provided with wireless power transmission devices on the sides of the electricity storage system and the cartridges at connections therebetween so as to establish transmission of electricity between the electricity storage system and the cartridges without physical contact.

10. The electricity storage system according to claim 1, which is used for general residential houses, shops, buildings, plants, power backup, mega solar power storage, wind power storage, geothermal energy storage, electric vehicles, plug-in hybrid vehicles or hybrid vehicles.

11. The electricity storage system according to claim 1, which is connected to a local area network to receive weather forecast information, based on which the amount of electricity to be generated by a solar battery in the future is calculated, wherein the electricity storage system predicts the amount of output from the solar battery based on the weather forecast information when the result of calculation shows that the term during which the amount of electricity to be generated by the solar battery equals or exceeds half of a rated output is less than the predetermined period of time, and a charging from the grid is not carried out when the result of calculation shows that the term during which the amount of electricity to be generated by the solar battery equals or exceeds half of a rated output is equal to or more than the predetermined period of time.

12. An electricity storage system, comprising:

a single cartridge or a plurality of cartridges connected together in parallel, each cartridge comprising a plurality of cells connected together, wherein said single cartridge or each of said cartridges independently maintains a voltage convertible to a commercial voltage, wherein any of said single cartridge or said cartridges which satisfy a predetermined voltage condition are charged with a direct current voltage converted from a commercial voltage, or are caused to discharge so that said electricity storage system outputs a commercial voltage, and wherein the electricity storage system is configured to, upon receipt of a cartridge withdrawal signal input by a user and indicating a user's intention to withdraw any cartridge of the plurality of cartridges regardless of the operational state of a selected cartridge, including whether the selected cartridge is charging or discharging, disallow conductions with respect to the cartridge intended to be withdrawn and output a signal indicating that the selected cartridge is ready to be withdrawn.

13. The electricity storage system according to claim 12, which is provided with one or more sets of:

a switch circuit, a DC-AC inverter with its input node connected with said switch circuit, and a DC-DC converter with its input node connected with an output node of said DC-AC inverter and with its output node connected with said cartridge, wherein each set being provided between a node discharging said commercial voltage and each of said cartridges, and said electricity storage system further including a control circuit for controlling each switch circuit to allow or disallow the flow of current.

14. The electricity storage system according to claim 13, wherein, upon receipt of an input of discharge instruction signal from said electricity storage system, said control circuit selects a cartridge with a sustaining voltage equal to or higher than a predetermined first voltage from among said cartridges connected in parallel, and allows conduction through the switch circuit for the selected cartridge, so that said commercial voltage is output until a sustaining voltage in said cartridge is lowered to a second voltage which is lower than said first voltage.

15. The electricity storage system according to claim 14, wherein, upon receipt of an input of charge instruction signal from said electricity storage system, said control circuit selects a cartridge with a sustaining voltage equal to or lower than a predetermined third voltage from among said cartridges connected in parallel, and allows conduction through the switch circuit for the selected cartridge, so that said electricity storage system is charged with a commercial voltage until a sustaining voltage in said cartridge is increased to a fourth voltage which is higher than said third voltage.

16. The electricity storage system according to claim 14, wherein, upon receipt of an input of cartridge withdrawal signal in addition to said discharge instruction signal, the cartridge withdrawal signal indicating a user's intention to withdraw any cartridge of said cartridges connected in parallel, said control circuit, when said signaled cartridge is discharging, disallows conduction through the switch circuit for the signaled cartridge, and outputs a signal indicating that the signaled cartridge is ready to be withdrawn, or said control circuit, when said signaled cartridge is not discharging, outputs a signal indicating that the signaled cartridge is ready to be withdrawn.

17. The electricity storage system according to claim 14, wherein, upon receipt of an input of cartridge withdrawal signal in addition to said charge instruction signal, said cartridge withdrawal signal indicating a user's intention to withdraw any cartridge of said cartridges connected in parallel, said control circuit, when said signaled cartridge is being charged, disallows conduction through the switch circuit for the signaled cartridge, and outputs a signal indicating that the signaled cartridge is ready to be withdrawn, or said control circuit, when said signaled cartridge is not being charged, outputs a signal indicating that the signaled cartridge is ready to be withdrawn.

18. The electricity storage system according to claim 12, which is operable when the number of cartridges mounted in said system is (a), which is a positive number obtained by the formula (n)−1, wherein (n) is a positive number representing a maximum number of mountable cartridges.

19. The electricity storage system according to claim 12, which is provided with covers on the sides of the electricity storage system and the cartridges at connections therebetween so that, when the cartridges are inserted to the electricity storage system, connection portions are exposed to establish electrical connections.

20. The electricity storage system according to claim 12, which is provided with wireless power transmission devices on the sides of the electricity storage system and the cartridges at connections therebetween so as to establish transmission of electricity between the electricity storage system and the cartridges without physical contact.

21. The electricity storage system according to claim 12, which is used for general residential houses, shops, buildings, plants, power backup, mega solar power storage, wind power storage, geothermal energy storage, electric vehicles, plug-in hybrid vehicles or hybrid vehicles.

22. The electricity storage system according to claim 12, which is connected to a local area network to receive weather forecast information, based on which the amount of electricity to be generated by a solar battery in the future is calculated, wherein the electricity storage system predicts the amount of output from the solar battery based on the weather forecast information when the result of calculation shows that the term during which the amount of electricity to be generated by the solar battery equals or exceeds half of a rated output is less than the predetermined period of time, and a charging from the grid is not carried out when the result of calculation shows that the term during which the amount of electricity to be generated by the solar battery equals or exceeds half of a rated output is equal to or more than the predetermined period of time.

23. An electricity storage system, comprising:
a plurality of cartridges connected together in parallel, each cartridge comprising a plurality of cells connected together, wherein a voltage in each of said cartridges is maintained at a voltage convertible to a commercial voltage, and wherein the electricity storage system is configured to, upon receipt of a cartridge withdrawal signal input by a user and indicating a user's intention to withdraw any cartridge of the plurality of cartridges regardless of the operational state of a selected cartridge, including whether the selected cartridge is charging or discharging, disallow conductions with respect to the cartridge intended to be withdrawn and output a signal indicating that the selected cartridge is ready to be withdrawn.

24. The electricity storage system according to claim 23, which is operable when the number of cartridges mounted in said system is (a), which is a positive number obtained by the formula (n)−1, wherein (n) is a positive number representing a maximum number of mountable cartridges.

25. The electricity storage system according to claim 23, wherein the cartridges have approximately the same shape.

26. The electricity storage system according to claim 23, wherein, when cartridges with different residual capacities are mounted to said system, the cartridges except for one with a less residual capacity output electricity until voltages of all of the cartridges become equal, whereafter all of the cartridges output electricity.

27. The electricity storage system according to claim 23, further comprising:
electricity transfer circuits provided between each adjacent pair of cartridges, said electricity transfer circuits enabling transfer of electricity from a cartridge with a more residual capacity to a cartridge with a less residual capacity.

28. The electricity storage system according to claim 23, which is provided with covers on the sides of the electricity storage system and the cartridges at connections therebetween so that, when the cartridges are inserted to the electricity storage system, connection portions are exposed to establish electrical connections.

29. The electricity storage system according to claim 23, which is provided with wireless power transmission devices on the sides of the electricity storage system and the cartridges at connections therebetween so as to establish transmission of electricity between the electricity storage system and the cartridges without physical contact.

30. The electricity storage system according to claim 23, which is used for general residential houses, shops, buildings, plants, power backup, mega solar power storage, wind power storage, geothermal energy storage, electric vehicles, plug-in hybrid vehicles or hybrid vehicles.

31. The electricity storage system according to claim 23, which is connected to a local area network to receive weather forecast information, based on which the amount of electricity to be generated by a solar battery in the future is calculated, wherein the electricity storage system predicts the amount of output from the solar battery based on the weather forecast information when the result of calculation shows that the term during which the amount of electricity to be generated by the solar battery equals or exceeds half of a rated output is less than the predetermined period of time, and a charging from the grid is not carried out when the result of calculation shows that the term during which the amount of electricity to be generated by the solar battery equals or exceeds half of a rated output is equal to or more than the predetermined period of time.

32. Cartridges used in the electricity storage system according to claim 23, which have approximately the same shape.

* * * * *